US010643262B2

(12) United States Patent
Bursey

(10) Patent No.: US 10,643,262 B2
(45) Date of Patent: *May 5, 2020

(54) BUNDLING OF AUTOMATED WORK FLOW

(71) Applicant: GREAT-CIRCLE TECHNOLOGIES, INC., Chantilly, VA (US)

(72) Inventor: Brent Bursey, Chantilly, VA (US)

(73) Assignee: Great-Circle Technologies, Inc., Chantilly, VA (US)

( * ) Notice: Subject to any disclaimer, the term of this patent is extended or adjusted under 35 U.S.C. 154(b) by 282 days.

This patent is subject to a terminal disclaimer.

(21) Appl. No.: 15/635,412

(22) Filed: Jun. 28, 2017

(65) Prior Publication Data

US 2017/0308856 A1    Oct. 26, 2017

Related U.S. Application Data

(62) Division of application No. 12/240,702, filed on Sep. 29, 2008, now Pat. No. 9,811,849, which is a division
(Continued)

(51) Int. Cl.

| | |
|---|---|
| *G06Q 30/00* | (2012.01) |
| *G06Q 30/06* | (2012.01) |
| *H04W 4/70* | (2018.01) |
| *G06F 16/29* | (2019.01) |
| *G06F 16/25* | (2019.01) |
| *G06F 16/583* | (2019.01) |
| *G06Q 30/02* | (2012.01) |

(Continued)

(52) U.S. Cl.
CPC ....... *G06Q 30/0621* (2013.01); *G06F 16/254* (2019.01); *G06F 16/29* (2019.01); *G06F 16/5854* (2019.01); *G06Q 10/0633* (2013.01); *G06Q 10/101* (2013.01); *G06Q 30/0281* (2013.01); *G06Q 30/0603* (2013.01); *H04L 41/0273* (2013.01); *H04L 63/0245* (2013.01); *H04L 67/10* (2013.01); *H04W 4/70* (2018.02); *G06T 5/006* (2013.01); *G06T 2207/10032* (2013.01); *H04L 63/20* (2013.01)

(58) Field of Classification Search
CPC ...... H04W 4/70; G06F 16/5854; G06F 16/29; G06F 16/254; G06Q 30/0281; G06Q 30/0603; G06Q 10/0633; G06Q 30/0621; G06Q 10/101; H04L 63/0245; H04L 67/10; H04L 41/0273
USPC .................................................... 705/26, 27
See application file for complete search history.

(56) References Cited

U.S. PATENT DOCUMENTS

| | | |
|---|---|---|
| 6,229,546 B1 | 5/2001 | Lancaster et al. |
| 6,928,194 B2 | 8/2005 | Mai et al. |
| | (Continued) | |

OTHER PUBLICATIONS

Great Circle Technolgies: Internet Archive Wayback Machine; www.great-circletech.com; Jul. 29, 2007-Aug. 24, 2007;11 pgs. (Year: 2007).*

(Continued)

*Primary Examiner* — Robert M Pond
(74) *Attorney, Agent, or Firm* — Ajay A. Jagtiani; Miles & Stockbridge P.C.

(57) ABSTRACT

An enterprise geospatial intelligence service oriented architecture (EGI-SOA) provides a consumer with one or more tailored products in response to either a dynamic request or a standing request by the consumer.

12 Claims, 16 Drawing Sheets

Related U.S. Application Data of application No. 12/240,522, filed on Sep. 29, 2008, now abandoned.

(60) Provisional application No. 60/976,180, filed on Sep. 28, 2007.

(51) Int. Cl.

| | | |
|---|---|---|
| *G06Q 10/10* | (2012.01) | |
| *G06Q 10/06* | (2012.01) | |
| *H04L 29/06* | (2006.01) | |
| *H04L 29/08* | (2006.01) | |
| *H04L 12/24* | (2006.01) | |
| *G06T 5/00* | (2006.01) | |

(56) References Cited

U.S. PATENT DOCUMENTS

| | | |
|---|---|---|
| 7,089,198 B2 | 8/2006 | Freedenberg |
| 7,610,207 B2 | 10/2009 | Heins |
| 7,798,417 B2 | 9/2010 | Snyder et al. |
| 7,895,048 B2 | 2/2011 | Heins |
| 2002/0178252 A1 | 11/2002 | Balabhadrapatruni et al. |
| 2003/0040971 A1 | 2/2003 | Freedenberg |
| 2003/0088362 A1 | 5/2003 | Melero et al. |
| 2005/0278386 A1 | 12/2005 | Kelly |
| 2006/0200382 A1 | 9/2006 | Arutunian |
| 2006/0200383 A1 | 9/2006 | Arutunian |
| 2006/0200384 A1 | 9/2006 | Arutunian |
| 2007/0061274 A1 | 3/2007 | Gipps |
| 2007/0168370 A1 | 7/2007 | Hardy |
| 2007/0168990 A1* | 7/2007 | Alshab ............... G06F 9/5038 717/127 |
| 2007/0198586 A1 | 8/2007 | Hardy et al. |
| 2008/0017722 A1 | 1/2008 | Snyder et al. |
| 2008/0082490 A1 | 4/2008 | MacLaurin et al. |
| 2008/0120129 A1 | 5/2008 | Seubert et al. |
| 2008/0172288 A1 | 7/2008 | Pilskalns et al. |
| 2008/0215390 A1 | 9/2008 | Gipps |
| 2008/0228609 A1 | 9/2008 | Ebling et al. |
| 2009/0074254 A1 | 3/2009 | Jamison et al. |
| 2009/0083058 A1 | 3/2009 | Beringer et al. |
| 2009/0132540 A1 | 5/2009 | Hjelm et al. |
| 2009/0202109 A1 | 8/2009 | Clar et al. |
| 2009/0251472 A1 | 10/2009 | Antoine |
| 2010/0027915 A1 | 2/2010 | Heins |
| 2011/0020785 A1 | 1/2011 | Lowery |

OTHER PUBLICATIONS

Office Action received in U.S. Appl. No. 14/105,367 dated Aug. 10, 2018.

Burns, Ron et al., Geospatial and Imagery Access Services Specification, Aug. 6, 2001, National Imagery and Mapping Agency, Version 3.5.1, pp. 1-172.

Subscription Overview, SQL Server 2005, pp. 1-3. http://msdn.microsoft.com/en-us/library/ms155911, 3 pages.

Brown, Alison, "Near Real-Time Dissemination of Geo-Referenced Imagery by an Enterprise Server", Proceedings of 2006 GeoTec, Ottawa, Canada, Jun. 2006.

Office Action received in U.S. Appl. No. 14/105,367 dated Jan. 25, 2019.

Office Action received in U.S. Appl. No. 15/635,375 dated Jun. 13, 2019.

Office Action received in U.S. Appl. No. 15/635,412 dated Jul. 25, 2019.

Office Action received in U.S. Appl. No. 15/265,966 dated Jun. 7, 2019.

* cited by examiner

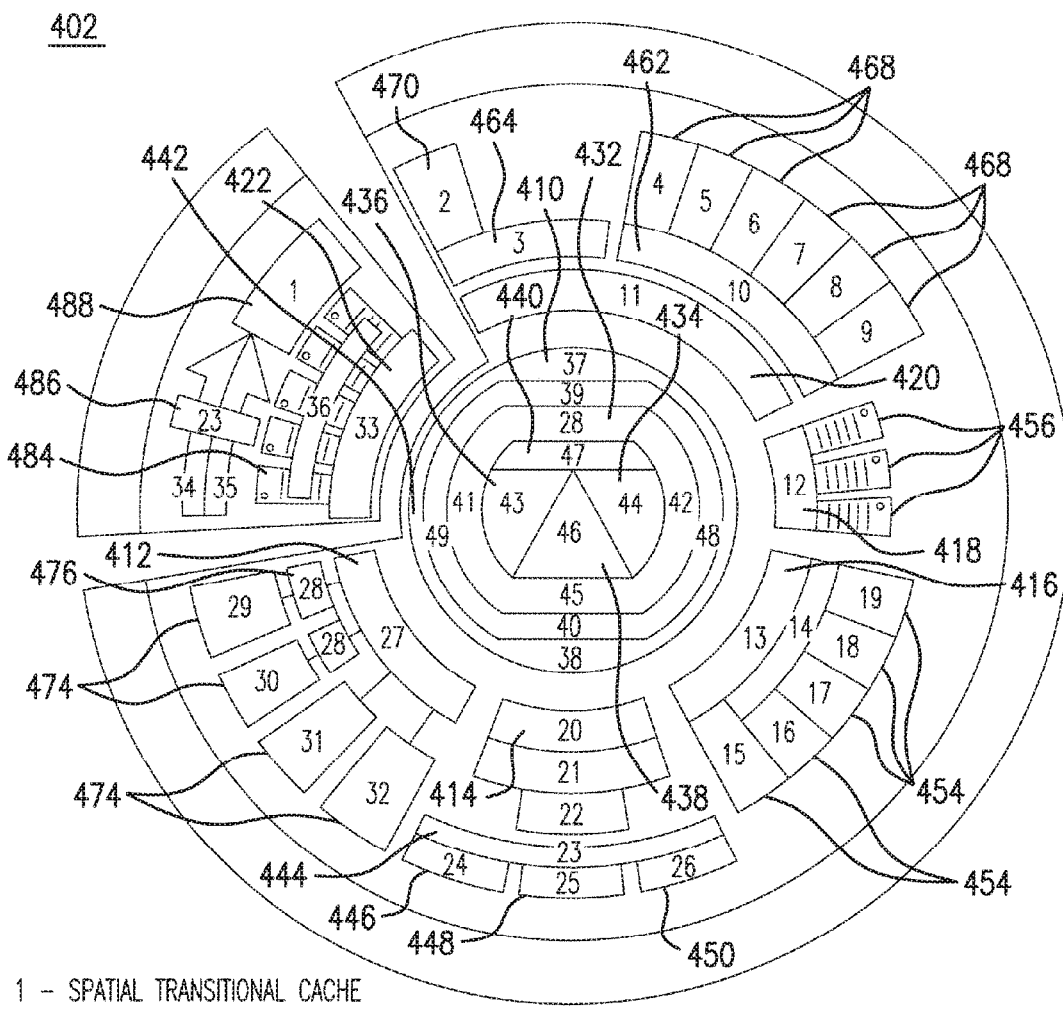

1 – SPATIAL TRANSITIONAL CACHE
2 – AutoFMV
3 – NRT WORKFLOW MANAGER
4 – AutoOrtho
5 – AutoMosaic
6 – AutoTerrain
7 – AutoMap
8 – AutoFeature
9 – AutoChange
10 – WORKFLOW MANAGER
11 – ESB
12 – COMPUTE TIER
13 – WEB SERVICE TIER
14 – OGC SDI 2.0
15 – BUSINESS
16 – CSW
17 – WCS-T
18 – WFS-T
19 – WMS
20 – DATA TIER
21 – AUTO ETL
22 – AUTO SNIFFER
23 – FIREWALL
24 – CD/DVD
25 – STATIC DATA
26 – FTP
27 – CLIENT TIER
28 – SDI
29 – ARC GIS
30 – GOOGLE EARTH
31 – MINERVA T-COP
32 – WEB BROWSER
33 – NRT COMPUTE TIER
34 – FMV
35 – UAV
36 – IBM CELL BE BLADES
37 – SECURITY
38 – GOVERNANCE
39 – CATALOG
40 – DISCOVERY
41 – ACCESS
42 – TRANSFORMATION
43 – UNSTRUCTURED
44 – STRUCTURED
45 – ORACLE SPATIAL
46 – GEO SPATIAL
47 – METADATA
48 – SPACE
49 – TIME

FIG. 4

BUNDLING OF AUTOMATED WORK FLOW

The present application is a divisional of U.S. application No. Ser. 12/240,702, filed Sep. 29, 2008, which is a divisional of U.S. application No. Ser. 12/240,522 filed Sep. 29, 2008, the entire contents and specification of which are hereby incorporated by reference. This application also claims the benefit of priority to U.S. Provisional Patent Application No. 60/976,180, entitled "Geospatial Intelligence Architecture," filed Sep. 28, 2007 which is incorporated by reference in its entirety.

PRIORITY DATA AND INCORPORATION BY REFERENCE

This application claims benefit of priority to U.S. Provisional Patent Application No. 60/976,180, entitled "Geospatial Intelligence Architecture," filed Sep. 28, 2007 which is incorporated by reference in its entirety.

BACKGROUND OF THE INVENTION

Field of the Invention

The present invention relates to geospatial intelligence architectures.

Background of the Technology

Traditional systems for processing geospatial data are manually intensive operations, given the inherent complexity associated with both the sources of geospatial data and the processing required by consumers in the creation of derived products.

SUMMARY OF THE INVENTION

According to a first broad aspect, the present invention provides a method comprising the following steps: (a) determining if one or more tailored products requested by a consumer can be produced by an enterprise geospatial intelligence service oriented architecture (EGI-SOA); and (b) providing from the EGI-SOA to the consumer one or more tailored products of the one or more requested tailored products.

According to a second broad aspect, the present invention provides a machine readable medium having stored thereon sequences of instructions, which when executed by one or more processors, cause one or more electronic devices to perform a set of operations comprising the following steps: (a) determining if one or more tailored products requested by a consumer can be produced by an enterprise geospatial intelligence service oriented architecture (EGI-SOA); and (b) providing from the EGI-SOA to the consumer one or more tailored products of the one or more requested tailored products.

According to a third broad aspect, the present invention provides a computer system implementing a method comprising the following steps: (a) determining if one or more tailored products requested by a consumer can be produced by an enterprise geospatial intelligence service oriented architecture (EGI-SOA); and (b) providing from the EGI-SOA to the consumer one or more tailored products of the one or more requested tailored products.

According to a fourth broad aspect, the present invention provides a method comprising: (a) autonomously transforming an image in an image coordinate system into an orthorectified image in geospatial coordinate system; and (b) providing the orthorectified image to a consumer.

According to a fifth broad aspect, the present invention provides a machine readable medium having stored thereon sequences of instructions, which when executed by one or more processors, cause one or more electronic devices to perform a set of operations comprising the following steps: (a) autonomously transforming one or more data sources into one or more context-aware geospatial intelligence products defined by a governance-driven context; and (b) providing the one or more context-aware geospatial intelligence products to a consumer.

According to a sixth broad aspect, the present invention provides a computer system implementing a method comprising the following steps: (a) autonomously transforming one or more data sources into one or more context-aware geospatial intelligence products defined by a governance-driven context; and (b) providing the one or more context-aware geospatial intelligence products to a consumer.

According to a seventh broad aspect, the present invention provides a method comprising the following steps: (a) autonomously tailoring one or more tailored products in response to a consumer request for the one or more tailored products; and (b) providing the one or more tailored products to the consumer, wherein each of the one or more products is tailored based on contexts for each respective product.

According to an eighth broad aspect, the present invention provides a machine readable medium having stored thereon sequences of instructions, which when executed by one or more processors, cause one or more electronic devices to perform a set of operations comprising the following steps: (a) autonomously tailoring one or more tailored products in response to a consumer request for the one or more tailored products; and (b) providing the one or more tailored products to the consumer, wherein each of the one or more products is tailored based on contexts for each respective product.

According to a ninth broad aspect, the present invention provides a computer system implementing a method comprising the following steps: (a) autonomously tailoring one or more tailored products in response to a consumer request for the one or more tailored products; and (b) providing the one or more tailored products to the consumer, wherein each of the one or more products is tailored based on contexts for each respective product.

According to a tenth broad aspect, the present invention provides a method comprising the following steps: (a) autonomously tailoring one or more products by executing an ExecML job in a computing cloud in response to a consumer request for the one or more tailored products; and (b) providing the one or more tailored products to the consumer.

According to an eleventh broad aspect, the present invention provides a machine readable medium having stored thereon sequences of instructions, which when executed by one or more processors, cause one or more electronic devices to perform a set of operations comprising the following steps: (a) autonomously tailoring one or more products by executing an ExecML job in a computing cloud in response to a consumer request for the one or more tailored products; and (b) providing the one or more tailored products to the consumer.

According to a twelfth broad aspect, the present invention provides a computer system implementing a method comprising the following steps: (a) autonomously tailoring one or more products by executing an ExecML job in a computing cloud in response to a consumer request for the one or more tailored products; and (b) providing the one or more tailored products to the consumer.

According to a thirteenth broad aspect, the present invention provides a method comprising the following steps; (a) autonomously tailoring one or more geospatial intelligence products using an autonomous geospatial intelligence workflow (AGIW); and (b) providing the one or more tailored geospatial intelligence products to the consumer, wherein step (a) is conducted in response to an event being received by an Complex Event-Driven Enterprise Service Bus (CED-ESB) of an enterprise geospatial intelligence service oriented architecture (EGI-SOA).

According to a fourteenth broad aspect, the present invention provides a machine readable medium having stored thereon sequences of instructions, which when executed by one or more processors, cause one or more electronic devices to perform a set of operations comprising the following steps: (a) autonomously tailoring one or more geospatial intelligence products using an autonomous geospatial intelligence workflow (AGIW); and (b) providing the one or more tailored geospatial intelligence products to the consumer, wherein step (a) is conducted in response to an event being received by an Complex Event-Driven Enterprise Service Bus (CED-ESB) of an enterprise geospatial intelligence service oriented architecture (EGI-SOA).

According to a fifteenth broad aspect, the present invention provides a computer system implementing a method comprising the following steps: (a) autonomously tailoring one or more geospatial intelligence products using an autonomous geospatial intelligence workflow (AGIW); and (b) providing the one or more tailored geospatial intelligence products to the consumer, wherein step (a) is conducted in response to an event being received by an Complex Event-Driven Enterprise Service Bus (CED-ESB) of an enterprise geospatial intelligence service oriented architecture (EGI-SOA),

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

FIG. 4 is a schematic diagram showing the logical architecture of an EGI-SOA according to one embodiment of the present invention;

DETAILED DESCRIPTION

Figure 1:
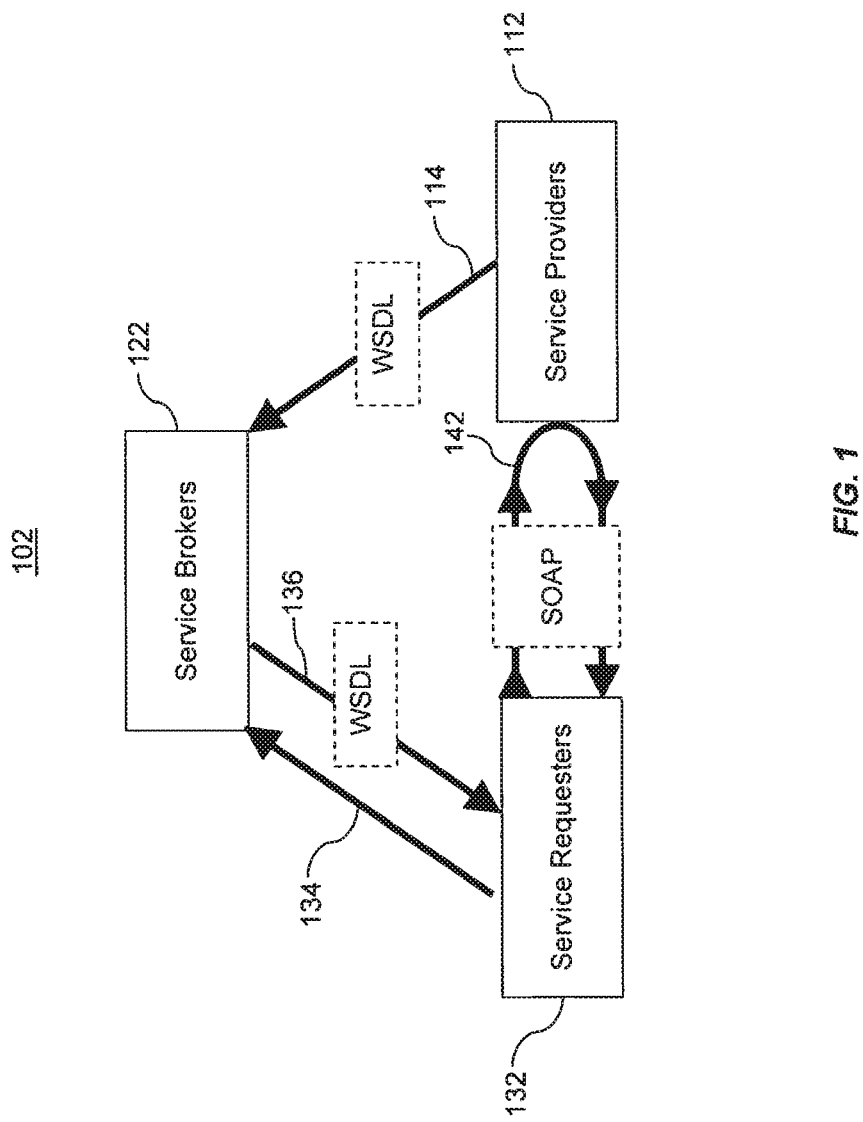
FIG. 1 is a schematic diagram of a typical web-service architecture.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, directional terms such as "top", "bottom", "upper", "lower", "above", "below", "left", "right", "horizontal", "vertical", "upward", "downward", etc. are merely used for convenience in describing the various embodiments of the present invention.

For the purposes of the present invention, a value or property is "based" on a particular value, property, the satisfaction of a condition, or other factor, if that value is derived by performing a mathematical calculation or logical decision using that value, property or other factor.

For the purposes of the present invention, the term "a posterior" is used to describe the knowledge context that is gained through the observation of iterative executions (experience) of various patterns and workflows. Because this experience knowledge context is stored, shared, and linked through catalog registries within an EGI-SOA of the present invention, a posterior knowledge is available to refine and/or adaptively improve future patterns or workflows. The term "a posterior" is derived from the term a posteriori which is Latin for "from what comes later", which is contrasted with a priori or "from what comes before" (or, less literally, "after experience" and "before experience").

For the purposes of the present invention, the term "a priori" is used to describe the knowledge context that is gained through the prior execution of various patterns and workflows or the knowledge context that is extracted from historic datasets that have been updated. Because this experience knowledge context is stored, shared, and linked through catalog registries within an EGI-SOA, a priori knowledge is available to reline, tailor, and/or adaptively improve future patterns or workflows. The term a priori is Latin for "from what comes before", which is contrasted with a posterion or "from what comes later" (or, less literally, "before experience" and "after experience").

For the purposes of the present invention, the term "and" refers to a two-place logical operation that results in a value of true if both of its operands are true, otherwise a value of false. The term logical conjunction is equivalent to "and".

For the purposes of the present invention, the term "application service provider (ASP)" refers to a business that provides computer-based services to customers over a network. Software offered using an ASP model is also sometimes called on-demand software or software as a service (SaaS). The most limited sense of this business is that of providing access to a particular application program using a standard protocol such as FITTP. The EGI-SOA tailored services are a form of SaaS.

For the purposes of the present invention, the term "attribute" refers to a property which describes a physical, thematic, or other characteristic of an entity. An attribute is sometimes considered metadata.

For the purposes of the present invention, the term "autonomic computing" refers to a form of computing that requires a closed data management hierarchy that ensures all data is associated with sufficient metadata to adequately describe the system relevance or context of that data to complex event-driven workflows or processes. A closed data hierarchy is one where no uncharacterized data and, therefore, no unverified data is introduced into the data management hierarchy. As such, all of the data is considered clean, and the traditional exception handling that is pervasive throughout more traditional architectures is significantly reduced. In general, the source data for such as system is provided by authoritative data stewards, Which represents a trusted provider of verified data. Well characterized sensor systems are an example of an authoritative data provider. Because the source data is consistent and clean, it may be fully characterized with metadata to describe the system context that corresponds to that data. The metadata descriptions enable the automated discoverer of relevant data sources to drive the service contracts of services orchestrated into workflows. Within an EGI-SOA of the present invention, AGIWs are an example of autonomic workflows. An example of an autonomic system is a sensor data management and exploitation system, such as an autonomous orthorectification and seamless mosaicing production systems continuously fed by a variety of satellite imagery providers.

For the purposes of the present invention, the term the term "autonomously transforming" refers to a context-driven process that transforms the state of data (form, format, or context) into another defined state without any direct human intervention.

For the purposes of the present invention, the term "bare-metal hypervisor" is software that runs directly on a given hardware platform an operating system control program). A guest operating system thus runs at the second level above the hardware. This term is related to the term "hypervisor". This type of software may be implemented by a virtualization manager within a computing cloud.

For the purposes of the present invention, the term "Bayesian inference" defines a statistical inference in which evidence or observations are used to update or to newly infer the probability that a hypothesis may be true. The name "Bayesian" comes from the frequent use of Bayes' theorem in the inference process. Bayes' theorem was derived from the work of the Reverend Thomas Bayes. Bayesian inference uses aspects of the scientific method, which involves collecting evidence that is meant to be consistent or inconsistent with a given hypothesis. As evidence accumulates, the degree of belief in a hypothesis ought to change. With enough evidence, it should become very high or very low. Thus, proponents of Bayesian inference say that it can be used to discriminate between conflicting hypotheses: hypotheses with very high support should be accepted as true and those with very low support should be rejected as false. However, detractors say that this inference method may be biased due to initial beliefs that one holds before any evidence is ever collected. This is a form of inductive bias. Bayesian inference uses a numerical estimate of the degree of belief in a hypothesis before evidence has been observed and calculates a numerical estimate of the degree of belief in the hypothesis after evidence has been observed. This process is repeated when additional evidence is obtained. Bayesian inference usually relies on degrees of belief, or subjective probabilities, in the induction process and does not necessarily claim to provide an objective method of induction. Nonetheless, sonic Bayesian statisticians believe probabilities can have an objective value and therefore Bayesian inference can provide an objective method of induction. Modified Bayesian inferences are used whenever a priori knowledge is considered within an CGI-SOA. For instance, a terrain update is determined for a new area of interest (AOI) by evaluating the a priori knowledge managed within the SDI for the same AOI through history. These insights are critical to the successful automation of several AGIWs.

For the purposes of the present invention, the term "best practice" refers to an idea that asserts that there is a technique, method, process, activity, incentive or reward that is more effective at delivering a particular outcome than any other technique, method, or process. The idea is that with proper processes, checks, and testing, a desired outcome can be delivered with fewer problems and unforeseen complications. Best practices can also be defined as the most efficient (least amount of effort) and effective (best results) way of accomplishing a task, based on repeatable procedures that have proven themselves over time for large numbers of people. Best practices are described as policies and managed within the governance manager of the EGI-SOA of the present invention.

For the purposes of the present invention, the term "bi-temporal" refers to a concept used in a temporal database. The term bi-temporal denotes both the valid time and transaction time of the data. The SDI implements a bi-temporal spatial data store that is compliant with OGC and ISO 19xxx standards.

For the purposes of the present invention, the term "byte" refers to the basic unit of measurement of information storage in computer science. In many computer architectures it is a unit of memory addressing, most often consisting of eight bits. A byte is one of the basic integral data types in sonic programming languages, especially system programming languages. A byte is an ordered collection of bits, with each bit denoting a single binary value of 1 or 0. The size of a byte may vary and is generally determined by the underlying computer operating system or hardware, although the 8-bit byte is the standard in modern systems. There has been considerable confusion about the meanings of metric, or SI prefixes, used with the word "byte", especially concerning prefixes such as kilo- (k or K) and mega-(M) as shown in. Since computer memory comes in a power of two, rather than ten, a large portion of the software and computer industry use binary estimates of the SI-prefixed quantities, while producers of computer storage devices prefer the SI values. This is why a computer hard drive advertised with a "100 GB" decimal storage capacity actually contains no more than 93 GB of 8-bit (power of 2) addressable storage. Because of the confusion, a contract specifying a quantity of bytes must define what the prefixes mean in terms of the contract e., the alternative binary equivalents or the actual decimal values, or a binary estimate based on the actual values). Table 1 below provides the prefixes used in to refer to bits and bytes in the present invention:

TABLE 1

Prefixes for bit and byte

| Decimal | | Binary | | |
|---|---|---|---|---|
| Value | SI | Value | IEC | JEDEC |
| $1000^1$ | k | $1024^1$ | Ki | kibi- | K | kilo- |
| $1000^2$ | M | $1024^2$ | Mi | mebi- | M | mega- |
| $1000^3$ | G | $1024^3$ | Gi | gibi- | G | giga- |
| $1000^1$ | T | $1024^4$ | Ti | kibi- |
| $1000^2$ | P | $1024^5$ | Pi | mebi- |
| $1000^3$ | E | $1024^6$ | Ei | gibi- |
| $1000^1$ | Z | $1024^7$ | Zi | kibi- |
| $1000^2$ | Y | $1024^8$ | Yi | mebi- |

To make the meaning of the table absolutely clear: A kibibyte (KiB) is made up of 1,024 bytes. A mebibyte (NEBNiB) is made up of 1,024×1,024 i.e. 1,048,576 bytes. The figures in the column using 1,024 raised to powers of 1, 2, 3, 4 and so on are in units of bytes.

For the purposes of the present invention, the term "calibrated focal length" refers to the approximate distance between the projection centre and the image plane that is the result of an optimization process which minimizes camera errors such as distortion.

For the purposes of the present invention, the term "campus area network (CAN)" refers to a network that connects two or more local area networks (LANs) but that is limited to a specific and contiguous geographical area such as a college campus, industrial complex, or a military base, A CAN may be considered a type of MAN (metropolitan area network), but is generally limited to an area that is smaller than a typical MAN. A LAN connects network devices over a relatively short distance. A networked office building, school, or home usually contains a single LAN, though sometimes one building will contain a few small LANs (perhaps, for example, one per room), and occasionally a LAN will span a group of nearby buildings. In TCP/IP networking, a LAN is often but not always implemented as a single IP subnet.

For the purposes of the present invention, the term "causality" denotes a necessary relationship between one event (called cause) and another event (called effect) which is the direct consequence (result) of the first.

For the purposes of the present invention, the term "chronology" refers to a chronicle or arrangement of events in the order of occurrence. General chronology is the science of determining the temporal sequence of past events in time. Chronology is part of periodization and is also part of the discipline of history, including earth. When used for specific examples, a chronology is a sequential arrangement of events, such as a chronicle or, particularly when involving graphical or literary elements, a timeline. A chronology may be either relative that is, locating related events relative to each other or absolute locating these events to specific dates in a chronological era. Even this distinction may be blurred by use of different calendars.

For the purposes of the present invention, the term "chrononym" refers to a specific period of time. Within an EGI-SOA, a chrononym refers to the name of a time instance, time period, or time granule. For instance, the chrononym "business week" may equate to the relative time granule of "Monday through Friday, 8:00 AM to 5:00 PM".

For the purposes of the present invention, the term "chrononymic service" refers to a service that converts a chrononym into a corresponding time granule. An inverse or reverse chrononymic service would converts a time granule into a corresponding chrononymn, if one exists.

For the purposes of the present invention, the term "cloud computing" is synonymous with Internet ('Cloud') based development and use of computer technology ('Computing'). It is a style of computing where IT-related capabilities are provided "as a service", allowing users to access technology-enabled services "in the cloud" without knowledge of, expertise with, or control over the technology infrastructure that supports them. According to the IEEE Computer Society it "is a paradigm in which information is permanently stored in servers on the Internet and cached temporarily on clients that include desktops, entertainment centers, table computers, notebooks, wall computers, handhelds, etc." Cloud computing is a general concept that incorporates software as a service (SaaS), Web 2.0 and other recent, well-known technology trends, where the common theme is reliance on the Internet for satisfying the computing needs of the users. For example, Google Apps provides common business applications online that are accessed from a web browser, while the software and data are stored on the servers. Cloud computing is often confused with grid computing (a form of distributed computing whereby a "super and virtual computer" is composed of a cluster of networked, loosely-coupled computers, acting in concert to perform very large tasks), utility computing (the packaging of computing resources, such as computation and storage, as a metered service similar to a traditional public utility such as electricity) and autonomic computing (computer systems capable of self-management). Indeed many cloud computing deployments are today powered by grids, have autonomic characteristics and are billed like utilities, but cloud computing is rather a next step from the grid-utility model. Some successful cloud architectures may have little or no established infrastructure or billing systems whatsoever including Peer-to-peer networks like BitTorrent and Skype and volunteer computing like SETI@home. The majority of cloud computing infrastructure currently consists of reliable services delivered through next-generation data centers that are built on computer and storage virtualization technologies. The services may be accessible anywhere in the world, with The Cloud appearing as a single point of access for all the computing needs of data consumers. Commercial offerings may need to meet the quality of service requirements of customers and may offer service level agreements. Open standards and open source software are also critical to the growth of cloud computing. As customers generally do not own the infrastructure, they are merely accessing or renting, they may forego capital expenditure and consume resources as a service, paying instead for what they use. Many cloud computing offerings have adopted the utility computing model which is analogous to how traditional utilities like electricity are consumed, while others are billed on a subscription basis, By sharing "perishable and intangible" computing power between multiple tenants, utilization rates may be improved (as servers are not left idle) which can reduce costs significantly while increasing the speed of application development. A side effect of this approach is that "computer capacity rises dramatically" as customers may not have to engineer for peak loads. Adoption has been enabled by "increased high-speed bandwidth" which makes it possible to receive the same response times from centralized infrastructure at other sites.

For the purposes of the present invention, the term "clustering" is the classification of objects into different groups, or more precisely, the partitioning of a data set into subsets (clusters), so that the data in each subset (ideally) share some common trait—often proximity according to some defined distance measure. Data clustering is a common technique for statistical data analysis, which is used in many fields, including machine learning, data mining, pattern recognition, image analysis and bioinformatics. The computational task of classifying the data set into k clusters is often referred to as k-clustering.

For the purposes of the present invention, the term "coarse grained" is a granularity. A coarse-grained workflow is one that defines broad transformational steps that may result in a wide variety of tailored products.

For the purposes of the present invention, the term "common information model" (CIM) is an open standard that defines how managed elements in an IT environment are represented as a common set of objects and relationships between them. This is intended to allow consistent management of these managed elements, independent of their manufacturer or provider. Within an EGI-SOA of the present invention, the CIM standard is incorporated into the Contextual State Description (CSD), among other metadata representations.

For the purposes of the present invention, the term "complete product" refers to a product including the data, all of the components described in the specification for the product and the contexts assigned to product by an EGI-SOA of the present invention.

For the purposes of the present invention, the term "complex event processing" (CEP) is primarily an event processing concept that deals with the task of processing multiple events from an event cloud with the goal of identifying the meaningful events within the event cloud. CEP employs techniques such as detection of complex patterns of many events, event correlation and abstraction, event hierarchies, and relationships between events such as causality, membership, and timing, and event-driven processes.

For the purposes of the present invention, the term "computer" refers to a machine that manipulates data according to a sequence of instructions stored on a machine readable medium. A computer may include one or more processors that that execute such a sequence of instructions to cause one or more electronic devices, often including the computer itself, to perform a set of operations. The first devices that resemble modern computers date to the mid-20$^{th}$ century (around 1940-1945), although the computer concept and various machines similar to computers existed earlier. Early electronic computers were the size of a large room, consuming as much power as several hundred modern personal computers. Modern computers are based on tiny integrated circuits and are millions to billions of times more capable while occupying a fraction of the space. Today, simple computers may be made small enough to fit into a wristwatch and be powered from a watch battery. Personal computers, in various forms, are icons of the Information Age and are what most people think of as a "computer"; however, the most common form of computer in use today is the embedded computer. Embedded computers are small, simple devices that are used to control other devices—for example, they may be found in machines ranging from fighter aircraft to industrial robots, digital cameras, and children's toys. The ability to store and execute lists of instructions called programs makes computers extremely versatile and distinguishes them from calculators. The Church-Turing thesis is a mathematical statement of this versatility: any computer with a certain minimum capability is, in principle, capable of performing the same tasks that any other computer can perform. Therefore, computers with capability and complexity ranging from that of a personal digital assistant to a supercomputer are all able to perform the same computational tasks given enough time and storage capacity. Computers are indispensable for the analysis of large amounts of data, for tasks that require complex computation, or for the extraction of quantitative information. On the other hand, the human visual cortex is an excellent image analysis apparatus, especially for extracting higher-level information, and for many applications—including medicine, security, and remote sensing—human analysts still cannot be replaced by computers. For this reason, many important image analysis tools such as edge detectors and neural networks are inspired by human visual perception models.

For the purposes of the present invention, the term "computer hardware" is the digital circuitry and physical devices of a computer system, as opposed to computer software, which is stored on a hardware device such as a hard disk. Most computer hardware is not seen by normal users, because it is embedded within a variety of every day systems, such as in automobiles, microwave ovens, electrocardiograph machines, compact disc players, and video games, among many others. A typical personal computer consists of a case or chassis in a tower shape (desktop) and the following parts: motherboard, CPU, RAM, firmware, internal buses (PIC, PCI-E, USB, HyperTransport, CSI, AGP, VLB), external bus controllers (parallel port, serial port, USB, Firewire, SCSI. PS/2, ISA, EISA, MCA), power supply, case control with cooling fan, storage controllers (CD-ROM, DVD, DVD-ROM, DVD Writer, DVD RAM Drive, Blu-ray, BD-ROM, BD Writer, floppy disk, USB Flash, tape drives, SATA, SAS), video controller, sound card, network controllers (modem, NIC), and peripherals, including mice, keyboards, pointing devices, gaming devices, scanner, webcam, audio devices, printers, monitors, etc.

For the purposes of the present invention, the term "computer network" refers to a group of interconnected computers. Networks may be classified according to a wide variety of characteristics. The most common types of computer networks in order of scale include: Personal Area Network (PAN), Local Area Network (LAN), Campus Area Network (CAN), Metropolitan Area Network (MAN), Wide Area Network (WAN), Global Area Network (GAN), Internetwork (intranet, extranet, Internet), and various types of wireless networks. All networks are made up of basic hardware building blocks to interconnect network nodes, such as Network Interface Cards (NICs), Bridges, Hubs, Switches, and Routers. In addition, some method of connecting these building blocks is required, usually in the form of galvanic cable (most commonly category 5 cable). Less common are microwave links (as in IEEE 802.11) or optical cable ("optical fiber").

For the purposes of the present invention, the term "computer software" refers to a general term used to describe a collection of computer programs, procedures and documentation that perform some tasks on a computer system. The term includes application software such as word processors which perform productive tasks for users, system software such as operating systems, which interface with hardware to provide the necessary services for application software, and middleware which controls and co-ordinates distributed systems. Software may include websites, programs, video games, etc. that are coded by programming languages like C, C++, Java, etc. Computer software is usually regarded as anything but hardware, meaning the "hard" are the parts that are tangible (able to hold) while the "soft" part is the intangible objects inside the computer. Computer software is so called to distinguish it from computer hardware, which encompasses the physical interconnections and devices required to store and execute (or run) the software. At the lowest level, software consists of a machine language specific to an individual processor. A machine language consists of groups of binary values signifying processor instructions which change the state of the computer from its preceding state.

For the purposes of the present invention, the term "computer system" refers to any type of computer system that implements software including an individual computer such as a personal computer, mainframe computer, mini-computer, etc. In addition, computer system refers to any type of network of computers, such as a network of computers in a business, the Internet, personal data assistant (PDA), devices such as a cell phone, a television, a videogame console, a compressed audio or video player such as an MP3 player, a DVD player, a microwave oven, etc. A personal computer is one type of computer system that typically includes the following components: a case or chassis in a tower shape (desktop) and the following parts: motherboard, CPU, RAM, firmware, internal buses (PIC, PCI-E, USB, Hyper-Transport, CSI, AGP, VLB), external bus controllers (parallel port, serial port, USB, Firewire, SCSI. PS/2, ISA, EISA, MCA), power supply, case control with cooling fan, storage controllers (CD-ROM, DVD, DVD-ROM, DVD Writer, DVD RAM Drive, Blu-ray, BD-ROM, BD Writer, floppy disk, USB Flash, tape drives, SATA, SAS), video controller, sound card, network controllers (modem, NIC), and peripherals, including mice, keyboards, pointing devices, gaming devices, scanner, webcam, audio devices, printers, monitors, etc.

For the purposes of the present invention, the term "consumer" refers to a consumer of data such as an end user, a software application, a database, a device such as a printer, PDA, etc.

For the purposes of the present invention, the term "conterminous" refers to having a common boundary or enclosed within one common boundary. It is related to the term coterminous. Conterminous is used to describe spatial relationships between various feature sets, including describing a spatial granule or spatial pattern.

For the purposes of the present invention, the term "context" refers to the description of properties, attributes, or the descriptive state of an object or entity. By capturing the state of an object, that same state may be applied to the same object at some point in the future to return the object to the source state or context. This is critical for forensic analysis, workflow automation, and pattern matching and pattern recognition.

For the purposes of the present invention, the term "context-aware computing" refers to a general class of mobile systems that can sense their physical environment, i.e., their context of use, and adapt their behavior accordingly. Such systems are a component of a ubiquitous computing or pervasive computing environment. Three important aspects of context are: (1) where you are; (2) who you are with; and (3) what resources are nearby. Although location is a primary capability, location-aware does not necessarily capture things of interest that are mobile or changing. Context-aware in contrast is used more generally to include nearby people, devices, lighting, noise level, network availability, and even the social situation; e.g., whether you are with your family or a friend from school. Within an EGI-SOA of the present invention, context-aware computing refers to the utilization of W5H metadata to define the spatial, temporal, thematic, and pedigreed context of data and process or workflows to support autonomous processing within a cloud computing environment.

For the purposes of the present invention, the term "context awareness" originated as a term from computer science which sought to deal with linking changes in the environment with computer systems, which are otherwise static. Although it originated as a computer science term, it has also been applied to business theory in relation to business process management issues. In computer science it refers to the idea that computers can both sense, and react based on their environment. Devices may have information about the circumstances under which they are able to operate and based on rules, or an intelligent stimulus, react accordingly. While the computer science community has initially perceived the context as a matter of user location, in the last few years this notion has been considered not simply as a state, but part of a process in which users are involved; thus, sophisticated and general context models have been proposed, to support context-aware applications which use them to (a) adapt interfaces, (b) tailor the set of application-relevant data, (c) increase the precision of information retrieval, (d) discover services, (e) make the user interaction implicit, or (f) build smart environments. Context aware systems are concerned with the acquisition of context (e.g., using sensors to perceive a situation), the abstraction and understanding of context (e.g., matching a perceived sensory stimulus to a context), and application behavior based on the recognized context (e.g., triggering actions based on context).

For the purposes of the present invention, the term "contiguity" refers to a series of things in continuous connection, a grouping of parts in contiguous physical contact. The concept was first set out in the Law of Contiguity, one of Aristotle's Laws of Association, which states that things which occur in proximity to each other in time or space are readily associated.

For the purposes of the present invention, the term "continuous time" refers to an unbroken span of time comprised of time instants. In the time domain, the value of a signal or function is known for all real numbers. Within a time granule, a time instant is described as a singular point in time with an associated precision. On a different system implementation capable of supporting greater descriptive precision, the lower precision time instant would convert into a time period with an interval defined at the limits of the describing precision.

For the purposes of the present invention, the term "coordinate reference system (CRS)" refers to a coordinate system that is related to the real world by a datum. For geodetic and vertical datums, it will be related to the Earth.

For the purposes of the present invention, the term "coordinate system" refers to a set of mathematical rules for specifying how coordinates are to be assigned to points For the purposes of the present invention, the term "coordinate" refers to one of a sequence of n numbers designating the position of a point in n-dimensional space. In a coordinate reference system, the numbers must be qualified by units.

For the purposes of the present invention, the term "coordinate system" is set of mathematical rules for specifying how coordinates are to be assigned to points.

For the purposes of the present invention, the term "Coordinated Universal Time (UTC)" describes International Atomic Time (TAI) with leap seconds added at irregular intervals to compensate for the Earth's slowing rotation. Leap seconds are used to allow UTC to closely track UT1, which is mean solar time at the Royal Observatory, Greenwich. The difference between UTC and UT1 cannot exceed 0.9 seconds, so if high precision is not required the general term Universal Time (UT) (without a suffix) may be used. In casual use, Greenwich Mean Time (GMT) is the same as UTC and UT1. Owing to the ambiguity of whether UTC or UT1 is meant, and because timekeeping laws usually refer to UTC, GMT is avoided in careful writing. Time zones around the world are expressed as positive or negative offsets from UTC. Local time is UTC plus the time zone offset for that location, plus an offset (typically +1) for daylight saving time, if in effect. As a time scale, UTC divides up time into days, hours, minutes and seconds. Days are conventionally identified using the Gregorian calendar, but Julian day numbers can also be used. Each day contains 24 hours and each hour contains 60 minutes, but the number of seconds in a minute can be 60, or sometimes 61 or 59. Most UTC days contain exactly 86,400 SI seconds, with exactly 60 seconds in each minute. However, since the mean solar day is slightly longer than 86,400 SI seconds, occasionally the last minute of a UTC day will have 61 seconds. The extra second is called a leap second. It accounts for the grand total of the extra length (about 2 milliseconds each) of all the mean solar days since the previous leap second. The last minute of a UTC day is allowed to contain 59 seconds to cover the remote possibility of the Earth rotating faster, but that has not yet been necessary since UTC was introduced. The irregular day lengths mean that fractional Julian days do not work properly with UTC. UTC is the time system used for many Internet and World Wide Web standards. In particular, the Network Time Protocol, Which is designed to synchronize the clocks of many computers over the Internet (usually to that of a known accurate atomic clock), uses UTC. UTC is also the time system used in aviation, referred to as Zulu. Weather reports, flight plans, air traffic control clearances, and maps all use UTC to avoid confusion about time zones and daylight saving time. Because of time dilation, a standard clock not on the geoid, or in rapid motion, will not maintain synchronicity with UTC. Therefore, telemetry from clocks with a known relation to the geoid is used to provide UTC, when required, on locations such as that of spacecraft. UTC is a discontinuous timescale, so it is not possible to compute the exact time interval elapsed between two UTC timestamps without consulting a table that describes how many leap seconds occurred during that interval. Therefore, many scientific applications that require precise measurement of long (multi-year) intervals use TAI instead. TAI is also commonly used by systems that cannot handle leap seconds. A fixed 19-second offset from TAI also gives GPS time. Within an EGI-SOA of the present invention, UTC is the default time system, unless the system is configured to provide near real-time SLAB.

For the purposes of the present invention, the term "coterminous" means having the same or coincident boundaries in a spatial sense or having a coextensive in scope or duration in a temporal sense. This term is related to the term conterminous. Within an EUI-SOA of the present invention, coterminous is a term used to describe relationships between features sets within a spatial pattern or granule or a temporal granule.

For the purposes of the present invention, the term "data" means the reinterpretable representation of information in a formalized manner suitable for communication, interpretation, or processing. With respect to an EGI-SOA of the present invention, data represents any information source that is external to an EGI-SOA. Since all information within an EGI-SOA may be managed within the SDI and characterized with context, describes a source that is external to an EGI-SOA with inconsistent metadata and/or context. Although one type of common type data is a computer file, data may also be streaming data, a web service, etc. The term "data" is used to refer to one or more pieces of data.

For the purposes of the present invention, the term "database" refers to a structured collection of records or data that is stored in a computer system. The structure is achieved by organizing the data according to a database model. The model in most common use today is the relational model. Other models such as the hierarchical model and the network model use a more explicit representation of relationships (see below for explanation of the various database models). A computer database relies upon software to organize the storage of data. This software is known as a database management system (DBMS). Database management systems are categorized according to the database model that they support. The model tends to determine the query languages that are available to access the database. A great deal of the internal engineering of a DBMS, however, is independent of the data model, and is concerned with managing factors such as performance, concurrency, integrity, and recovery from hardware failures. In these areas there are large differences between products.

For the purposes of the present invention, the term "database management system (DBMS)" represents computer software designed for the purpose of managing databases based on a variety of data models. A DBMS is a complex set of software programs that controls the organization, storage, management, and retrieval of data in a database. DBMS are categorized according to their data structures or types. It is a set of prewritten programs that are used to store, update and retrieve a Database.

For the purposes of the present invent the term "database product" database compatible product that has been loaded into a database.

For the purposes of the present invention, the term "data model" is the specification of the information required to describe the structure and organization of data, including geolocation of data, a valid time description of the data and of the way it is packaged with that data.

For the purposes of the present invention the term "data source" refers to any type data source, including data and services.

For the purposes of the present invention, the term "data storage medium" or "data storage device" refers to any medium or media on which a data may be stored for use by a computer system. Examples of data storage media include floppy disks, Zip™ disks, CD-ROM, CD-R, CD-RW, DVD, DVD-R, memory sticks, flash memory, hard disks, optical disks, etc. Two or more data storage media acting similarly to a single data storage medium may be referred to as a "data storage medium" for the purposes of the present invention.

For the purposes of the present invention, the term "discrete time" is non-continuous time. Sampling at non-continuous times results in discrete time samples described as time intervals. For example, a newspaper may report the price of crude oil once every 24 hours. In general, the sampling period in discrete-time systems is constant, but in some cases non-uniform sampling is also used. In contrast to continuous-time systems, where the behavior of a system is often described by a set of linear differential equations, discrete-time systems are described in terms of difference equations. Most Monte Carlo simulations utilize a discrete-timing method, either because the system cannot be efficiently represented by a set of equations, or because no such set of equations exists.

For the purposes of the present invention, the term "dynamic request" refers to a consumer requesting one or more tailor products and embodiments of the EGI-SOA of the present invention providing the one or more tailored products in response to the consumer's request. A dynamic request is a "pull" communication from the consumer to the EGI-SOA.

For the purposes of the present invention, the term "Electronic Business using eXtensible Markup Language (ebXML)" refers to a family of XML based standards sponsored by OASIS and UN/CEFACT whose mission is to provide an open, XML-based infrastructure that enables the global use of electronic business information in an interoperable, secure, and consistent manner by all trading partners. The ebXML architecture is a unique set of concepts; part theoretical and part, implemented in the existing ebXML standards work. While the ebXML standards adopted by ISO and OASIS seek to provide formal XML-enabled mechanisms that can be implemented directly, the ebXML architecture is focused on concepts and methodologies that can be more broadly applied to allow practitioners to better implement e-business solutions. The ebRIM specification is used as the basis for discovery records within Catalog registries within an EGI-SOA. For the purposes of the present invention, the term "endianness" refers to the byte (and sometimes bit) ordering used to represent some kind of data. Typical cases are the order in which integer values are stored as bytes in computer memory (relative to a given memory addressing scheme) and the transmission order over a network or other medium. When specifically talking about bytes, endianness is also referred to simply as byte order. Generally speaking, endianness is a particular attribute of a representation format—which byte of a UTF-16 character would be stored at the lower address, etc. Byte order is an important consideration in network programming, since two computers with different byte orders may be communicating. Failure to account for varying endianness when writing code for mixed platforms can lead to bugs that can be difficult to detect For the purposes of the present invention, the term "enclave" refers to a portioned set of processors within a computing cloud.

For the purposes of the present invention, the term "enterprise architecture" refers to a term used to describe the practice of documenting the elements of business strategy, business case, business model and supporting technologies, policies and infrastructures that make up an enterprise. There are multiple architecture frameworks that describe enterprise architecture. Enterprise Architecture can be described as: (1) documentation describing the structure and behavior of an enterprise and its information systems, usually in a number of architecture domains; or (2) a process for describing an enterprise and its information systems and planning changes to improve the integrity and flexibility of the enterprise. It is the highest level, widest scope, longest term kind of architecture related to how information systems support the business processes of an enterprise. Thus, it is distinguishable from solution architecture and software architecture or enterprise application architecture, though it shares some general principles and techniques with architecture at those lower levels. It describes the logical organization of business processes and IT infrastructure. It reflects the integration and standardization requirements of the firm's operating model. Practitioners are called "enterprise architects". The primary purpose of creating an enterprise architecture is to ensure that business strategy and IT investments are aligned. As such, enterprise architecture allows traceability from the business strategy down to the underlying technology. Enterprise architecture is the formal organization (design or layout) of the components, structures and processes required or relevant to the attainment of the goals and visions invested or envisioned in an enterprise. Often used in the context of information system applications in an enterprise, enterprise architecture is really concerned with all aspects of an enterprise with information technology as a sub-context. Enterprise architecture involves developing an architecture framework to describe a series of "current", "intermediate" and "target" reference architectures and applying them to align change within the enterprise. Another set of terms for these are "as-is", "migration plan" and "to-be". A subtly different alternative approach (and use of terminology) begins with the development of an unconstrained "should be" strategic architecture which may be thought of as a "stretch view". The target architecture then becomes an intermediate step towards this idealized, unconstrained strategic architecture for a specific change initiative. It results from the real-world trade-offs between the "should be" desired state versus affordability, business policies and so on. Therefore, under this approach there is a subtle but important difference in the meaning of "target architecture": it is not the ultimate goal, but rather an achievable, planned state with a delivery date. A possible advantage of this approach is that the trade-offs become more explicit than if one simply deals with "as is" and "to be", without considering the "should be" stretch view provided by the strategic architecture. Reference architecture is often confused with strategic architecture, but encompasses the strategic architecture (the point on the horizon) and the other strategic building blocks, which may of course have become realized, that act as points of reference for each individual change initiative.

For the purposes of the present invention, the term "enterprise architecture framework" defines how to organize the structure and views associated with an enterprise architecture. Because the discipline of enterprise architecture is so broad, and because the enterprises it describes tend to be large and complex, the models associated with the discipline also tend to be large and complex. To manage this scale and complexity, an architecture framework defines complementary projections of the enterprise model called "views", where each view is meaningful to different system stakeholders.

For the purposes of the present invention, the term "epoch" represents an instant in time chosen as the origin of a particular era. This epoch then serves as a reference point from which time is measured. Time measurement units are counted from the epoch so that the date and time of events can be specified unambiguously, Events taking place before the epoch can be dated by counting negatively from the epoch, though in pragmatic periodization practice, epochs are defined for the past, and another epoch is used to start the next era, therefore serving as the ending of the older preceding era. The whole purpose and criteria of such definitions is to clarify and coordinate scholarship about a period, at times, across disciplines. Epochs are generally chosen to be convenient or significant by a consensus of the time scale's initial users, or by authoritarian fiat. The epoch moment or date is usually defined by a specific clear event, condition, or criteria—the epoch event or epoch criteria—from which the period or era or age is usually characterized or described. In computing, the time kept internally by a computer system is usually expressed as the number of time units that have elapsed since a specified epoch, which is nearly always specified as midnight Universal Time on some particular date. Software timekeeping systems vary widely in the granularity of their time units; some systems may use time units as large as a day, while others may use nanoseconds. For example, for an epoch date of midnight UTC on Jan. 1, 1900, and a time unit of a second, the time of midnight UTC on Jan. 2, 1900 is represented by the number 86400, the number of seconds in one day. These representations of time are mainly for internal use and are rarely shown to an end user. If an end user interaction with dates and times is required, the software will nearly always convert this internal number into a date and time representation that is comprehensible to humans, such as that specified by ISO 8601.

For the purposes of the present invention, the term "era" refers to a commonly used word for long period of time. When used in science, for example geology, eras denote clearly defined periods of time of arbitrary but well defined length, such as for example the Mesozoic era, delimited by a start event and an end event. When used in social history, eras may for example denote a period of some monarch's reign. With respect to an EGI-SOA, an era may be described as a chrononym that encompasses related time granules.

For the purposes of the present invention, the term "event" refers to an object in time or the instantiations of a property in an object.

For the purposes of the present invention, the term "exabyte (EB)" refers to a unit of information or computer storage, derived from the SI prefix exa-, equal to one quintillion bytes. The term exbibyte, using a binary prefix, has been proposed as an unambiguous reference to the latter value.

For the purposes of the present invention, the term "Extensible Markup Language (XML)" refers to a general-purpose specification for creating custom markup languages. It is classified as an extensible language because it allows its users to define their own elements. Its primary purpose is to help information systems share structured data, particularly via the Internet, and it is used both to encode documents and to serialize data. It started as a. simplified subset of the Standard Generalized Markup Language (SGML), and is designed to be relatively human-legible. By adding semantic constraints, application languages can be implemented in XML. These include XHTML, RSS, MathML, GraphML, Scalable Vector Graphics, MusicXML, and thousands of others. Moreover, XML is sometimes used as the specification language for such application languages. XML is recommended by the World Wide Web Consortium (W3C). It is a fee-free open standard. The recommendation specifies both the lexical grammar and the requirements for parsing.

An EGI-SOA of the present invention embraces a number of XML standards and semantics.

For the purposes of the present invention, the term "Extract, Transform, and Load (ETL)" refers to a process in data management that involves extracting data from outside sources, transforming the data to fit business needs (which can include quality levels), and loading the into the end target, i.e. the data warehouse.

For the purposes of the present invention, the term "extranet" refers to a network or internetwork that is limited in scope to a single organization or entity but which also has limited connections to the networks of one or more other usually, but not necessarily, trusted organizations or entities (e.g., a company's customers may be given access to some part of its intranet creating in this way an extranet, while at the same time the customers may not be considered 'trusted' from a security standpoint). Technically, an extranet may also be categorized as a CAN, MAN, WAN, or other type of network, although, by definition, an extranet cannot consist of a single LAN; it must have at least one connection with an external network. Extranets may or may not have connections to the Internet. If connected to the Internet, the extranet is normally protected from being accessed from the Internet without proper authorization. The Internet is not considered to be a part of the extranet, although it may serve as a portal for access to portions of an extranet. In one embodiment, an EGI-SOA of the present invention may be designed to access the Internet, defined extranets, and/or intranets.

For the purposes of the present invention, the term "File Transfer Protocol (FTP)" refers to a network protocol used to transfer data from one computer to another through a network such as the Internet. FTP is a file transfer protocol for exchanging and manipulating files over a TCP computer network. A FTP client may connect to a FTP server to manipulate files on that server. As there are many FTP client and server programs available for different operating systems, FTP is a popular choice for exchanging files independent of the operating systems involved.

For the purposes of the present invention, the term "fine grained" is a granularity. A fine-grained workflow is one that defines several well defined transformational steps that may result in a narrow variety of tailored products.

For the purposes of the present invention, the term "full virtualization" refers to a virtualization technique used to implement a certain kind of virtual machine environment: one that provides a complete simulation of the underlying hardware. The result is a system in which all software capable of execution on the raw hardware can be run in the virtual machine. In particular, this includes all operating systems. This is different from other forms of virtualization—which allow only certain or modified software to run within a virtual machine. A key challenge for full virtualization is the interception and simulation of privileged operations, such as I/O instructions. The effects of every operation performed within a given virtual machine must be kept within that virtual machine—virtual operations cannot be allowed to alter the state of any other virtual machine, the control program, or the hardware. Some machine instructions can be executed directly by the hardware, since their effects are entirely contained within the elements managed by the control program, such as memory locations and arithmetic registers. But other instructions that would "pierce the virtual machine" cannot be allowed to execute directly; they must instead be trapped and simulated. Such instructions either access or affect state information that is outside the virtual machine. Full virtualization has proven highly successful for a) sharing a computer system among multiple users, b) isolating users from each other (and from the control program) and c) emulating new hardware to achieve improved reliability, security and productivity.

For the purposes of the present invention, the term "generalization" refers to a foundational element of logic and human reasoning. Generalization posits the existence of a domain or set of elements, as well as one or more common characteristics shared by those elements. As such, it is the essential basis of all valid deductive inference. Generalization is employed within thematic context descriptions. The process of verification is necessary to determine whether a generalization holds true for any given situation. The concept of generalization has broad application in many related disciplines, sometimes having a specialized context-specific meaning. As such, generalization is the opposite of specialization. For instance, animal is a generalization of bird because every bird is an animal, and there are animals which are not birds (dogs, for instance). This kind of generalization versus specialization (or particularization) is reflected in either of the contrasting words of the word pair hypernym and hyponym. A hyponym as a generic stands for a class or group of equally-ranked items, such as tree does for beech and oak; or ship for cruiser and steamer. Whereas a hyponym is one of the items included in the generic, such as lily and daisy are included in flower, and bird and fish in animal. A hypernym superordinate to a hyponym, and a hyponym is subordinate to hypernym.

For the purposes of the present invention, the term "geocoding" refers to the assignment of alphanumeric codes or coordinates to geographically reference data provided in a textual format. Examples are the two letter country codes and coordinates computed from addresses.

For the purposes of the present invention, the term "geodetic coordinate system" refers to a coordinate system in which position is specified by geodetic latitude, geodetic longitude, and (in the three-dimensional case) ellipsoidal height.

For the purposes of the present invention, the term "geodetic datura" refers to a datum describing the relationship of a coordinate system to the Earth. In most cases, the geodetic datum includes an ellipsoid description.

For the purposes of the present invention, the term "geographic information system (GIS)" refers to an arrangement of computer hardware, software, and geographic data that people interact with to integrate, analyze, and visualize the data; identify relationships, patterns, and trends; and find solutions to problems. The system is designed to capture, store, update, manipulate, analyze, and display the geographic information. A GIS is typically used to represent maps as data layers that can be studied and used to perform analyses. This term is also known as geospatial information system or geospatial intelligence system.

For the purposes of the present invention, the term "geolocation" refers to a mathematical correspondence between position in a grid coordinate system and position in a geodetic coordinate system, For the purposes of the present invention, the term "georeferenceable dataset" refers to a dataset with some additional information such as control points or orientation data that enable the process of georeferencing For the purposes of the present invention, the term "georeferencing" refers to a process of determining the relation between the position of data in the instrument coordinate system and its geographic or map location.

For the purposes of the present invention, the term "global area networks (GAN)" represents a term that has not yet been standardized, In the context of an EGI-SOA of the present invention, a GAN is a model for supporting mobile communications across an arbitrary number of wireless LANs, satellite coverage areas, etc. The key challenge in mobile communications is "handing off" the user communications from one local coverage area to the next. In IEEE Project 802, this involves a succession of terrestrial Wireless local area networks (WLAN). Because an EGI-SOA may be specifically designed to work with diverse and agile sensor networks that may span the globe, a GAN is used to describe the scope and complexity of IP networks supported by EGI-SOA.

For the purposes of the present invention, the term "governance" describes the set of processes, practices, policies, laws and institutions affecting the way a body is directed, administered or controlled. Governance also includes the relationships among the many stakeholders involved and the goals for which the body is governed. Corporate governance and IT governance are very similar. In Corporate governance, the principal stakeholders are the shareholders, management and the board of directors. Other stakeholders include employees, suppliers, customers, banks and other lenders, regulators, the environment and the community at large. IT governance implies a system in which all stakeholders, including the board, internal customers, and in particular departments such as finance, have the necessary input into the decision making process. This prevents IT from independently making and later being held solely responsible for poor decisions. Both corporate and IT governance policies may be employed by the governance manager of the EGI-SOA of the present invention. The rising interest in IT governance is partly due to compliance initiatives, for instance Sarbanes-Oxley in the USA and Basel II in Europe, as well as the acknowledgment that IT projects can easily get out of control and profoundly affect the performance of an organization. The primary goals for information technology governance are to (1) assure that the investments in IT generate business value, and (2) mitigate the risks that are associated with IT. This can be done by implementing an organizational structure with well-defined roles for the responsibility of information, business processes, applications, infrastructure, including the association with context. As such, EGI-SOA embraces governance policies as a foundational component of the architecture solution.

For the purposes of the present invention, the term "granularity" refers to a measure of the size of the components, or descriptions of components, that make up a system. Granularity is the relative size, scale, level of detail or depth of penetration that characterizes an object or activity. It is the "extent to which a larger entity is subdivided. For example, a yard broken into inches has finer granularity than a yard broken into feet." Systems of, or description in terms of, large components are called coarse grained, and systems of small components are called fine-grained; here coarse and fine are descriptions of the granularity of the system, or the granularity of description of the system.

For the purposes of the present invention, the term "Greenwich Mean Time (GMT)" is mean time on the Prime Meridian. Mean time was derived by observing the true solar time and then adding to it a calculated correction, the equation of time, which smoothed the known irregularities caused by the ellipticity of Earth's orbit and the non-perpendicularity of Earth's axis to the plane of Earth's orbit around the sun. GMT used to be an international time standard before the advent of precise atomic clocks. GMT no longer exists as a time standard, although the name GMT is often incorrectly used to denote Universal Time. Greenwich Mean Time also used to be the international standard for civil time. In that sense as well, GMT technically no longer exists, although GMT is still often used as a synonym for UTC, which is the current international standard. The only sense in which Greenwich Mean Time officially still exists is as the name of a time zone.

For the purposes of the present invention, the term "grid" refers to a network composed of two or more sets of curves in which the members of each set intersect the members of the other sets in an algorithmic way. The curves partition a space into grid cells.

For the purposes of the present invention, the term "grid computing" refers to a grid a form of distributed computing whereby a "super and virtual computer" is composed of a cluster of networked, loosely-coupled computers, acting in concert to perform very large tasks.

For the purposes of the present invention, the term "grid coordinate system" refers to a coordinate system in which position is specified by location on the curves that compose a grid.

For the purposes of the present invention, the term "grid coordinates" refers to a sequence of two or more numbers specifying a position with respect to its location on a grid.

For the purposes of the present invention, the term "gridded data" refers to data whose attribute values are positions on a grid coordinate system.

For the purposes of the present invention, the term "ground control point (GCP)" refers to a point for which both grid coordinates and a geographic location are available. GCPs are a form of control data used by AGIWs, such as AutoOrtho™.

For the purposes of the present invention, the term "hardware" refers to the physical artifacts of a technology. It may also mean the physical components of a computer system, in the form of computer hardware.

For the purposes of the present invention, the term "holonym" refers to the whole described by parts or members.

For the purposes of the present invention, the term "holonymy" refers to a semantic relationship that defines the relationship between a term denoting the whole and a term denoting a part of, or a member of, the whole. That is, 'X' is a holonym of 'Y' if Ys are parts of Xs, or 'X' is a holonym of 'Y' if Ys are members of Xs. For example, 'tree' is a holonym of 'bark', of 'trunk' and of 'limb. Holonymy is the opposite of meronymy.

For the purposes of the present invention, the term "Hypertext Transfer Protocol (HTTP)" refers to a communications protocol for the transfer of information on the Internet. Its use for retrieving inter-linked text documents (hypertext) led to the establishment of the World Wide Web. HTTP development was coordinated by the World Wide Web Consortium and the Internet Engineering Task Force (IETF), culminating in the publication of a series of Request for Comments (RFCs), most notably RFC 2616 (June 1999), which defines HTTP/1.1, the version of HTTP in common use. HTTP is a requestlresponse standard between a client and a server. A client is the end-user, the server is the web site. The client making an HTTP request—using a web browser, spider, or other end-user tool—is referred to as the user agent. The responding server—which stores or creates resources such as HTML files and images—is called the origin server. In between the user agent and origin server may be several intermediaries, such as proxies, gateways, and tunnels. HTTP is not constrained to using TCP/IP and its supporting layers, although this is its most popular application on the Internet. Indeed HTTP can be "implemented on top of any other protocol on the Internet, or on other networks. HTTP only presumes a reliable transport; any protocol that provides such guarantees can be used."Typically, an HTTP client initiates a request. It establishes a. Transmission Control Protocol (TCP) connection to a particular port on a host (port 80 by default; see List of TCP and UDP port numbers). An HTTP server listening on that port waits for the client to send a request message. Upon receiving the request, the server sends back a status line, such as "HTTP/1.1 200 OK", and a message of its own, the body of which is perhaps the requested file, an error message, or some other information. The reason that HTTP uses TCP and not UDP is because much data must be sent for a webpage, and TCP provides transmission control, presents the data in order, and provides error correction. Resources to be accessed by HTTP are identified using Uniform Resource Identifiers (URIs) (or, more specifically, Uniform Resource Locators (URLs)) using the http: or https URI schemes.

For the purposes of the present invention, the term "hypervisor" is a virtualization platform that allows multiple operating systems to run on a host computer at the same time. This term is related to the terms bare-metal hypervisor and native hypervisor.

For the purposes of the present invention, the term "hypothesis" consists either of a suggested explanation for a phenomenon (an event that is observable),or of a reasoned proposal suggesting a possible correlation between multiple phenomena. The term derives from the Greek, hypotithenai meaning "to put, under" or "to suppose," The scientific method requires that one can test a scientific hypothesis. Scientists generally base such hypotheses on previous observations or on extensions of scientific theories. Even though the words "hypothesis" and "theory" are often used synonymously in common and informal usage, a scientific hypothesis is not same as scientific the theory. In common usage in the $21^{st}$ century, a hypothesis refers to a provisional idea whose merit requires evaluation. For proper evaluation, the framer of a hypothesis needs to define specifics in operational terms. A hypothesis requires more work by the researcher in order to either confirm or disprove it. In due course, a confirmed hypothesis may become part of a theory or occasionally may grow to become a theory itself Normally, scientific hypotheses have the form of a mathematical model. Sometimes, but not always, one can also formulate them as existential statements, stating that some particular instance of the phenomenon under examination has some characteristic and causal explanations, which have the general form of universal statements, stating that every instance of the phenomenon has a particular characteristic. Any useful hypothesis will enable predictions by reasoning (including deductive reasoning). It might predict the outcome of an experiment in a laboratory setting or the observation of a phenomenon in nature. The prediction may also invoke statistics and only talk about probabilities. The scientific method involves experimentation on the basis of hypotheses in order to answer questions and explore observations. Within the EGI-SOA of the present invention, hypotheses are generated as part of the probabalistic evaluation of models, patterns, and/or workflow paths used to determine optimal (constrained by context) alternatives.

For the purposes of the present invention, the term "image" refers to any type of image, where an image is comprised of rasters or pixels that may be defined in multiple types and/or within multiple bands or dimensions. Examples of images include: still images, a digital images, a video image, computer-generated or enhanced images, etc.

For the purposes of the present invention, the term "image analysis" refers to the extraction of meaningful information from images; mainly from digital images by means of digital image processing techniques. Image analysis tasks can be as simple as reading bar coded tags or as sophisticated as identifying a person from their face.

For the purposes of the present invention, the term "image coordinates" refers to the coordinates with respect to location on a digital image For the purposes of the present invention, the term "image plane" refers to the plane where the film or the imaging sensor is physically located and in which the image is in focus.

For the purposes of the present invention, the term "image point" is the point on the mage which uniquely represents an object point.

For the purposes of the present invention, the term "imagery" refers to gridded data whose attribute values are a numerical representation of the physical parameter measured by an instrument from which the data are transmitted.

For the purposes of the present invention, the term "inclusive disjunction" refers to the logical "or".

For the purposes of the present invention, the term "instrument coordinate system" refers to a coordinate reference system in which the datum relating the coordinates to the real world is defined by the configuration of a measuring instrument.

For the purposes of the present invention, the term "International Atomic Time (TAI)" refers to a high-precision atomic time standard that tracks proper time on Earth's geoid. It is the principal realization of Terrestrial Time, and the basis for Coordinated Universal Time (UTC) which is used for civil timekeeping all over the Earth's surface.

For the purposes of the present invention, the term "Internet" is a global system of interconnected computer networks that interchange data by packet switching using the standardized Internet Protocol Suite (TCP/IP). It is a "network of networks" that consists of millions of private and public, academic, business, and government networks of local to global scope that are linked by copper wires, fiber-optic cables, wireless connections, and other technologies. The Internet carries various information resources and services, such as electronic mail, online chat, file transfer and file sharing, online gaming, and the inter-linked hypertext documents and other resources of the World Wide Web (WWW).

For the purposes of the present invention, the term "Internet protocol (IP)" refers to a protocol used for communicating data across a packet-switched internetwork using the Internet Protocol Suite (TCP/IP). IP is the primary protocol in the Internet Layer of the Internet Protocol Suite and has the task of delivering datagrams (packets) from the source host to the destination host solely based on its address. For this purpose the Internet Protocol defines addressing methods and structures for datagram encapsulation. The first major version of addressing structure, now referred to as Internet Protocol Version 4 (Ipv4) is still the dominant protocol of the Internet, although the successor, Internet Protocol Version 6 Ipv6) is actively deployed world-wide. In one embodiment, an EGI-SOA of the present invention may be specifically designed to seamlessly implement both of these protocols.

For the purposes of the present invention, the term "Internet protocol suite (commonly TCP/IP)" refer the set of communications protocols used for the Internet and other similar networks. It is named from two of the most important protocols in it: the Transmission Control Protocol (TCP) and the Internet Protocol (IP), which were the first two networking protocols defined in this standard. Today's IP networking represents a synthesis of several developments that began to evolve in the 1960s and 1970s, namely the Internet and LANs (Local Area Networks), which, together with the invention of the World Wide Web, have revolutionized computing. The Internet Protocol Suite, like many protocol suites, may be viewed as a set of layers. Each layer solves a set of problems involving the transmission of data, and provides a well-defined service to the upper layer protocols based on using services from some lower layers. Upper layers are logically closer to the user and deal with more abstract data, relying on lower layer protocols to translate data into forms that can eventually be physically transmitted. The TCP/IP model consists of four layers (RFC 1122). From lowest to highest, these are the Link Layer, the Internet Layer, the Transport Layer, and the Application Layer. Examples of the protocols included in the link layer include: ARP, RARP, OSPF (Ipv4/Ipv6), IS-IS, NDP. Examples of the protocols included in the Internet layer include: IP (Ipv4, Ipv6) ICMP, IGMP, and ICMPv6. Examples of the protocols included in the transport layer include: TCP, UDP, DCCP, SCTP, IL, RUDP, and RSVP. Examples of the protocols included in the application layer include: DNS, TFTP, TLS/SSL, FTP, Gopher, HTTP, IMAP, IRC, NNTP, POP3, SIP, SMTP, SNMP, SSH, TELNET, ECHO, RTP, PNRP, rlogin, and ENRP. As a robust solutions architecture, CGI-SOA takes advantage of all four layers of the TCP/IP model.

For the purposes of the present invention, the term "intranet" refers to a set of networks, using the Internet Protocol and IP-based tools such as web browsers and file transfer applications that are under the control of a single administrative entity. That administrative entity closes the intranet to all but specific, authorized users. Most commonly, an intranet is the internal network of an organization. A large intranet will typically have at least one web server to provide users with organizational information. Intranets may or may not have connections to the Internet. If connected to the Internet, the intranet is normally protected from being accessed from the Internet without proper authorization. The Internet is not considered to be a part of the intranet.

For the purposes of the present invention, the term "ISO 8601" refers to an international standard for date and time representations issued by the International Organization for Standardization (ISO). Specifically, the standard is titled "Data elements and interchange formats—Information interchange—Representation of dates and times." The signature feature of ISO 8601 date and time representations is the ordering of date and time values from the most to the least significant or, in plain terms, from the largest (the year) to the smallest (the second).

For the purposes of the present invention, the term "ISO/TC 211" refers to a standard technical committee formed within ISO, tasked with covering the areas of digital geographic information (such as used by geographic information systems) and geomatics. It is responsible for preparation of a series of International Standards and Technical Specifications numbered in the range starting at 19101. The ISO/TC 211 work is closely related to the efforts of the Open Geospatial Consortium, and the two organizations have a working arrangement that often results in identical or nearly-identical standards often being adopted by both organizations.

For the purposes of the present invention, the term "knowledge" refers to the following: (1) expertise, and skills acquired by a person through experience or education; the theoretical or practical understanding of a subject, (2) what is known in a particular field or in total; facts and information or (3) awareness or familiarity gained by experience of a fact or situation. Knowledge acquisition involves complex cognitive processes: perception, learning, communication, association and reasoning. The term knowledge is also used to mean the confident understanding of a subject with the ability to use it for a specific purpose if appropriate. Within an EGI-SOA of the present invention, knowledge is captured within business processes, conveyed within contextual metadata, and mined for perspective.

For the purposes of the present invention, the term "local area network (LAN)" refers to a network covering a small geographic area, like a home, office, or building. Current LANs are most likely to be based on Ethernet technology. The cables to the servers are typically on Cat 5e enhanced cable, which will support IEEE 802.3 at 1 Gbit/s. A wireless LAN may exist using a different IEEE protocol, 802.11b, 802.11g or possibly 802.11n. The defining characteristics of LANs, in contrast, to WANs (wide area networks), include their higher data transfer rates, smaller geographic range, and lack of a need for leased telecommunication lines. Current Ethernet or other IEEE 802.3 LAN technologies operate at speeds up to 10 Gbit/s.

For the purposes of the present invention, the term "logical conjunction" refers to the logical "and".

For the purposes of the present invention, the term "logical disjunction" refers to the logical "or".

For the purposes of the present invention, the term "made available" refers to data being in a form suitable for use by the data management system of the present invention. Data may be made available to the data management system in a variety of ways. For example, data may be made available by storing on an optical storage medium and inserting the optical storage medium into the appropriate drive. For the purposes of the present invention, the term "meronym" refers to the part or member of a whole.

For the purposes of the present invention, the term "meronymy" refers to a semantic relationship that denotes a constituent part of, or a member of something. That is, X is a meronym of Y if Xs are parts of Y(s), or X is a meronym of Y if Xs are members of Y(s). For example, 'finger' is a meronym of 'hand' because a finger is part of a hand. Similarly 'wheel' is a meronym of 'automobile'. Meronymy is the opposite of holonymy. A closely related concept is that of mereology, which specifically deals with part/whole relations and is used in logic. It is formally expressed in terms of first-order logic. A meronym means part of a whole. A word denoting a subset of what another word denotes is a hyponym. In knowledge representation languages, meronymy is often expressed as "part-of".

For the purposes of the present invention, the term "metadata" refers to data about data or describing the context of data. Metadata represents a foundational capability within an EGI-SOA of the present invention. Most tradition system implementation attempt to enforce the manual creation of metadata, which limits the context in which processes can be automated. Thus within an EGI-SOA of the present invention, all metadata is automatically generated to ensure correctness and completeness of metadata with EGI-SOA. In fact, any data that does not have a corresponding context is not introduced into the SDI.

For the purposes of the present invention, the term "methodology" refers to the analysis of the principles of methods, rules, and postulates employed by a discipline; the systematic study of methods that are, can be, or have been applied within a discipline; or a particular procedure or set of procedures.

For the purposes of the present invention, the term "metropolitan area network (MAN)" refers to a network that connects two or more Local Area Networks or Campus Area Networks together but does not extend beyond the boundaries of the immediate town/city. Routers, switches and hubs are connected to create a MAN.

For the purposes of the present invention, the term "native hypervisor" refers to a bare-metal hypervisor.

For the purposes of the present invention, the term "network bridge" refers to an electronic device that connects multiple network segments at the data link layer (layer 2) of the OSI model. Bridges do not promiscuously copy traffic to all ports, as hubs do, but learns which MAC addresses are reachable through specific ports. Once the bridge associates a port and an address, it will send traffic for that address only to that port. Bridges do send broadcasts to all ports except the one on which the broadcast was received. This term is also known as a bridge.

For the purposes of the present invention, the term "network hub" refers to an electronic device that contains multiple ports. When a packet arrives at one port, it is copied to all the ports of the hub for transmission. When the packets are copied, the destination address in the frame does not change to a broadcast address. It does this in a rudimentary way, it simply copies the data to all of the Nodes connected to the hub. This term is also known as hub.

For the purposes of the present invention, the term "network interface card (NIC)" refers to a piece of computer hardware designed to allow computers to communicate over a computer network. It provides physical access to a networking medium and often provides a low-level addressing system through the use of MAC addresses. It allows users to connect to each other either by using cables or wirelessly. This term is also known as network card or network adapter.

For the purposes of the present invention, the term "network repeater" refers to an electronic device that receives a signal and retransmits it at a higher level or higher power, or onto the other side of an obstruction, so that the signal can cover longer distances without degradation. In most twisted pair Ethernet configurations, repeaters are required for cable runs longer than 100 meters away from the computer. This term is also known as repeater.

For the purposes of the present invention, the term "Network Time Protocol (NTP)" refers to a protocol for distributing the Coordinated Universal Time (UTC) by means of synchronizing the clocks of computer systems over packet-switched, variable-latency data networks. NTP uses UDP port 123 as its transport layer. It is designed particularly to resist the effects of variable latency by using a jitter buffer. NTP is one of the oldest Internet protocols still in use (since before 1985). Note that NTP provides just the UTC time, and no information about time zones or daylight saving time. This information is outside its scope and must be obtained separately (most systems allow it to be set manually). NTP is not related to the much simpler DAY TIME (RFC 867) and TIME (RFC 868) protocols. NTP uses Marzullo's algorithm with the UTC time scale, including support for features such as leap seconds. NTPv4 can usually maintain time to within 10 milliseconds (1/100 s) over the public Internet, and can achieve accuracies of 200 microseconds (1/5000 s) or better in local area networks under ideal conditions. The operational details of NTP are illustrated in RFC 778, RFC 891, RFC 956, RFC 958, and RFC 1305. The current reference implementation is version 4 (NTPv4); however, as of 2005, only versions up to 3 (1992) have been documented in RFCs. A less complex form of NTP that does not require storing information about previous communications is known as the Simple Network Time Protocol or SNTP. It is used in some embedded devices and in applications where high accuracy timing is not required. See RFC 1361, RFC 1769, RFC 2030, and RFC 4330. Within an EGI-SOA of the present invention Cloud Computing environment, NTP is only used where performance-based SLAs do not require responses close to the boundary conditions of this protocol.

For the purposes of the present invention, the term "object" refers to a thing, an entity, or a being. An object is something that can have properties and bear relations to other objects. On this account, properties and relations (as well as propositions) are not included among objects, but are explicitly contrasted with them, as falling into a different logical category, Sets and universals are also perhaps not objects on this account. Objects do not include abstract objects, but only physical bodies located somehow in space and time. Thus, within an EGI-SOA of the present invention, all data, information, products, processes or workflows can be described as objects. An object is either abstract or concrete. Abstract objects are sometimes called abstracta (sing. Abstractum) and concrete objects are sometimes called concreta (sing. Concretum). Within computer science, an object represents an allocated region of storage. Since programming languages use variables to access objects, the terms object and variable are often used interchangeably. However, until memory is allocated, an object does not exist.

For the purposes of the present invention, the term "object point" refers to a point in the object space that is imaged by a sensor. NOTE In remote sensing and aerial photogrammetry an object point is a point defined in the ground coordinate reference system, For the purposes of the present invention, the term "objective" refers to an optical element or sensor that receives light from the object and forms the first or primary image of an optical system For the purposes of the present invention, the term "observation" refers to either an activity of a living being (such as a human), which senses and assimilates the knowledge of a phenomenon, or the recording of data using instruments.

For the purposes of the present invention, the term "observation offering" refers to a logical grouping of observations offered by a service that are related in some way, For the purposes of the present invention, the term "observed value" refers to a value describing a natural phenomenon, which may use one of a variety of scales including nominal, ordinal, ratio and interval.

For the purposes of the present invention, the term "open source software (OSS)" refers to computer software for which the human-readable source code is made available under a copyright license (or arrangement such as the public domain) that meets the Open Source Definition (see). This permits users to use, change, and improve the software, and to redistribute it in modified or unmodified form. It is very often developed in a public, collaborative manner. While open source software began as a marketing campaign for free software, it has come the most prominent example of open source development and often compared to user generated content.

For the purposes of the present invention, the term "open source" refers to a development methodology, which offers practical accessibility to a product's source (goods and knowledge). Some consider open source as one of various possible design approaches, while others consider it a critical strategic element of their operations. Before open source became widely adopted, developers and producers used a variety of phrases to describe the concept; the term open source gained popularity with the rise of the Internet, which provided access to diverse production models, communication paths, and interactive communities. The open source model of operation and decision making allows concurrent input of different agendas, approaches and priorities, and differs from the more closed, centralized models of development. The principles and practices are commonly applied to the development of source code for software that is made available for public collaboration, and it is usually released as open-source software.

For the purposes of the present invention, the term "or" refers to a logical operator that results in true whenever one or more of its operands are true. This term is also known as logical disjunction or inclusive disjunction.

For the purposes of the present invention, the term "Oracle Database" refers to a relational database management system (RDBMS) produced and marketed by Oracle Corporation. Oracle Enterprise Database 11 g forms the basis of the EGI-SOA SDI, with various additional products and packages, such as Oracle Spatial, For the purposes of the present invention, the term "Oracle Spatial" is a separately licensed option component of the Oracle Database. Oracle Spatial aids users in managing geographic and location-data in a native type within an Oracle database, potentially supporting a wide range of applications—from automated mapping/facilities-management and geographic information systems (GIS), to wireless location services and location-enabled e-business. Oracle Spatial provides a SQL schema (named by default "MDSYS", where "MD" stands for "Multi Dimensional") and functions that facilitate the storage, retrieval, update, and query of collections of spatial features in an Oracle database. Oracle Spatial consists of: a schema that prescribes the storage, syntax, and semantics of supported geometric data types; spatial indexing system; operators, functions, and procedures for performing area-of-interest queries, spatial join queries, and other spatial analysis operations; functions and procedures for utility and tuning operations; a topology data model for working with data about nodes, edges, and faces in a topology; a network data model for representing capabilities or objects (modeled as nodes and links) in a network; a GeoRaster feature to store, index, query, analyze, and deliver GeoRaster data (raster image and gridded data and its associated metadata). The spatial component of a spatial feature consists of the geometric representation of its shape in some coordinate space—referred to as its "geometry".

For the purposes of the present invention, the term "orchestration" refers to the automated arrangement, coordination, and management of complex computer systems, middleware, and services. Orchestration is often discussed as having an inherent intelligence (trait) or even implicitly autonomic control, but in reality, orchestration is largely the effect of automation or systems deploying elements of control theory. This usage of orchestration is often discussed in the context of virtualization, provisioning, and dynamic datacenter topics. A somewhat different usage relates to the process of coordinating an exchange of information through web service interactions within a SOA.

For the purposes of the present invention, the term "Organization for the Advancement of Structured Information Standards (OASIS)" refers to a global consortium that drives the development, convergence and adoption of e-business and web service standards. Members of the consortium decide how and what work is undertaken through an open, democratic process. Technical work is carried out under the following categories: Web Services, e-Commerce, Security, Law & Government, Supply Chain, Computing Management, Application Focus, Document-Centric, XML Processing, Conformance/Interop, and Industry Domains.

For the purposes of the present invention, the term "partially ordered set" refers to the intuitive concept of an ordering, sequencing, or arrangement of the elements of a set. A poser consists of a set together with a binary relation that describes, for certain pairs of elements in the set, the requirement that one of the elements must precede the other. Within an EGI-SOA of the present invention, the members of various context descriptions are comprised of partially ordered sets. This term is also known as a poser, For the purposes of the present invention, the term "pattern" refers to a theme of recurring events or objects, sometimes referred to as elements or members of a set. These elements repeat in a predictable manner. A pattern can be matched against to observed objects to select that subset of objects from within the chaos associated with a cloud of those objects. In this sense, patterns are used to extract order or structure from unstructured constrainers, such as an event cloud. Pattern matching is the act of checking for the presence of the constituents of a pattern, whereas the detecting for underlying patterns is referred to as pattern recognition. EGI-SOA utilizes pattern recognition technology to mine and/or monitor object clouds looking for naturally occurring patterns and/or relationships. In this sense, EGI-SOA can mine the context of a system, once enough a priori and a posteriori observations have been collected and characterized by the system.

For the purposes of the present invention, the term "pattern matching" refers to the act of checking for the presence of the constituents of a given pattern. In contrast to pattern recognition, the pattern is rigidly specified. Such a pattern concerns conventionally either sequences or tree structures. Pattern matching is used to test whether things have a desired structure, to find relevant structure, to retrieve the aligning parts, and to substitute the matching part with something else. Sequence (or specifically text string) patterns are often described using regular expressions (i.e. backtracking) and matched using respective algorithms. Sequences can also be seen as trees branching for each element into the respective element and the rest of the sequence, or as trees that immediately branch into all elements.

For the purposes of the present invention, the term "pattern recognition" refers to a sub-topic of machine learning. It may be defined as the act of taking in raw data and taking an action based on the category of the data. Most applications of pattern recognition, such as those in remote sensing image analysis, are about methods for supervised learning and unsupervised learning. Pattern recognition aims to classify data (patterns) based on either a priori knowledge or on statistical information extracted from the patterns. The patterns to be classified are usually groups of measurements or observations, defining points in an appropriate multidimensional space. This is in contrast to pattern matching, where the pattern is rigidly specified.

For the purposes of the present invention, the term "pedigree" refers to the constituents parts that comprise the present instance the described source data or product. The pedigree represents the recipe that describe the sources, methods, and context utilized to generate the present form of data or product. Ideally, the pedigree is deterministic, in that given the same sources, methods, and context, the exact resultant product can be recreated.

For the purposes of the present invention, the term "pedigree service" refers to a service that takes the defined pedigree recipe of a product and some alternative ingredients (sources, methods, or contexts) and creates a new product without needing to specify all of the intermediate steps used to create the original product. In this sense, a pedigree service makes it very easy to rapidly and repeatedly create product variants.

For the purposes of the present invention, the term "periodization" refers to categorization or division of time into discrete named blocks. The result is a descriptive abstraction that provides a useful handle on periods of time with relatively stable characteristics.

For the purposes of the present invention, the term "personal area network (PAN)" refers to a computer network used for communication among computer devices close to one person. Some examples of devices that are used in a PAN are printers, fax machines, telephones, PDAs or scanners. The reach of a PAN is typically within about 20-30 feet (approximately 6-9 meters). Personal area networks may be wired with computer buses such as USB and FireWire. A wireless personal area network (WPAN) can also be made possible with network technologies such as IrDA and Bluetooth. A PAN may represents the access point to data sources or computing resources within an EGI-SOA of the present invention.

For the purposes of the present invention, the term "petabyte (PB)" refers to a unit of information or computer storage, derived from the SI prefix peta-, equal to one quadrillion bytes, or 1,000 terabytes. When used with byte multiples, the prefix may indicate a power of either 1000 or 1024, so the exact number may be either: (a) 1,000,000,000,000,000; $1000^5$, or $10^{15}$ bytes or (b) 1,125,899,906,842,624; $1024^5$, or $2^{50}$ bytes. The term "pebibyte", using a binary prefix, has been proposed as an unambiguous reference to the latter value.

For the purposes of the present invention, the term "phenomenon" refers to any observable event.

For the purposes of the present invention, the term "platform coordinate reference system" refers to the coordinate reference system in which positions on the sensor platform are defined For the purposes of the present invention, the term "point" refers to a 0-dimensional object. A point is described with respect to an associated coordinate system. For instance, in Euclidean geometry, a point within a 2-dimensional space is denoted by an ordered pair of ordinates (x,y i and in a 3-dimensional space, as an ordered triplet (x,y,z). In a 4-dimensional space, points are frequently denoted as a 3-dimensional triplet moving through time t (x,y,z,t).

For the purposes of the present invention, the term "poset" refers to a partially ordered set.

For the purposes of the present invention, the term "Precision Time Protocol (PTP)" refers to a time-transfer protocol defined in the IEEE 1588-2002 standard that allows precise synchronization of networks (e.g., Ethernet). Accuracy within the nanosecond range can be achieved with this protocol when using hardware generated timestamps. IEEE 1588 is designed to fill a niche not well served by either of the two dominant protocols, NTP and GPS. IEEE 1588 is designed for local systems requiring very high accuracies beyond those attainable using NTP. It is also designed for applications that cannot bear the cost of a GPS receiver at each node, or for which GPS signals are inaccessible. IEEE 1588-2008, also known as IEEE 1588 Version 2, is an updated version of the standard that was approved in March 2008.

For the purposes of the present invention, the term "probability" refers to the likelihood or chance that something is the case or will happen. Probability theory is used extensively in areas such as statistics, mathematics, science and philosophy to draw conclusions about the likelihood of potential events and the underlying mechanics of complex systems.

For the purposes of the present invention, the term "product" refers to one or more pieces of data that represent a singular logical piece of information and/or described by a product specification. A product includes data and other components, such as contexts. For example, an ESRI Shapefile commonly refers to a collection of files with ".shp", ".shx", ".dbf", and other extensions on a common prefix name (e.g., "lakes.*"). This collection of files constitutes a single shapefile product. A product is a collection of one or more data sources that are related by either a designated or a recognized product specification or a discernable file attribute, such as MIME type or file name suffix.

For the purposes of the present invention, the term "product variant" refers to product created from the tailored pedigree of another product.

For the purposes of the present invention, the term "profile" is a set of product input requirements. Profiles stored in the data management system of the present invention allow the data management to recognize particular file types.

For the purposes of the present invention, the term "quality of service (QoS)" refers to resource reservation control mechanisms rather than the achieved service quality. Quality of service is the ability to provide different priority to different applications, users, or data flows, or to guarantee a certain level of performance to a data flow. For example, a required bit rate, delay, jitter, packet dropping probability and/or bit error rate may be guaranteed. Quality of service guarantees are important if the network capacity is insufficient, especially for real-time streaming multimedia applications such as the automated orthorectification of full motion video in near real-time.

For the purposes of the present invention, the term "random-access memory (RAM)" refers to a type of computer data storage. Today it takes the form of integrated circuits that allow the stored data to be accessed in any order, i.e. at random. The word random thus refers to the fact that any piece of data can be returned in a constant time, regardless of its physical location and whether or not it is related to the previous piece of data. This contrasts with storage mechanisms such as tapes, magnetic discs and optical discs, which rely on the physical movement of the recording medium or a reading head. In these devices, the movement takes longer than the data transfer, and the retrieval time varies depending on the physical location of the next item. The word RAM is mostly associated with volatile types of memory (such as DRAM memory modules), where the information is lost after the power is switched off. However, many other types of memory are RAM as well, including most types of ROM and a kind of flash memory called NOR-Flash.

For the purposes of the present invention, the term "read-only memory (ROM)" refers to a class of storage media used in computers and other electronic devices. Because data stored in ROM cannot be modified (at least not very quickly or easily), it is mainly used to distribute firmware (software that is very closely tied to specific hardware, and unlikely to require frequent updates). In its strictest sense, ROM refers only to mask ROM (the oldest type of solid state ROM), which is fabricated with the desired data permanently stored in it, and thus can never be modified. However, more modern types such as EPROM and flash EEPROM can be erased and re-programmed multiple times; they are still described as "read-only memory" because the reprogramming process is generally infrequent, comparatively slow, and often does not permit random access writes to individual memory locations.

For the purposes of the present invention, the term "real-time database" refers to a processing system designed to handle workloads whose state is constantly changing. This differs from traditional databases containing persistent data, mostly unaffected by time. For example, a stock market changes very rapidly and is dynamic. The graphs of the different markets appear to be very unstable and yet a database has to keep track of current values for all of the markets of the New York Stock Exchange. Real-time processing means that a transaction is processed fast enough for the result to come back and be acted on right away. Real-time databases are useful for accounting, banking, law, medical records, multi-media, process control, reservation systems, and scientific data analysis. As computers increase in power and can store more data, they are integrating themselves into our society and are employed in many applications. Real-time databases are traditional databases that use an extension to give the additional power to yield reliable responses. They use timing constraints that represent a certain range of values for which the data are valid. This range is called temporal validity. A conventional database cannot work under these circumstances because the inconsistencies between the real world objects and the data that represents them are too severe for simple modifications. An effective system needs to be able to handle time-sensitive queries, return only temporally valid data, and support priority scheduling. To enter the data in the records, often a sensor or an input device monitors the state of the physical system and updates the database with new information to reflect the physical system more accurately. When designing a real-time database system, one should consider how to represent valid time, how facts are associated with real-time system, Also, consider how to represent attribute values in the database so that process transactions and data consistency have no violations. When designing a system, it is important to consider what the system should do when deadlines are not met. For example, an air-traffic control system constantly monitors hundreds of aircraft and makes decisions about incoming flight paths and determines the order in which aircraft should land based on data such as fuel, altitude, and speed. If any of this information is late, the result could be devastating. To address issues of obsolete data, the timestamp can support transactions by providing clear time references.

For the purposes of the present invention, the term "rectified grid" refers to a grid for which there is an affine relationship between the grid coordinates and the coordinates of an external coordinate reference system. If the coordinate reference system is related to the Earth by a datum, the grid is a georectified grid.

For the purposes of the present invention, the term "referenceable grid" refers to a grid associated with a transformation that can be used to convert grid coordinate values to values of coordinates referenced to an external coordinate reference system. If the coordinate reference system is related to the Earth by a datum, the grid is a georeferenceable grid.

For the purposes of the present invention, the term "relational database management system (RDBMS)" refers to a database management system (DBMS) that is based on the relational model as introduced by E. F. Codd. Most popular commercial and open source databases currently in use are based on the relational model. A short definition of an RDBMS may be a DBMS in which data is stored in the form of tables and the relationship among the data is also stored in the form of tables.

For the purposes of the present invention, the term "remote sensing" refers to the collection and interpretation of information about an object without being in physical contact with the object, For the purposes of the present invention, the term "representational state transfer (REST)" refers to a style of software architecture for distributed hypermedia systems such as the World Wide Web. As such, it is not strictly a method for building what are sometimes called "web services." The terms "representational state transfer" and "REST" were recently introduced in 2000 and have since come into widespread use in the networking community. REST strictly refers to a collection of network architecture principles which outline how resources are defined and addressed. The term is often used in a looser sense to describe any simple interface which transmits domain-specific data over HTTP without an additional messaging layer such as SOAP or session tracking via HTTP cookies. These two meanings can conflict as well as overlap. Systems which follow the REST principles are often referred to as "RESTful", such as RESTful web services.

For the purposes of the present invention, the term "rollback" refers to an operation Which returns the database to some previous state. Rollbacks are important for database integrity, because they mean that the database can be restored to a clean copy even after erroneous operations are performed. They are crucial for recovering from database server crashes; by rolling back any transaction which was active at the time of the crash, the database is restored to a consistent state. In SQL, ROLLBACK is a command that causes all data changes since the last BEGIN WORK, or START TRANSACTION to be discarded by the relational database management system (RDBMS), so that the state of the data is "rolled back" to the way it was before those changes were made. A ROLLBACK statement will also release any existing savepoints that may be in use. In most SQL dialects, ROLLBACKs are connection specific. This means that if two connections are made to the same database, a ROLLBACK made in one connection will not affect any other connections. This is vital for proper concurrency. The rollback feature is usually implemented with a transaction log, but can also be implemented via multiversion concurrency control. A cascading rollback occurs in database systems when a transaction (T1) causes a failure and a rollback must be performed. Other transactions dependent on T1's actions must also be rolled back due to T1's failure, thus causing a cascading effect.

For the purposes of the present invention, the term "router" refers to a networking device that forwards data packets between networks using headers and forwarding tables to determine the best path to forward the packets. Routers work at the network layer of the TCP/IP model or layer 3 of the OSI model. Routers also provide interconnectivity between like and unlike media devices. A router is connected to at least two networks, commonly two LANs or WANs or a LAN and its ISP's network.

For the purposes of the present invention, the term "scientific method" refers to a body of techniques for investigating phenomena, acquiring new knowledge, or correcting and integrating previous knowledge. To be termed scientific, a method of inquiry must be based on gathering observable, empirical and measurable evidence subject to specific principles of reasoning. A scientific method consists of the collection of data through observation and experimentation, and the formulation and testing of hypotheses. Although procedures vary from one field of inquiry to another, identifiable features distinguish scientific inquiry from other methodologies of knowledge. Scientific researchers propose hypotheses as explanations of phenomena, and design experimental studies to test these hypotheses. These steps must be repeatable in order to dependably predict any future results. Theories that encompass wider domains of inquiry may bind many hypotheses together in a coherent structure. This in turn may help form new hypotheses or place groups of hypotheses into context. Among other facets shared by the various fields of inquiry is the conviction that the process be objective to reduce a biased interpretation of the results. Another basic expectation is to document, archive and share all data and methodology so they are available for careful scrutiny by other scientists, thereby allowing other researchers the opportunity to verify results by attempting to reproduce them. This practice, called full disclosure, also allows statistical measures of the reliability of these data to be established.

For the purposes of the present invention, the term "scientific technique" refers to any systematic method to obtain information of a scientific nature or to obtain a desired material or product.

For the purposes of the present invention, the term "sensor" refers to a collector and/or producer of information and/or data. A sensor can be an instrument or a living organism (e.g. a person). For example, a sensor may be a GPS device, a thermometer, a mobile phone, an individual writing a report, etc. A sensor is an entity capable of observing a phenomenon and returning an observed value. For example, a mercury thermometer converts the measured temperature into expansion and contraction of a liquid which can be read on a calibrated glass tube. A thermocouple converts temperature to an output voltage which can be read by a voltmeter. For accuracy, all sensors are often be calibrated against known standards.

For the purposes of the present invention, the term "sensor model" refers to a description of the radiometric and geometric characteristics of the sensor including position and orientation of the instrument measuring the data For the purposes of the present invention, the term "sensor system" refers to an image coordinate system defined by the pixels of the sensor For the purposes of the present invention, the term "service" refers to a discretely defined set of contiguous and autonomous business or technical functionality. OASIS defines service as "a mechanism to enable access to one or more capabilities, where the access is provided using a prescribed interface and is exercised consistent with constraints and policies as specified by the service description." In EGI-SOA a service may be a program that can be autonomously discovered and executed remotely. Web service definitions are written in WSDL.

For the purposes of the present invention, the term "service level agreement (SLA)" refers to a part of a service contract or policy where the level of service is formally defined. In practice, the term SLA is sometimes used to refer to the contracted delivery time (of the service) or performance. An SLA is a formally negotiated agreement between two parties. It is a contract that exists between customers and their service provider, client or between service providers. It records the common understanding about services, priorities, responsibilities, guarantee, and such—collectively, the level of service. Within an EGI-SOA of the present invention, SLAs are used to facilitate the scheduling and utilization of processing resources within the Computing Cloud. In some instances, a complex workflow that requires an extremely long transition may have an SLA that returns less complete results in a more timely manner to provide some results to downstream consumers in a more timely manner than waiting for the full resolution result to be produced. An example of an SLA is a reduced resolution result from complex gridded or raster analysis. A reduced resolution result may be implemented within a compression scheme such as quadtree, where the gridded raster values are aggregated into increasing larger grid elements, with summarized results. If this result represented an image, the intermediate results delivered by the various SLAs would include first grainy images that would progressively refine themselves until the full resolution of the image was displayed.

For the purposes of the present invention, the term "service-oriented architecture (SOA)" refers to a methodology for systems development and integration where functionality is grouped around business processes and packaged as interoperable services. SOA also describes IT infrastructure which allows different applications to exchange data with one another as they participate in business processes. The aim is a loose coupling of services with operating systems, programming languages and other technologies which underlie applications. SOA separates functions into distinct units, or services, which are made accessible over a network in order that they can be combined and reused in the production of business applications. These services communicate with each other by passing data from one service to another, or by coordinating an activity between two or more services. SOA concepts are often seen as built upon and evolving from older concepts of distributed computing and modular programming.

For the purposes of the present invention, the term "sidereal time" refers to time by the stars. A sidereal day is the time it takes Earth to make one revolution with respect to the stars. A sidereal day is approximately 23 hours 56 minutes 4 seconds. It cannot be used as a time standard because stars have a slight proper motion, so the exact period depends on which star are we observing.

For the purposes of the present invention, the term "skill" refers to the learned capacity or talent to carry out predetermined results often with the minimum outlay of time, energy, or both. Skills can often be divided into domain-general and domain-specific skills. For example, in the domain of work, some general skills would include time management, teamwork and leadership, self motivation and others, whereas domain-specific skills would be useful only for a certain job. Skill often depends on numerous variables.

For the purposes of the present invention, the term "SOAP (formerly Simple Object Access Protocol)" refers to a protocol for exchanging XML-based messages over computer networks, normally using HTTP/HTTPS. SOAP forms the foundation layer of the web services protocol stack providing a basic messaging framework upon which abstract layers can be built. As a layman's example of how SOAP procedures can be used, a correctly formatted call could be sent to a Web Service enabled web site—for example, a house price database—with the data ranges needed for a search. The site could then return a formatted XML document with all the required results and associated data (prices, location, features, etc). These could then be integrated directly into a third-party site. There are several different types of messaging patterns in SOAP, but by far the most common is the Remote Procedure Call (RPC) pattern, in which one network node (the client) sends a request message to another node (the server) and the server immediately sends a response message to the client. SOAP is the successor of XIII-RPC, though it borrows its transport and interaction neutrality and the envelope/header/body from elsewhere, probably from WDDX.

For the purposes of the present invention, the term "software" refers to procedural programs to schedule instruction streams on computers, as opposed to hardware, referring to the computers themselves and other physical components.

For the purposes of the present invention, the term "software as a service (SaaS)" refers to a model of software deployment where an application is hosted as a service provided to customers across the Internet or intranet, All of the services within an EGI-SOA of the present invention are considered SaaS, because they are scheduled and executed remotely on cloud computing resources. Thus, EGI-SOA represents a next generation ASP model, leveraging automation and context-aware, complex event-driven processing.

For the purposes of the present invention, the term "solution architecture" refers to the practice of documenting the elements of business strategy, business case, business model and supporting technologies, policies and infrastructures that describe the structure and behavior of a solution to a problem. Solution architecture is a kind of architecture that aims to address specific problems and requirements, usually through the design of specific information systems or applications. Solution architecture is often considered a subset of an enterprise architecture, where the solution described may be all or part of what an enterprise architect's migration plan delivers. The solution might also be unrelated to any such plan. Solution architecture often leads to software architecture work and technical architecture work, and often contains elements of those. A Solutions Architect is often but not always focused on technical architecture and the meeting of non-functional requirements, often in the context of deploying specific applications.

For the purposes of the present invention, the term "solution" refers to a product, service, or combination of both which is said to solve a business or consumer's problem.

For the purposes of the present invention, the term "space" refers to the boundless extent within which matter is physically extended and objects and events have positions relative to one another. Physical space is often conceived in three linear dimensions, although modem physicists usually consider it, with time, to be part of the boundless four-dimensional continuum known as spacetime. In mathematics spaces with different numbers of dimensions and with different underlying structures can be examined.

For the purposes of the present invention, the term "Spatial Data infrastructure (SDI)" refers to the relevant base collection of technologies, policies and tradecraft that facilitate the availability of and access to spatial data within a defined enterprise. The SDI provides a basis for spatial data discovery, evaluation, access, exploitation, processing, and dissemination throughout all levels of government, the commercial sector, the non-profit sector, academia, and by citizens in general.

For the purposes of the present invention, e term "specialization" refers to an important way to generate propositional knowledge, by applying general knowledge, such as the theory of gravity, to specific instances, such as "when I release this apple, it will fall to the floor". Specialization is the opposite of generalization.

For the purposes of the present invention, the term "staging area" refers to a file system that is inside the security enclave of a data management system where the files are in the same form as when the files were made available to the data management system. A staging area is on the edge of EGI-SOA.

For the purposes of the present invention, the term "stereo model" refers to a pair of two images where at least parts of the images portray the same object. NOTE Three-dimensional coordinates can be derived from a stereo model.

For the purposes of the present invention, the term "standing request" refers to a prior consumer request that is stored by an EGI-SOA and that causes the EGI-SOA to provide to provide the consumer with one or more tailored products when the EGI-SOA receives data or tailored products meeting the criteria of the consumer's request. A dynamic request is a prior request for a one or more potential "push" communications from the EGI-SOA to the consumer in the future.

For the purposes of the present invention, the term "supervised learning" refers to a machine learning technique for learning a function from training data. The training data consist of pairs of input objects (typically vectors), and desired outputs. The output of the function can be a continuous value (called regression), or can predict a class label of the input object (called classification). The task of the supervised learner is to predict the value of the function for any valid input object after having seen a number of training examples (i.e. pairs of input and target output). To achieve this, the learner has to generalize from the presented data to unseen situations in a "reasonable" way (see inductive bias). (Compare with unsupervised learning.) The parallel task in human and animal psychology is often referred to as concept learning.

For the purposes of the present invention, the term "survey ground control point" refers to a point for which an identifier and geographic locations are available. This term is also known as survey-GCP.

For the purposes of the present invention, the term "swath" refers to a pattern produced when an instrument scans approximately perpendicular to a moving point For the purposes of the present invention, the term "switch" refers to a device that performs IP switching. Specifically, it forwards and filters OSI layer 2 datagrams (chunk of data communication) between ports (connected cables) based on the Mac-Addresses in the packets. This is distinct from a hub in that it only forwards the datagrams to the ports involved in the communications rather than all ports connected. Strictly speaking, a switch is not capable of routing traffic based on IP address (layer 3) which is necessary for communicating between network segments or within a large or complex LAN. Some switches are capable of routing based on IP addresses but are still called switches as a marketing term. A switch normally has numerous ports with the intention that most or the entire network be connected directly to a switch, or another switch that is in turn connected to a switch.

For the purposes of the present invention, the term "tailored product" refers to a product defined by a specification that includes variable parameters. At runtime, the various variable parameters are specified through some policy based process and the resultant process is scheduled for execution. Within an automated sensor data production system, such as an EGI-SOA system, the variable parameters may either be specified by a consumer requesting the product or a standing governance policy specified by a community of interest (COI) that provides default parameters base on an observed system context. For instance, an AGIW, such as AutoOrtho™, is triggered within an EGI-SOA of the present invention from a complex event related to a new geospatial image product becoming available within the SDI. Thus, there is a one-to-one relationship between the source geospatial image product in the SDI and the AGIW AutoOrtho™, but based on tailoring logic, there may be multiple variants requested from this one-to-one relationship via configurable parameters. In the case of two different COIs that want ortho-images created, COI "A" may define a business rule that uses control data from the "best" available sources, which might include the product derived from CIB, AutoOrtho™ results, or satellite imagery vendors that have produced their own ortho-image format, COI "B" may mandate a policy that only CIB (the definitive controlled imagery base standard for the DoD/IC) may be used. For the given source geospatial image, when two different corresponding controlled image base products are available within the SDI to drive an automated orthorectification workflow, such as AutoOrtho™, then two different ortho-image resultant products are generated, derived from different controlled image base support data. Thus, the tailoring of products within a dynamic computing context such as EGI-SOA happens because this system is context aware and all data and processes, including requests, include context. Because context specifies how the tailoring can occur and under what conditions that can be determined within the operating environment of EGI-SOA, standing requests (fully autonomous workflows) and dynamic requests (a consumer's request now), both can support the creation of tailored products within the parameters set by system governance without adversely affecting the other. In the above example, the one-to-one relationship between triggering source product and the transforming workflow is broken by creating two similar but different results. This illustrates the primary requirements within an EGI-SOA of the present invention to manage all data within the SDI, to associate context with everything with EGI-SOA, and to abstract data access through a service interface which facilitates the automated and remote discovery of relevant data and/or services based on the defined context. Thus, even though two seemingly redundant ortho-images are created, the SDI always delivers the relevant ortho-image product to the corresponding COI, based on the governance policies. Even when multiple COIs have access to each other's data within the SDI, governance provides the mechanism and business logic to qualify and quantify which redundant product is most relevant for a given purpose. This is frequently conveyed through semantic qualifiers, such as "best", "latest", or "most accurate".

For the purposes of the present invention, the term "tailored workflow" refers to a codified and orchestrated workflow that follows a functionality template and produces a tailored product through the definition of variable parameters included within the workflow specification. An AGIW is an example of a tailored workflow template that can produce a tailored workflow for an automated orthorectification workflow, such as AutoOrtho™, and an automated mosaicing workflow, such as AutoMosaic™. AutoOrtho™ orthorectifies a single source geospatial image product and AutoMosaic™ seamlessly mosaics a collection of Ortho-images within either a specified boundary or the coterminous boundary defined by the collective extents of the source images.

For the purposes of the present invention, the term "taxonomy" refers to the practice and science of classification. Taxonomies, or taxonomic schemes, are composed of taxonomic units known as taxa (singular taxon), or kinds of things that are arranged frequently in a hierarchical structure. Typically they are related by subtype-supertype relationships, also called parent-child relationships. In such a subtype-supertype relationship the subtype kind of thing has by definition the same constraints as the supertype kind of thing plus one or more additional constraints. For example, car is a subtype of vehicle. So any car is also a vehicle, but not every vehicle is a car. Therefore, a thing needs to satisfy more constraints to be a car than to be a vehicle.

For the purposes of the present invention, the term "taxonym" refers to a taxon of a taxonomy.

For the purposes of the present invention, the term "technology" refers to a manner of accomplishing a task especially using technical processes, methods, or knowledge.

For the purposes of the present invention, the term "temporal database" refers to a database with built-in time aspects, e.g. a temporal data model and a temporal version of structured query language. More specifically the temporal aspects usually include valid time and transaction time. These attributes go together to form bi-temporal data. Valid time denotes the time period during which a fact is true with respect to the real world. Transaction time is the time period during which a fact is stored in the database. Bi-temporal data combines both Valid and Transaction Time.

For the purposes of the present invention, the term "temporal pattern" refers to the span of time. The pattern may include time granules or chrononyms. The chrononyms may be relative, absolute, or abstract references to time. An example of a relative chrononym is "yesterday" or "tomorrow". An example of an absolute chronym is "12 Sep. 2008". An example of an abstract chrononym is "business week" or "Monday through Friday, 8:00 AM to 5:00 PM, excluding Federal holiday".

For the purposes of the present invention, the term "time" refers to a component of a measuring system used to sequence events, to compare the durations of events and the intervals between them, and to quantify the motions of objects. Time is considered one of the few fundamental quantities and is used to define quantities such as velocity. An operational definition of time, wherein one says that observing a certain number of repetitions of one or another standard cyclical event (such as the passage of a free-swinging pendulum) constitutes one standard unit such as the second, has a high utility value in the conduct of both advanced experiments and everyday affairs of life. Temporal measurement has occupied scientists and technologists, and was a prime motivation in navigation and astronomy. Periodic events and periodic motion have long served as standards for units of time. Examples include the apparent motion of the sun across the sky, the phases of the moon, the swing of a pendulum, and the beat of a heart. Currently, the international unit of time, the second, is defined in terms of radiation emitted by cesium atoms.

For the purposes of the present invention, the term "time domain" refers to the analysis of mathematical functions, or physical signals, with respect to time. In the time domain, the value of a signal or function is known for all real numbers in the case continuous time, or at various separate instants in the case of discrete time.

For the purposes of the present invention, the term "time granule" refers to a set of time instants perceived as a non-decomposable temporal entity when used to describe a phenomenon or in general when used to timestamp a set of data. A granule can be composed of a single instant, a set of contiguous instants (time interval), a set of non-contiguous instants, a set of non-contiguous intervals, or any combination of the above. The members of a time granule are referenced to a defined epoch, which establishes the where the member are referenced to absolute time, as defined by ISO 8601:2004, or relative time, such as "now", "today", "tomorrow", or "yesterday".

For the purposes of the present invention, the term "time instant" refers to a point in time separating two states. Measured as an infinitesimal span of time and referenced to an epoch.

For the purposes of the present invention, the term "time interval" refers to the duration between two events or occurrences of similar events in time. It is related to the mathematical concept of interval in that the interval contains all of the points (time instances) of time between the two events. An interval is described by two end points as time instants ($T_{begin}$, $T_{end}$) referenced to an epoch. This term is also known as time period.

For the purposes of the present invention, the term "time period" refers to a time interval.

For the purposes of the present invention, the term "time standard" refers to any officially-recognized specification for measuring time: either the rate at which time passes; or points in time; or both. For example, the standard for civil time specifies both time intervals and time-of-day. A time scale specifies divisions of time. Standardized time measurements are done using a clock by counting the periods of some cyclic change, which may be either the changes of a natural phenomenon or of an artificial machine. Time standards based on Earth's rotation include: true solar time, sidereal time, Greenwich Mean Time (GMT), and Universal Time (UT). Constructed time standards include international Atomic Time (TAI), Coordinated Universal Time (UTC), and standard time or civil time. In one embodiment, an EGI-SOA of the present invention may be capable of utilizing any defined time standard.

For the purposes of the present invention, the term "timeline" refers to the occurrence of events throughout a defined span of time or time granule.

For the purposes of the present invention, the term "timestamp" refers to a sequence of characters, denoting the date and/or time at which a certain event occurred. This data is usually presented in a consistent format, allowing for easy comparison of two different records and tracking progress over time; the practice of recording timestamps in a consistent manner along with the actual data is called timestamping. Timestamps are typically used for logging events, in which case each event in a log is marked with a timestamp. In file systems, timestamp may mean the stored date/time of creation or modification of a file. The International Organization for Standardization (ISO) has defined ISO 8601 which standardizes timestamps.

For the purposes of the present invention, the term "time standard" refers to any officially-recognized specification for measuring time: either the rate at which time passes; or points in time; or both. For example, the standard for civil time specifies both time intervals and time-of-day For the purposes of the present invention, the term "timetable" refers to an organized list or schedule providing information about a series of arranged events. In particular, timetables include the specific times at which planned events will take place.

For the purposes of the present invention, the term "toponym" refers to the name of a geographic locality or place name.

For the purposes of the present invention, the term "toponymic service" refers to a service that converts a toponym into a spatial reference or vice versa. For instance, the toponym Washington, D.C. would transform into either a geocode or a polygon describing the authoritative boundary of Washington, D.C.

For the purposes of the present invention, the term "transaction time (TT)" a concept used in temporal databases. It denotes the time period during which a database fact is/was stored in the database.

For the purposes of the present invention, the term "transmission control protocol (TCP)" refers to one of the core protocols of the Internet Protocol Suite. TCP is so central that the entire suite is often referred to as "TCP/IP." Whereas IP handles lower-level transmissions from computer to computer as a message makes its way across the Internet, TCP operates at a higher level, concerned only with the two end systems, for example a Web browser and a Web server. In particular, TCP provides reliable, ordered delivery of a stream of bytes from one program on one computer to another program on another computer. Besides the Web, other common applications of TCP include e-mail and file transfer. Among its management tasks, TCP controls message size, the rate at which messages are exchanged, and network traffic congestion.

For the purposes of the present invention, the term "true solar time" refers to time based on the solar day, which is the period between one solar noon and the next. A solar day is approximately 24 hours of mean time. Because Earth's orbit around the sun is elliptical, and because of the earth axis tilt, the true solar day varies a few dozen seconds above or below the mean value of 24 hours. As this variations accumulates over a few weeks, there are differences as large as 15 minutes between the true solar time and the mean solar time. However, these variations cancel out completely over a year. There are also other perturbations such as Earth's wobble, but these are less than a second per year.

For the purposes of the present invention, the term "ubiquitous computing" (ubicomp)" refers to a post-desktop model of human-computer interaction in which information processing has been thoroughly integrated into everyday objects and activities. As opposed to the desktop paradigm, in which a single user consciously engages a single device for a specialized purpose, someone "using" ubiquitous computing engages many computational devices and systems simultaneously, in the course of ordinary activities, and may not necessarily even be aware that they are doing so. This paradigm is also described as pervasive computing, ambient intelligence, or more recently, everyware. When primarily concerning the objects involved, it is also physical computing, the Internet of Things, haptic computing, and things that think.

For the purposes of the present invention, the term "United Nations Centre for Trade Facilitation and Electronic Business (UN/CEFACT)" refers to an organization with a mission to improve the ability of business, trade and administrative organizations, from developed, developing and transitional economies, to exchange products and relevant services effectively—and so contribute to the growth of global commerce. The Centre is a subsidiary body of the UNECE Committee on Trade (United Nations Economic Commission for Europe). UN/CEFACT facilitates the development of e-business standards that can cross all international boundaries and help lower transaction costs, simplify data flow and reduce bureaucracy. Work outputs of UN/CEFACT activities include ebXML, UN/CEFACT's Modeling Methodology (UMM) and UN/EDIFACT.

For the purposes of the present invention, the term "universal description, discovery and integration" (UDDI) is a platform-independent, XML-based registry for businesses worldwide to list themselves on the Internet. UDDI is an open industry initiative, sponsored by OASIS, enabling businesses to publish service listings and discover each other and define how the services or software applications interact over the Internet. A UDDI business registration consists of three components: white Pages—address, contact, and known identifiers; Yellow Pages—industrial categorizations based on standard taxonomies; and Green Pages—technical information about services exposed by the business. UDDI was originally proposed as a core Web service standard. It is designed to be interrogated by SOAP messages and to provide access to Web Services Description Language documents describing the protocol bindings and message formats required to interact with the web services listed in its directory.

For the purposes of the present invention, the term "Universal Time (UT)" refers to a time scale based on the mean solar day, defined to be as uniform as possible despite variations in Earth's rotation. UT0 is the rotational time of a particular place of observation. It is observed as the diurnal motion of stars or extraterrestrial radio sources. UT1 is computed by correcting UT0 for the effect of polar motion on the longitude of the observing site. It varies from uniformity because of the irregularities in Earth's rotation.

For the purposes of the present invention, the term "universally unique identifier (UUID)" refers to an identifier standard used in software construction, standardized by the Open Software Foundation (OSF) as part of the Distributed Computing Environment (DCE). The intent of UUIDs is to enable distributed systems to uniquely identify information without significant central coordination. Thus, anyone can create a UUID and use it to identify something with reasonable confidence that the identifier will never be unintentionally used by anyone for anything else. Information labeled with UUIDs can therefore be later combined into a single database without needing to resolve name conflicts. The most widespread use of this standard is in Microsoft's Globally Unique Identifiers (GUIDs). Other significant users include Linux's ext2/ext3 file system, LUKS encrypted partitions, GNOME, KDE, and Mac OS X, all of which use implementations derived from the UUID library found in the e2fsprogs package. IJUIDs are documented as part of ISO/IEC 11578:1996 "Information technology—Open Systems interconnection—Remote Procedure Call (RPC)" and more recently in ITU-T Rec. X.667|ISO/IEC 9834-8:2005 (freely available). The IETF has published Proposed Standard RFC 4122 that is technically equivalent with ITU-T Rec. X.667|ISO/IEC 9834-8.

For the purposes of the present invention, the term "unsupervised learning" refers to a type of machine learning where manual labels of inputs are not used. It is distinguished from supervised learning and reinforcement learning approaches. In supervised learning, a typical task is classification or regression, using a set of human prepared examples. One form of unsupervised learning is clustering. Among neural network models, the Self-Organizing Map and Adaptive resonance theory (ART) are commonly used unsupervised learning algorithms. The ART model allows the number of clusters to vary with problem size and lets the user control the degree of similarity between members of the same clusters by means of a user-defined constant called the vigilance parameter. ART networks are also used for many pattern recognition tasks, such as automatic target recognition and seismic signal processing.

For the purposes of the present invention, the term "user datagram protocol (UDP)" refers to one of the core protocols of the Internet Protocol Suite. Using UDP, programs on networked computers can send short messages sometimes known as datagrams to one another. UDP is sometimes called the Universal Datagram Protocol. UDP does not guarantee reliability or ordering in the way that TCP does. Datagrams may arrive out of order, appear duplicated, or go missing without notice. Avoiding the overhead of checking whether every packet actually arrived makes UDP faster and more efficient, for applications that do not need guaranteed delivery. Time-sensitive applications often use UDP because dropped packets are preferable to delayed packets. UDP's stateless nature is also useful for servers that answer small queries from huge numbers of clients. Common network applications that use UDP include: the Domain Name System (DNS), streaming media applications such as IPTV, Voice over IP (VoIP), Trivial File Transfer Protocol (TFTP).

For the purposes of the present invention, the term "utility computing" refers to the packaging of computing resources, such as computation and storage, as a metered service similar to a traditional public utility such as electricity.

For the purposes of the present invention, the term "valid time (VT)" refers to a concept used in temporal databases. It denotes the time period during which a database fact was, is, or will be valid in the modeled reality.

For the purposes of the present invention, the term "virtualization" refers to the abstraction of computer resources. The term frill virtualization provides a more narrow definition for virtualization.

For the purposes of the present invention, the term "visual display device" or "visual display apparatus" includes any type of visual display device or apparatus such as a CRT monitor, LCD screen, LEDs, a projected display, a printer for printing out an image such as a picture and/or text, etc. A visual display device may be a part of another device such as a computer monitor, television, projector, telephone, laptop computer, watch, microwave oven, electronic organ, automatic teller machine (ATM) etc.

For the purposes of the present invention, the term "web service" refers to the term defined by the W3C as "a software system designed to support interoperable machine-to-machine interaction over a network". Web services are frequently just web APIs that can be accessed over a network, such as the Internet, and executed on a remote system hosting the requested services. The W3C Web service definition encompasses many different systems, but in common usage the term refers to clients and servers that communicate using XML messages that follow the SOAP standard. In such systems, there is often machine-readable description of the operations offered by the service written in the Web Services Description Language (WSDL). The latter is not a requirement of a SOAP endpoint, but it is a prerequisite for automated client-side code generation in many Java and .NET SOAP frameworks. Some industry organizations, such as the WS-I, mandate both SOAP and WSDL in their definition of a Web service. More recently, RESTful Web services have been regaining popularity. These also meet the W3C definition, and are often better integrated with HTTP than SOAP-based services. They do not require XML messages or WSDL service-API definitions.

For the purposes of the present invention, the term "Web Services Description Language (WSDL)" refers to an XML-based language that provides a model for describing Web services. The current version of the specification is 2.0; version 1.1 has not been endorsed by the W3C but version 2.0 is a W3C recommendation. WSDL 1.2 was renamed WSDL 2.0 because of its substantial differences from WSDL 1.1. By accepting binding to all the HTTP request methods (not only GET and POST as in version 1.1), WSDL 2.0 specification offers better support for RESTful web services, and is much simpler to implement. However support for this specification is still poor in software development kits for Web Services Which often offer tools only for WSDL, 1.1. The WSDL defines services as collections of network endpoints, or ports. The WSDL specification provides an XML, format for documents for this purpose. The abstract definition of ports and messages is separated from their concrete use or instance, allowing the reuse of these definitions. A port is defined by associating a network address with a reusable binding, and a collection of ports define a service. Messages are abstract descriptions of the data being exchanged, and port types are abstract collections of supported operations. The concrete protocol and data format specifications for a particular port type constitutes a reusable binding, where the operations and messages are then bound to a concrete network protocol and message format. In this way, WSDL describes the public interface to the web service. WSDL is often used in combination with SOAP and XML. Schema to provide web services over the Internet. A client program connecting to a web service can read the WSDL to determine What functions are available on the server. Any special data types used are embedded in the WSDL file in the form of XML Schema. The client can then use SOAP to actually call one of the functions listed in the WSDL.

For the purposes of the present invention, the term "wide area network WAN)" refers to a data communications network that covers a relatively broad geographic area (i.e. one city to another and one country to another country) and that often uses transmission facilities provided by common carriers, such as telephone companies. WAN technologies generally function at the lower three layers of the OSI reference model: the physical layer, the data link layer, and the network layer.

For the purposes of the present invention, the term "workflow" refers to an orchestrated set of services linked together into an executable process. Many workflows are defined in BPEL.

For the purposes of the present invention, the term "World Wide Web Consortium (W3C)" refers to the main international standards organization for the World Wide Web (abbreviated WWW or W3). It is arranged as a consortium where member organizations maintain full-time staff for the purpose of working together in the development of standards for the World Wide Web. W3C also engages in education and outreach, develops software and serves as an open forum for discussion about the Web. W3C standards include: CSS, CGI, DOM, GRDDL, HTML, OWL, RDF, SVG, SISR, SOAP, SMIL, SRGS, SSML, VoiceXML, XHTML+ Voice, WSDL, XACML. XHTML, XML, XML Events, Xforms, XML Information, Set, XML Schema, Xpath, Xquery and XSLT.

For the purposes of the present invention, the term "zettabyte (ZB)" refers to a unit of information or computer storage, derived from the Si prefix zetta-, equal to one sextillion bytes. When used with byte multiples, the SI prefix may indicate a power of either 1000 or 1024, so the exact number may be either: (a) 1,000,000,000,000,000,000,000; $1000^7$, or $10^{21}$ bytes or (b) 1,180,591,620,717,411,303,424; $1024^7$, or $2^{70}$ bytes. The term "zebibyte", using a binary prefix, has been proposed as an unambiguous reference to the latter value, Description In one embodiment, the present invention provides a novel method for defining an automated solution architecture for managing, exploiting, and disseminating complex sensor data as part of an enterprise architecture framework. This framework may be used to develop a tailored system implementations that automate many of the rigorous requirements of large-scale geospatial intelligence analysis and production customers, among others. By integrating the leading edge concepts of many technical and analytical domains, the present invention has developed context-aware solutions for automatically managing and exploiting large volumes of disparate sensor data into tailored information products that can be seamlessly disseminated to downstream consumers.

In one embodiment, the present invention provides a system that is able to handle the daily take (image down link) from various imaging satellites on a continual and on-going basis. The system of the present invention may manage this volume of data, measured in 10's-100's PB per day, by automatically transform the raw data into precise map overlay-based products, using a variety of image processing and/or feature processing algorithms, such as orthorectification, and manages and disseminates these finished products to downstream consumers without an human intervention in the workflow.

An example of a solution that could utilize the present invention is a geospatial intelligence analysis and production system that must manage and exploit global satellite imagery collected on a daily/hourly basis, continuously. The collection is taken from a wide variety of sensors, producing different types of results, in different resolutions, qualities, and formats. The volume of new data is measured in 10s-100s of PT per day and the historic archives required as context to support automated exploitation is measured in 100s of millions of discrete products going back decades. Historic data must be automatically characterized, cataloged, transformed and ingested into managed archives and then exploited into finished products. New sensor data must be automatically characterized, cataloged, transformed and ingested into managed archives and then exploited into finished products, while maintaining pace with the operational or mission need for accurate and timely intelligence.

The need for this type of solution is becoming desperate in both government and private industry as the proliferations of high volume sensor systems is increasing at an exponential rate. The volume of multimedia sensor data is expected to surpass a zettabyte (1 million PTs) by the beginning of 2009. This immense volume of data requires an automated context-aware solution framework to manage and exploit this data, because there are no longer sufficient numbers of trained humans to manual process this data and even if there were, the cost in terms of resources and time is too great to even contemplate.

The systems infrastructure defined by the present invention leverages existing enterprise architecture standards and components to provide a federated enterprise service bus (ESB) enabled, complex event driven service oriented architecture (SOA) for automatically exploiting multimedia sensor data. One novel aspect of the present invention is the extension of this enterprise architecture framework to include native support for spatio-temporal functionality and context-aware functionality. The resulting capability is referred to as the enterprise geospatial intelligence service oriented architecture (EGI-SOA). The EGI-SOA of the present invention is a data management and exploitation system.

The present invention relates to a number of technology and analysis fields. EGI-SOA encapsulates a spatial data infrastructure (SDI), which is designed to manage all data and products available to the system within a spatial, temporal, and thematic context. The SDI includes a number of event-driven services that discovery, vet, ingest, transform, and exploit data. The SOA also includes a robust workflow orchestration engine and a contextual process server that dynamically alters the functionality of a defined workflow to match the current system context.

Workflows are contextually scheduled for execution and executed within a cloud computing environment. Resultant information products are made available to consumers via a variety of dissemination methods. Every aspect of an EGI-SOA instance is governed by a robust enterprise security model that identifies every user to the system and the context provided by the corresponding role assigned to every user access.

In one embodiment, an EGI-SOA of the present invention may be specifically designed to manage large volumes of sensor data, such as satellite imagery, within a spatial, temporal, and thematic context to support the autonomous creation of derivative information products that are compliant with the corresponding product specification from these raw sensor data. Thus, EGI-SOA provides the framework for defining novel autonomous geospatial intelligence workflows (AGIW) to process raw satellite imagery into very precise maps designed to support targeting, navigation, and/or planning activities, as an example. These automated data production capabilities affect every industry that utilizes sensor data, including intelligence analysis (business, security, defense, and intelligence community), planning, construction, transportation, telecommunications, energy, logistics, and agriculture, among others.

An example of an AGIW is an autonomous orthorectification service. Within an EGI-SOA of the present invention, satellite image providers provide their sensor data (geospatial images with corresponding metadata) to the edge of EGI-SO.A. The system automatically discovers this data, characterizes it, and archives it. Then, the data is transformed into a SDI product and an extended set of ISO 19139 compliant metadata is harvested from the SDI product and registered within the SDI Catalog, which enables the discovery of data granules, services, and context defined relationships between data granules and services. The SDI product is then loaded into the SDI, which triggers an event on the ESB that a new geospatial image product has been loaded into the SDI. A complex event handler associated with the autonomous orthorectification AGIW receives this event and the corresponding context and payload data. This context and payload data is used to discover and retrieve the required input data via the SDI Catalog to drive the orthorectification engine included within the AGFW process definition. The resultant process description is passed to the Contextual Process Server, where it is transformed into an ExecML job ready to be schedule for execution on the EGI-SOA Computing Cloud. ExecML is a XML semantic that incorporates several other XML standards, such as SensorML, BPEL, WSDL, among others, to define the context and workflow process of a remotely executed job on A Computing Cloud resource. The result of this example AGIW is an ortho-image, which is loaded into the SDI as an ortho-image product. The corresponding metadata and context of this product is registered with the SDI Catalog, including a relationship to the source geospatial image.

An embodiment of the EGI-SOA of the present invention includes six foundational concepts that ensure the implementation of an agile solution framework. These concepts include: Governance, Data, Software, Hardware, Network and Tradecraft.

Governance defines the set of stakeholders, processes, practices, policies, laws and institutions that affect the design, build, operations and maintenance of an IT system along with the corporate enterprise that uses that IT system. With respect to EGI-SOA, governance establishes the object or mission focus for the system. This includes defining how all of the remaining foundational concepts are framed and used within a solution system instance. For example, governance policies define who has access to what system resources (data, services, components) from "where" and "when" and in role. Governance also embodies the security model and methodologies employed by EGI-SOA, which defines a critical aspect of the contextual state of any solution system instance. This context describes "why" certain resources may be used and "how" those resources are accessed. Within an EGI-SOA of the present invention, this form of governance context is described a WI-IS context, which is referred to a "whiskey-five-hotel" or "who", "what", "where", "why", "when", and "how" context.

In one embodiment, an EGI-SOA of the present invention employs governance in a number of novel ways: (1) the pervasive use of context to drive functionality; (2) the detection of complex events to define context and drive complex workflows; (3) the utilization of all data/services within a spatial, temporal, and thematic context; (4) the automation of complex and disparate data into tailored information; (5) the automation of the discovery, contextual characterization, and management of source data and metadata (including dynamic and voluminous sensor data) and derived data products into an SDI; and (6) the dissemination of tailored information to consumers upon qualified request.

In one embodiment of the present invention, all data in an EGI-SOA is managed within the Spatial Data Infrastructure. All data is associated with corresponding metadata that defines the context of that data. All data is aligned spatially, temporally, and thematically within a variety of contexts, to include pedigree. This does not mean that the data is tagged with a geocode (latitude and longitude coordinate) and a timestamp. While sonic data does include explicit spatial referencing, most non-sensor data is described in metadata by association. For instance, this document does not have an explicit georeference, but it was created in Virginia, which is a form of relative georeference for organizing this document within a vast archive.

Time is also characterized for all data both explicitly and relatively in a number of different contexts. Whenever possible, time is measured in a span as a duration or interval to provide a richer context for interpreting the data. Additionally, time is characterized bi-temporally within an EGI-SOA of the present invention to capture both the valid (actual) time associated with the data, as well as the transaction time, which mean the data creation time, or the time at which the data was transformed.

Authoritative data sources are crucial to support automated workflows, because they provide a defined and repeatable context that can be detected and assessed. An authoritative data source is one that is defined within a governance policy as the definitive source of that type of data for use in a specified context. Alternative sources may also be defined, when the authoritative source is unavailable, but incorporation of these secondary and tertiary sources of data within automated workflows affects the resultant quality of the derived information product. Thus, pedigree metadata may be pervasive throughout an EGI-SOA of the present invention.

In one embodiment, an EGI-SOA of the present invention utilizes as much open standards-based, commercial-off-the-shelf (COTS) software as possible. However, the COTS software is utilized within a "best of breed" context. This means that the COTS should implement specified open standards to facilitate component based integration and re-integration capabilities within the solution framework, before it is considered for use within a solution system instance. Additionally, the COTS should be identified by an independent assessor as meeting the defined criteria for being a "best of breed" within a defined domain and context. These agile integration concepts enable the functionality of a single solution system instance to be tailored, frequently dynamically, to meet the divergent needs of a widely varied customer base simultaneously.

By embracing these methodologies, the majority of the infrastructure needed to establish a solution system instance of an EGI-SOA exists in the commercial marketplace today. Many of the novel methods described by embodiments of the present invention involve the configuration and tailoring of what exists, rather than requiring huge investments in the design development, and deployment of mission critical software.

Web service architectures are described as "publish", "find". "bind" architectures. A typical web service architecture 102 is illustrated in FIG. 1. In architecture 102, service providers 112 "publish" web services that service providers 112 have described using WSDL, as indicated by arrow 114. Service brokers 122 "find" available web services that have been registered within the registry of each service broker. Service requesters 132 "bind" discovered web services described in WSDL into the process flow for each service requester to access this functionality. Thus, a service requester requests, as indicated by arrow 134, a service broker to discover a relevant set of web services that match the specified request. The response, indicated by arrow 136, is in WSDL and describes the location of the relevant web services to the service Requester. At this point, the service requester can "bind" the web service in a process flow directly from the service provider as indicated by curved arrow 142. SOAP is the standard that describes how this binding takes place.

Similar to software, hardware within an EGI-SOA solution system instance should meet a set of "best of breed" requirements and implement the specified open standards. Because an EGI-SOA may chase the latest sensor-based technology, an agile infrastructure that provides for the virtualization of hardware components throughout the infrastructure is critical. This is one of the primary reasons that EGI-SOA implements a cloud computing infrastructure, to provide a hardware, software, and data abstraction layer.

Because an EGI-SOA may be comprised of a wide variety of sensors and services arranged in a constantly changing configuration, the networks that a solution system instance is deployed upon are critical to the success of that system. However, other that embracing leading edge technologies, standards, and best practices, EGI-SOA does not impose any special requirements upon the networks.

Tradecraft describes the business realities of a specific customer or end user community. This includes business processes, analytical processes, and technology biases that are current employed by these communities. While one half of tradecraft describes the "as is" culture and environments, the other half is always striving to define an objective "to be" culture and environment. To be successful, the EGI-SOA should first recognize the importance of tradecraft and then find a proper balance between the "as is" and "to be"

cultures and environments to support the successful execution of the daily mission, purpose, or need of these communities.

In one embodiment of the present invention, an EGI-SOA enables business processes, services, and/or workflows to be automatically invoked at any time and in any order. Unlike more traditional stove-piped client server systems, in one embodiment of the present invention, an EGI-SOA can be reconfigured dynamically to process whatever data is currently available from a common re-usable IT infrastructure. For instance, in an EGI-SOA of the present invention, an event (action message) is generated whenever a new image is loaded into the SDI. Multiple workflows may listen for this type of event to determine when to automatically initiate a workflow that requires new imagery (e.g. an automated orthorectification workflow).

This is powerful construct, because any type of business message or activity may be defined as an event and any number of workflows can be configured to automatically initiate upon receipt of an event, Once defined and configured within the EGI-SOA of the present invention, a workflow operates without human intervention, to provide a solution that scales independently of the number of analysts available to do the corresponding work. Thus, when workflows are defined to discover, access, prepare, automatically exploit, and re-format data into a form ready to be analyzed an intelligence analyst, the productivity of that analyst is significantly improved Because all data and derived data are stored logically within a central SDI, individual analyst productivity increases are multiplied by the number of analysts that need to utilize the same data. Hence, within a defined COI, if ten analysts use the same image in their analysis, then the overall enhancement for that analysis is 10× over traditional methods.

In one embodiment of the present invention, the SDI is implemented within an Oracle Enterprise 11 g Spatial, which is an enterprise capable COTS database that NGA has already licensed across the enterprise. The Spatial module allows geospatial data to be stored as native data types within the database. This spatially enables the database to allow spatial operations to be executed within the database itself, rather than requiring a separate application. The supported spatial data types include features, imagery, metadata, and multimedia including FMV support.

Figure 2:
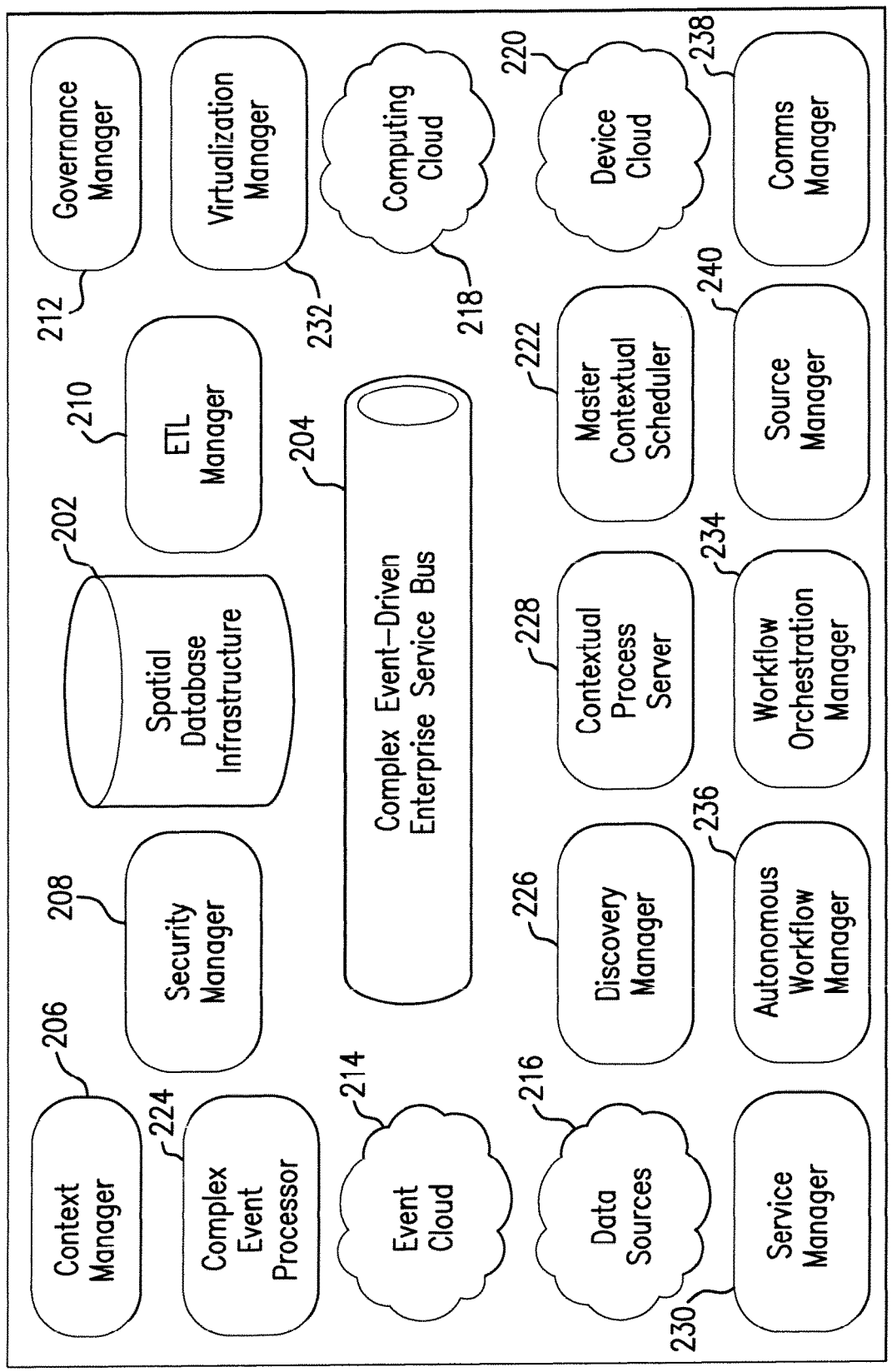
FIG. 2 is a diagram showing EGI-SOA functional components.

FIG. 2 shows an EGI-SOA 200 according to one embodiment of the present invention that is comprised of a number of functional components, which are summarized in. These components include: a spatial data infrastructure (SDI) 202, a complex event-driven enterprise service bus 204, a context manager 206, a security manager 208, an ETL manager 210, a governance manager 212, an event cloud 214, a data sources cloud 216, a computing cloud 218, a device cloud 220, a master contextual scheduler 222, a complex event processor 224, a discovery manager 226, a contextual process server 228, service manager 230, a virtualization server 232, a workflow orchestration server 234, an autonomous workflow manager 236, a communications manager 238 and a source manager 240. A brief description of each component is provided below and in greater detail in subsequent sections.

The SDI provides bi-temporal spatial data management capabilities for EGI-SOA for all data utilized by an EGI-SOA solution system instance. As such, the SDI implements its own internal ESB SOA framework to facilitate the discovery, ingest, ETL, management, and exploitation of foundation data, which includes raw sensor data. This sufficiently abstracts many of the complexities associated voluminous sensor data from the tailoring requirements of end users to ensure a modicum of success through automated workflows to prepare standardized inputs to tailoring processes.

The SDI implements a variety of Open Geospatial Consortium (OGC) web service standards and the associated standards body for ISO (TC 211 19xxx series). The present enterprise architecture framework has determined that Oracle Enterprise Database 11 g with Spatial, RAC, Label Security, and the App Server meet the "best of breed" requirements for implementing the SDI.

The complex event driven service bus (ESB) is extended to inherently utilize spatio-temporal events and complex event patterns for processing. Every event created is persisted within the event Repository, along with event patterns and event templates. Versions and relationships are also persisted within the event catalog registry, which facilitates the remote and automated discovery of events and event related data.

There are a number of contexts that are managed within an EGI-SOA of the present invention, including the contextual state descriptions for sensors, devices, hardware components and software configurations. Alternatively, various contextual states are also managed for different types of data used to drive automated workflows with specified service level agreements (SLAs). Finally, tradecraft and the corresponding governance drive other context definitions within an EGI-SOA of the present invention, including security, Enterprise security is paramount to EGI-SOA because it defines the foundation that enables automation. As such, EGI-SOA embraces a rigorous security model that challenges the identity and need to access every aspect of the system.

The ETL manager is responsible for automating the discovery, characterization, ingest, validation, extraction, transformation, and loading of data into the SDI. Because metadata is another paramount foundation of EGI-SOA, the ETL manager automates much of the metadata collected by EGI-SOA.

The Governance manager is responsible for defining and maintaining all of the system policies within an EGI-SOA instance. The Governance manager maintains a mechanism for defining and validating new policies. Every new policy is versioned and added to the Governance Repository. All policies, their versions, and associations with other policies are also registered with the Governance catalog registry. The registry enabled the remote and automated discovery of policies within an EGI-SOA of the present invention.

The EGI-SOA embraces a complex event-driven processing model that utilizes a number of event management schemes, including a ubiquitous event cloud, event streams, and enterprise messaging topics.

The EGI-SOA embraces a leading edge computing pattern called computing cloud, which incorporates abstractions throughout the processing infrastructure of a system, including virtualization.

The Complex Event Processor (CEP) is designed to filler the event cloud for patterns matching the defined event template patterns registered through event handlers. These patterns are capable of describing complex business logic that incorporates spatio-temporal events as well as a variety of different contexts. The CEP is largely responsible for automatically identifying "patterns of life" from the event cloud that correspond to actions that need to be taken within an EGI-SOA of the present invention. These actions are characterized and then passed to the Contextual Process Server for composition into an executable process within the computing cloud.

The remote discovery, characterization, and access to data and services are paramount to enabling automation within an EGI-SOA of the present invention. As such, there are a variety of discovery services and registries integrated into several EGI-SOA functional components. Most of these capabilities utilize various open standards (ISO 19115, ISO 19119, ISO 19139, ebXML/ebRIM, CIM, CSW) to facilitate interoperability between disparate components within an EGI-SOA of the present invention.

The Contextual Process Server (CPS) is responsible for taking actions defined by complex event patterns detected by the CEP and composing executable processes from them that can be passed to the computing cloud for execution. The CPS implements a service fabric which enables the process server to dynamically interposition services within an orchestrated workflow based on context determined at run-time. This provides a very agile, context aware workflow process flow within an EGI-SOA of the present invention.

The Master Contextual Scheduler (MCS) is ultimately responsible for delegating the contextual processing state requirements throughout all of the devices managed within the computing cloud to optimize the execution of defined processes and/or workflows. This delegation process relies heavily upon the Virtualization Server to dynamically reconfigure the contextual state and/or configuration of any device within the computing cloud.

The Virtualization Server is responsible for maintaining the contextual state of every device within the computing cloud, including the operating system version and patch level, configuration of component devices, software, and the provisioning of relevant local data necessary to support certain classes of processing. The Virtualization Server maintains a repository of pre-configured system images that can virtually provision to devices within the computing cloud as well as versions of these images.

The service manager is a repository for all of the service components defined within the EGI-SOA. Each service is defined in WSDL and is registered with the service catalog registry to support remote discovery and access. The dependencies, relationships, and versions of every service are also tracked within the registry.

The Workflow Orchestration Server (WOS) is responsible for composing orchestrated workflows that are defined in BPEL. Each workflow is defined in BPEL and is registered with the Workflow catalog registry to support remote discovery and access. The dependencies, relationships, and versions of every workflow are also tracked within the registry.

The Autonomous Workflow manager is similar to the WOS in that it manages autonomous workflows. An autonomous workflow is one that has been rigorously defined and robustly tested to confirm successful operations within a complex operational environment. To date, a small class of workflows has been autonomously defined, including several Autonomous Geospatial Intelligence Workflows (AGIWs) and a few EII, related workflows. In various embodiments, the EGI-SOA of the present invention may employ the a variety of workflows, including the following AutoX™ workflows produced by Great-Circle Technologies (GCT): product line includes the following COTS AGIWs: AutoOrtho™, AutoMosaic™, AutoTerrain™, AutoTransform™, AutoETL™, AutoScan™, AuroChange™, AutoPanSharpen™, AutoConflate™, AutoFMV™, AutoMap™, AutoCIB™, and AutoDTED™. All of these diverse requirements are managed by the Communications manager. The AutoOrtho™ AGIW produces an orthorectified tailored product from a well described source geospatial image. The AutoMosaic™ AGIW produces a virtualized seamless mosaic tailored product from a collection of well described orthorectified and/or geospatial images subsetted by spatial context, temporal context, thematic context, and/or pedigreed context. The AutoTerrain™ AGIW produces a tailored terrain surface product extracted from well paired geospatial images and/or orthorectified images. The AutoTransform™ AGIW produces a tailored product transformed in form, format, or context from another source product. The AutoETL™ AGIW produces an SDI product from a product and a product specification described in SpecML, which is a XML semantic that describes how to mark-up a technical specification to enable the automated transformation of the product specification into a SDI Product template. The AutoScan™ AGIW produces a tailored product of autonomously characterized map features sets (graticule, legend, labels, features, etc.) extracted from a scanned tangible product and a corresponding template. The AutoChange™ AGIW produces a tailored product of the changes between two or more well characterized source products as either features sets or raster sets. The AutoPanSharpen™ AGIW produces a tailored pan sharpened product by conflating two or more well characterized source products. The AutoConflate™ AGIW produces a tailored product that represents the conflation of two or more well characterized products. The AutoFMV™ AGIW produces a tailored geospatial intelligence multimedia product that orthorectifies full motion video and conflates well characterized geospatial intelligence products. The AutoMap™ AGIW produces a tailored map product created to a map series specification from well characterized geospatial intelligence products. The AutoCIB™ AGIW produces a CIB tailored product from well characterized geospatial intelligence products. The AutoDTED™ AGIW produces a DTED tailored product from well characterized geospatial intelligence products.

As an extremely diverse and complex enterprise system, EGI-SOA interacts with a wide variety of inter process communication (IPC) mechanisms, ranging from simple file I/O to streaming feeds. All of these diverse requirements are managed by the Communications manager.

Figure 3:
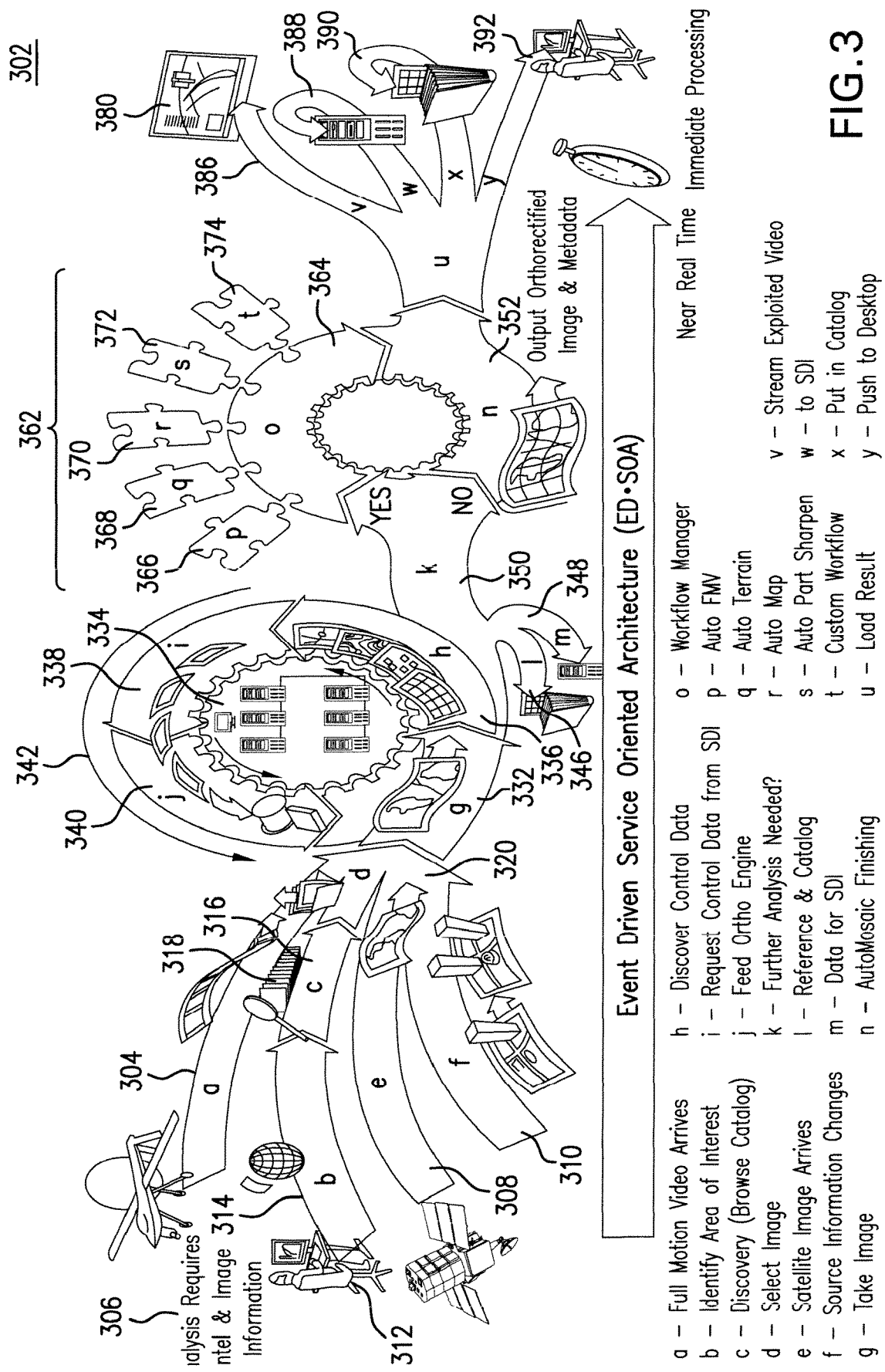
FIG. 3 is a schematic diagram showing how workflows are automated using an EGI-SOA according to one embodiment of the present invention.

FIG. 3 shows how workflows may be automated using an EGI-SOA 302 according to one embodiment of the present invention. In this representation, multiple complex events may trigger an automated workflow to orthorectify imagery and assemble it into a number of tailored products. Such events include events 304, 306, 308 and 310. Event 304 is a delivery of full motion video to EGI-SOA 302. Event 306 is a user 312 initiating a request to EGI-SOA 302 for a tailored product. Event 308 is the delivery of a satellite (geospatial) image to EGI-SOA 302. Event 310 is the push of updated source information 310 already managed with the SDI. With respect to events 304, 308, and 310, geospatial imagery is sent to EGI-SOA 302. With respect to event 306, user 312 merely selects an area of interest (AOI) 314 from a collection of source geospatial images managed within the SDI as inputs for the tailored workflow product. Once AOI 314 has been selected, the corresponding images are discovered 316 from the SDI catalog 318 to finalize input selection phase 320.

The selected images are now passed via event payload to an autonomous orthorectifying workflow, AutoOrtho™ 332, which will eventually be executed within the EGI-SOA computing cloud 334. The control data that corresponds to the orthorectification process for the specific type of source geospatial image, based upon context and governance policies, is discovered in step 336 from SDI catalog 318 and retrieved via bound web services to return requested control data in step 338. The control data includes a controlled image base (CIB), a terrain surface, and any available ground control points (GCPs). The CIB is essentially a precisely ortho-image that provides a rectified grid to reference each un-rectified pixel in the geospatial image. The CIB is delivered by a WCS service that takes the spatial context or extents of the geospatial image to discover a corresponding set of CIB data. The WCS also considers the full W5H metadata context of the request for corresponding CIB from the SDI, including spatial, temporal, thematic, and pedigree. The terrain surface is a similar request to the SDI only for elevation data corresponding to the geospatial image. Finally, a WFS service is used to request any relevant GCPs that have already been identified and extracted from the CIB. If GCPs are not readily available, then AutoOrtho™ will dynamically extract them and transact them back into the SDI at the end of this workflow.

Once all of the required input data is available and the workflow context has been established via defined governance policies, the ortho engine service embedded within the AutoOrtho™ is invoked or "fed" at step 340 to create the resultant ortho-image with corresponding metadata. After a full analysis cycle is complete, indicated by arrow 342, the resultant products and corresponding metadata is pushed to be registered with the SDI catalog 318 in step 346 and managed within the SDI in step 348.

Once a full analysis cycle is complete, EGI-SOA 302 determines if further analysis is needed in step 350. If further analysis is not needed, an orthorectified image and metadata is output in step 352. If further analysis is needed, one or more workflows 362 may be executed by a workflow manager in step 364. Workflows 362 include the workflows AutoFMV™ 366, AutoTerrain™ 368, AutoMap™ 370, AutoPan Sharpen™ 372 and a custom workflow 374. Auto-Pan Sharpen™ is an AGIW that produces a tailored pan sharpened product from two or more geospatial intelligence products produced by GCT. After the workflow manager has finished executing the appropriate workflow(s), an orthorectified image and metadata is output in step 352. Once a tailored product has been generated, the result may be utilized in a variety of ways. For example, the result may be stream exploited as a video on a dashboard 380 of the video display device of a computer used by user 312 as shown by arrow 386, or the result may be persisted for future use in the SDI as shown by arrow 388, or the result may be put in the catalog to enable remote discovery of this result, as shown by arrow 390. The result may also pushed to user's desktop as shown by arrow 392, if the result meets the criteria set by a user either during a past request or during a current request. Finally, the tailored product that end user 312 requested is delivered to illustrate the "pull" aspect of EGI-SOA dissemination methods.

Although particular workflows are shown being used by the EGI-SOA of FIG. 3, various other types of workflows may be used in the EGI-SOA of the present invention.

FIG. 4 shows the architecture of an EGI-SOA 402 according to one embodiment of the present invention. As depicted in FIG. 4, EGI-SOA 402 is comprised of a central infrastructure tier 410, surrounded by a client tier 412, a data management tier 414, a web service tier 416, a compute tier 418, an ESB tier 420 and an near real-time (NRT) computer tier 422. Within each of tiers 410, 412, 414, 416, 418, 420 and 422 is a representative lists of services and/or functionality supported by that tier. Infrastructure tier 410 is comprised of an SDI 432 that manages all data, including structured data 434, unstructured data 436, geospatial data 438 and metadata 440 aligned within a bi-temporal (describing both valid time and transaction time) spatial and thematic complex. All data is registered with catalog discovery services 442. Infrastructure tier 410 is wrapped within a comprehensive role-based enterprise security model that incorporate an agile set of governance policies in addition to standard security policies. Data management tier 414 is responsible for ingesting data into SDI 432 utilizing a number of different technologies and services. A security layer 444 is present to delimit data, such as data stored on optical disks 446, static data 448 and FTP data 450 that is outside of EGI-SOA 402 from data that is inside EGI-SOA 402. Web service tier 416 manages atomic services available to assemble into codified workflows. Web service tier 416 supports various web services 454. Compute tier 418 includes computer systems 456. ESB tier 420 includes a workflow manager 462 and NRT workflow manager 464. Workflow manager 462 manages workflows 468 and NRT workflow manager 464 manages AutoFMV workflow 470. NRT workflow manager 464 imposes near real-time service level agreements (SLAs) on managed workflows; whereas the Workflow Manager imposes non-near real-time SLAs on managed workflows.

Client tier 412 includes various applications 474. Some of applications 474 also include an SDI plug-in 476. NRT compute tier 422 includes servers 484, a firewall 486 and a spatial transitional cache 488. The functioning of tiers 410, 412, 414, 416, 418, 420 and 422 will be described in greater detail below.

In the infrastructure tier of one embodiment of the present invention, all structured, unstructured geospatial, multimedia, and metadata is stored within the SDI in native data types and not just referenced within a data store to files on a file system. In one embodiment, the SDI is a COTS database, such as Oracle 11 g that provides management, back-up and recovery, and replication capability.

In one embodiment of the present invention, the catalog and discovery services include a number of discrete technologies that have been coupled together. The core service may be based on an ebRIM implementation of the OGC CS-W catalog interface that defines an ISO 19115/19139 profile for every type of data loaded into the SDI. This coupled with a UDDI registry service for web services. In one embodiment of the present invention, the catalog service of the catalog and discover), services describes all source data loaded into the SDI and all workflows registered with the workflow manager. Additionally, the catalog may maintain a pedigree association between any derived data result created by a workflow and the service and corresponding source data used by that workflow.

In one embodiment of the present invention, the semantic service of the database may be employed to define an RDF implementation of a pedigree service, which includes support for tailored workflow ontologies to facilitate interoperability among community of interest (COIs). The benefits of this type of pedigree information coupled orchestrated workflow includes: providing the recipe for repeatable workflows, providing an automated update processing model and providing the means to document and expose the business logic, sources, and methods employed by the EGI-SOA to create an analytical result. Because the pedigree acts as a workflow recipe, subject matter experts (SMEs) can interrogate the EGI-SOA to determine exactly how an analytical product was created and tailor the product as necessary by merely altering the recipe and re-executing the recipe.

Alternatively, because the SDI is comprised of a bi-temporal spatial indexing system that aligns all data managed within the SDI in terms of space, time and thematic content, which when couple with complex events, can describe a situation context, this situational context can be dynamically applied to data updates.

For instance, if a NGA Control Image Base product (CIB) is loaded for a city representing imagery collected no later than 15 Sep. 2007 and this represents the latest CIB for that area of interest (AOI), then codified workflows such as AutoOrtho™ will automatically select this cell whenever attempting to orthorectify imagery over this city. However, if a new CIB cell over the city representing imagery collected from 15 Dec 2007 is automatically ETL'd into the EGI-SOA, then the next time an AutoOrtho™ executes over that AOI, the new CIB cell will automatically be selected, because the spatial, temporal, and thematic context associated with that cell. This is relevant because not only is the CIB cell automatically ETL'd into the EGI-SOA, but the appropriate situational context is associated with cell without requiring the older version to be removed. Thus an EGI-SOA archive of the present invention may be more efficient, due to automatic ETL'ing, than traditional archives. An EGI-SOA archive of the present invention may also increase end user productivity because they can implement repeatable context aware requests without bothering the end user for input.

In the embodiment of the EGI-SOA of the present invention shown in FIG. 4, the infrastructure tier is wrapped by a robust security model that includes an agile set of governance policies. Governance policies describe business rules and constraints within the system. The security model is an enterprise class one that requires all end users to be named and recognized by the security system, before any end user is granted access to any SDI data and/or services. This includes the traditional identity management, and single sign-on capabilities delivered from a modern enterprise class system. However, in one embodiment, the EGI-SOA of the present invention may extends these capabilities to provide a contextual service fabric that uses situational context and complex event management to determine which workflows should be executed when with which data.

For example, the AutoOrtho™ automated orthorectification workflow within the EGI-SOA of FIG. 4 is designed to exploit any well characterized source of imagery to produce an optimal orthorectified result through iteration. However, different sensors, such as National Technical Means (NTA) (a form of classified satellite imagery), SPOT (a French commercial satellite sensor), WorldView (a US commercial satellite sensor) all have different sensor models and may be ingested from different source formats into the SDI. Instead of creating a coupled set of workflows, one for each image source and type, the EGI-SOA of the present invention is able to leverage the situational context describing MV, available sources of data, which is managed within the catalog, to dynamically determine which service within the orchestrated AutoOrtho™ workflow needs to be implemented at execution time. Thus, AutoOrtho™ represents a single orchestrated workflow within the EGI-SOA of the present invention that dynamically adapts itself to select the appropriate atomic services to process the selected data source. This means that in one embodiment EGI-SOA of the present invention supports one imagery sensor model or one thousand, there will still only be one automated orthorectification workflow. Better yet, because there is only one automated orthorectification workflow, workflow management within the EGI-SOA of the present invention is much simpler than more I technical approaches.

Essentially, the contextual service fabric within the EGI-SOA of the present invention provides the equivalent interpositioning capabilities for orchestrated workflows that a dynamic loader provides for dynamically linked libraries (e.g., DLL, so) in executable applications. While this functionality significantly reduces the technical and operational complexity of the EGI-SOA of the present invention workflows, it does raise a potential security risk similar to that associated with dynamically linked libraries. Because interpositioning represents a silent change to an application workflow, nefarious applications can potentially insert alternative functionality with no knowledge of the end user or potentially a system administrator or security officer, unless a robust security model is also coupled with the interpositioning technology.

The data management tier of the EGI-SOA of FIG. 4 is responsible for ingesting data into the SDI utilizing a number of different technologies and services. As depicted in FIG. 4, a security layer is present to delimit data that is outside of the EGI-SOA of the present invention from that which is inside. All data, including derived data from codified workflows and the corresponding metadata, is registered with the catalog and discover services within the SDI, once that data has been loaded into the SDI. Traditions database extract, transform, and load (ETL) services are employed for more traditional data. An automated sniffer service, such as AutoSniffer™ service produced by GCT, is used to automatically identify and characterize new data, so the data can be appropriately ETI'd into the SDI. This services utilizes a complex pattern matching algorithm to match a new source of data with the corresponding data loader service. As described above, this service also employs complex event processing and contextual service fabric interposition to dynamically orchestrate an appropriate ETL workflow that extracts the data from its source format, transforms it into the appropriate SDI form, and then loads the data into the SDI. A corresponding harvester is applied to extract the appropriate catalog description for the ebRIM slot associated with that data source type.

An automated ETL workflow, such as AutoETL™, may be used to automatically ETL data products described by a specification, such NGA specification DTED MIL-PRF-89020B NOT I or JPEG 2000 ISO/IEC 15444-1:2004. This workflow employs an XML mark-up version of each specification, which is used to transform the record layout or a data file into an in-memory image that can be dynamically translated into the appropriate SDI schema layout and then loaded into the SDI. The equivalent harvester process is applied to extract the appropriate metadata and populate the corresponding ebRIM slot with that metadata.

The web services tier manages the all of the atomic services available to assemble into codified workflows. An atomic service is a service that does not depend upon another service for execution. Codified workflows are orchestrated from atomic services and derivative services, which are comprised of other services, as well. This web service tier can support any types of web service, including OGC SDI defined web services, such as WMS, WFS-T, WCS, and CSW. The OGC SDI 1.0 stack describes the following standard functionality: Web Mapping service (WMS) to disseminate fully rendered, symbolized, and portrayed maps via the web (e.g., MapQuest™ and similar types of web mapping); Geography Mark-up Language (GML) to provide a rich XML semantic for describing geospatial intelligence features and their properties; Web Feature service-Transactional. (WFS-T) to exchange raw feature (vector) data between applications and to allow the transaction of remotely edited and updated feature data back into the SDI; Web Coverage service (WCS) to exchange raw coverage (raster or pixel) data from multi-band imagery or terrain data between applications; Filter Encoding (FE) to allow data managed within the SDI to be filtered or subset before exchanging between applications; Style Layer Descriptor (SLD) to allow a consumer or end user to tailor portrayal rules before rendering a web map (e.g., allowing one customer to use MIL-STD-2525B symbology to create a web map and another to use GEOSYM symbology to view the same web snap; international metadata standards, such as ISO 19115, ISO 19139, and ISO 19110; web catalog service (CS-W) to enable the remote anti potentially automatic discovery of products, services, and the relationships between them that are available within the EGI-SOA, and Web Map Context (WMC) to enable the copying and sharing of portrayed web map views comprised of potentially multiple OGC services with other remote users. Additionally, the EGI-SOA implements the yet to be codified OGC SDI 2.0 stack, which include the Web Coverage Service Transactional (WCS-T). WCS-T services are used within highly transactional coverage updating services, such as building a composite seamless mosaic from a large number of member ortho-images.

The web services tier provides the open standards-based mechanisms for exchanging geospatial intelligence data within the embodiments of the EGI-SOA of the present invention. Compliant applications outside of the embodiments of the EGI-SOA of the present invention may also exchange data with the embodiments of the EGI-SOA of the present invention via these services. In one embodiment, the EGI-SOA of the present invention may be used to implement the full OGC SDI 1.0 web service standards stack adopted by NGA. These web service standards may be implemented by various vendors and form the basis for the embodiments of the EGI-SOA of the present invention to intemperate with other applications and/or systems. The EGI-SOA also provides the ability to quickly decouple of or un-plug one component and replace it with another component.

The compute tier represents the processing power available to execute c tools, applications, and/or workflows of the embodiment of the EGI-SOA of FIG. 4. This tier may be specifically designed to operate within a cloud computing environment, but can be alternatively configured to run within a more traditional server/cluster environment. The compute tier represents the systems or processors that are tasked to execute the workflows and/or processes. This tier may be configured as a cloud computing environment to take advantage heterogeneous hardware resources distributed throughout an enterprise. Alternatively, this compute tier may be defined as a dedicated collection of servers. The software that is provisioned to execute on the individual compute resources is virtualized. This enables the EGI-SOA to dynamically re-provision system resources on an as needed basis to maximize the utility of those resources.

The ESB tier represents the workflow management of codified workflows, including service level agreements for near real-time execution. The workflow manager includes a process manager that coordinates the orchestration of complex event-driven workflows. The automated workflows listed within this tier are designed to illustrate imagery and geospatial intelligence product production capabilities of the EGI-SOA. This production capability includes implementing an automated image process exploitation chain to orthorectify, using automated orthorectification workflow, such as AutoOrtho™, and mosaic, using an automated mosaicing workflow, such as AutoMosaic™, disparate imagery sources into an earth imagery skin, using an automated terrain draping workflow, such as AutoTerrain™, to drape the imagery over within a symbolized map series template, using an automated mapping workflow, such as AutoMap™. Features may then be characterized and extracted from the imagery skin, using a workflow such as AutoFeature™ and used to define characterized changes for these features over time, using an automate change processing workflow, such as AutoChange™. An analogous process chain may he provided to automatically exploit FMV, persistent surveillance, and/or advanced geospatial intelligence (AGI) data streams, using the AGI multimedia exploitation workflows, such as AutoFMV™. The ESB Tier shown in FIG. 4 represents only a limited subset of the potential workflows that can he configured for operational use within the EGI-SOA of the present invention. The ESB provides an implementation backbone to enable both automated workflows and, Real-time business applications through the managed exchange of messages or events.

The client tier is designed to work with applications that are part of the EGI-SOA, such as web-browser and a T-COP client, such as Minerva™ T-COP. The T-COP client is a Wide Area Persistence Surveillance (WAPS) EGI-SOA client designed to support near real-time exploitation of full motion video (FMV) multimedia streams, including services such as video frame orthorectification. The client tier is also designed to work with existing applications such as Google Earth, ArcGIS, and others through the use of SDI plug-ins.

The NRT compute tier enables the management and automated exploitation of streaming sensor data, such as FMV, large format moving imagery (i.e., Constant Hawk, Angel Fire), GMTI, LIDAR, IF-SAR, ONIR, and other sensor streams. For instance, the NRT compute tier may include a GMTI codec that can read STANAG 4607/AEDP-7 NATO Ground Moving Target Indicator Format (GMTIF). NRT compute tier employs a similar collection of business processes to those found within the rest of the EGI-SOA to automatically process sensor stream data, but the NRT-compute tier versions of these workflows may be ported to execute on hardware and software optimized for streaming or near real-time processing, while the rest of the EGI-SOA may be designed to operate within a cloud computing environment to take advantage of heterogeneous collections of hardware (servers, blades, clusters). In one embodiment, the NRT computer tier may be designed to specifically utilize IBM's Cell BE blade servers to meet near real-time service level agreements required for processing geospatial intelligence sensor streams, such as FMV. For instance, a workflow that automatically orthorectifies a still image, such as AutoOrtho™, within the EGI-SOA of the present invention is replicated within the NRT compute tier to automatically orthorectify individual FMV frames, using a workflow such as AutoFMV™.

In the embodiment of the EGI-SOA shown in FIG. 4, the IBM Cell BE blade server implements a symmetric multi-processor (SMP) architecture utilizing the same chip-set developed for the gaming industry (i.e., Sony's Playstation 3). This SMP configuration may provide an incredibly powerful collection of processors within a relatively inexpensive blade package, resulting from the economies of scale provided by the gaming industry ($400 million plus in sales). However, this highly specialized hardware capability to process streaming sensor data in near real-time comes at the cost of requiring highly specialized computer software that runs on these blade servers.

Figure 5:
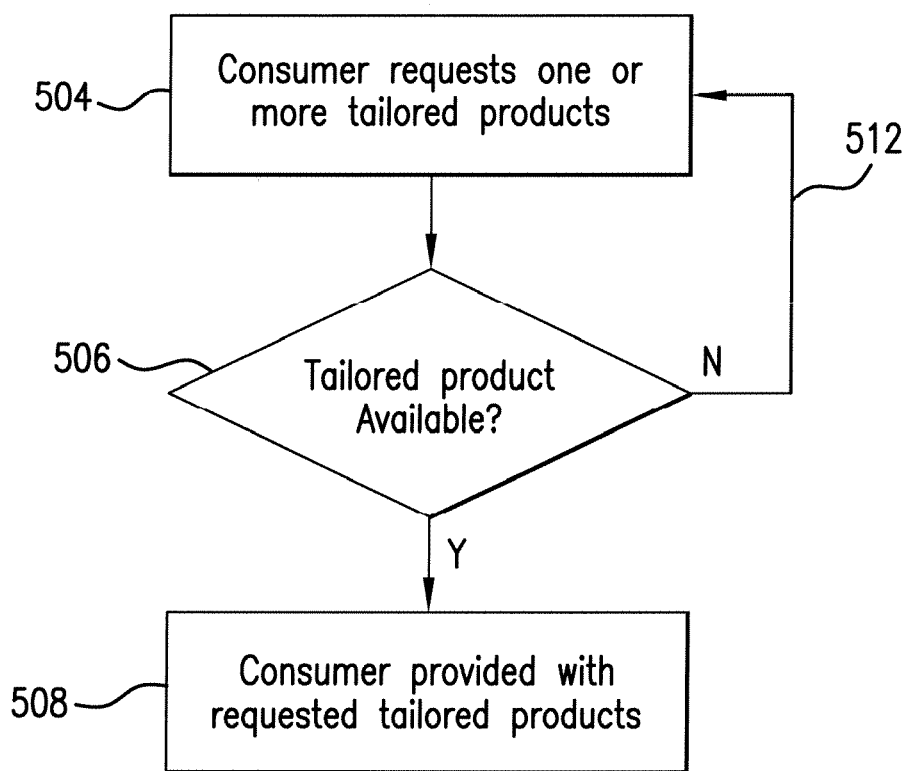
FIG. 5 is a flowchart showing a consumer being provided with one or more requested tailored products using an EGI-SOA according to one embodiment of the present invention.

In one embodiment of the present invention, illustrated in FIG. 5, a consumer requests one or more tailored products and the data management system provides the consumer with the requested tailored product(s). In process 502 of FIG. 5, a consumer requests one or more tailored products at step 504. The consumer request may be a dynamic request or standing request. At step 506, the data management system determines if the desired tailor product(s) are available or can by dynamically created. If the desired tailored product is available, the consumer is provided with the tailored product at step 508. Otherwise, the data management system returns control to the user as indicated by arrow 512.

Figure 6:
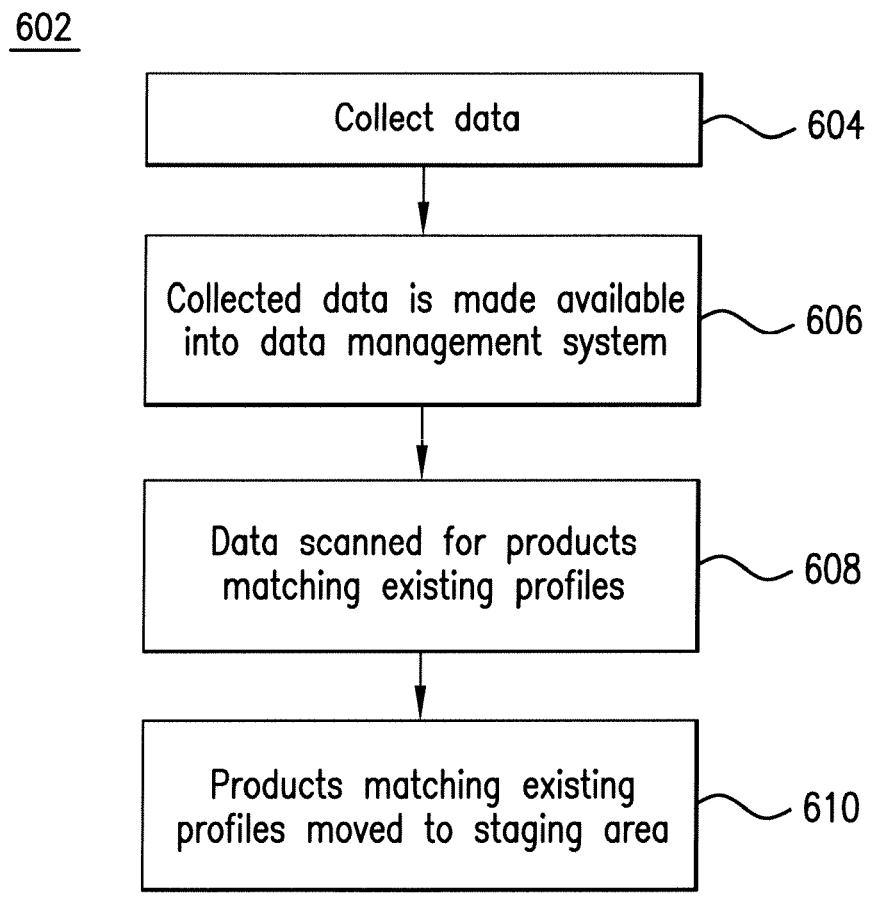
FIG. 6 is a flowchart showing a data ingestion/discovery process of an EGI-SOA according to one embodiment of the present invention.

In one embodiment of the present invention, a tailored product may be formed from discovered or ingested data using a data ingestion/discovery process such as shown in FIG. 6. In data ingestion/discovery process 602, data is collected at step 604. At step 606 the collected data is made available to the data management system. At step 608 the data is scanned for products matching existing profiles. At step 610 products matching existing profiles are moved to a staging area.

Data is collected from various sensors in the process of FIG. 6. A sensor is any device that can capture some form of an observation of a real world phenomenon. Examples of sensors include GPS receiver, thermometer, sound recorder, or a digital camera. Humans can also be considered a sensor when their observations are captured as data, such as reports.

The products of the process of FIG. 6 are data that are defined by a product specification. For instance NGA's CIB product is defined by the MIL-PRF89041A NOT 1 specification and DTED is defined by the MIL-PRF-89020B NOT 1 specification.

The products of the process of FIG. 6 are scanned using profiles that have been previously stored in the data management system. Examples of such profiles include templates describing product specification, such as those describing CIB or DTED. Each profile includes the following types of characteristics and properties: description of the product file system, description of each file type in the product file system, description of data types included in every product file type, and a range of valid values for every data type in the product specification.

Figure 7:
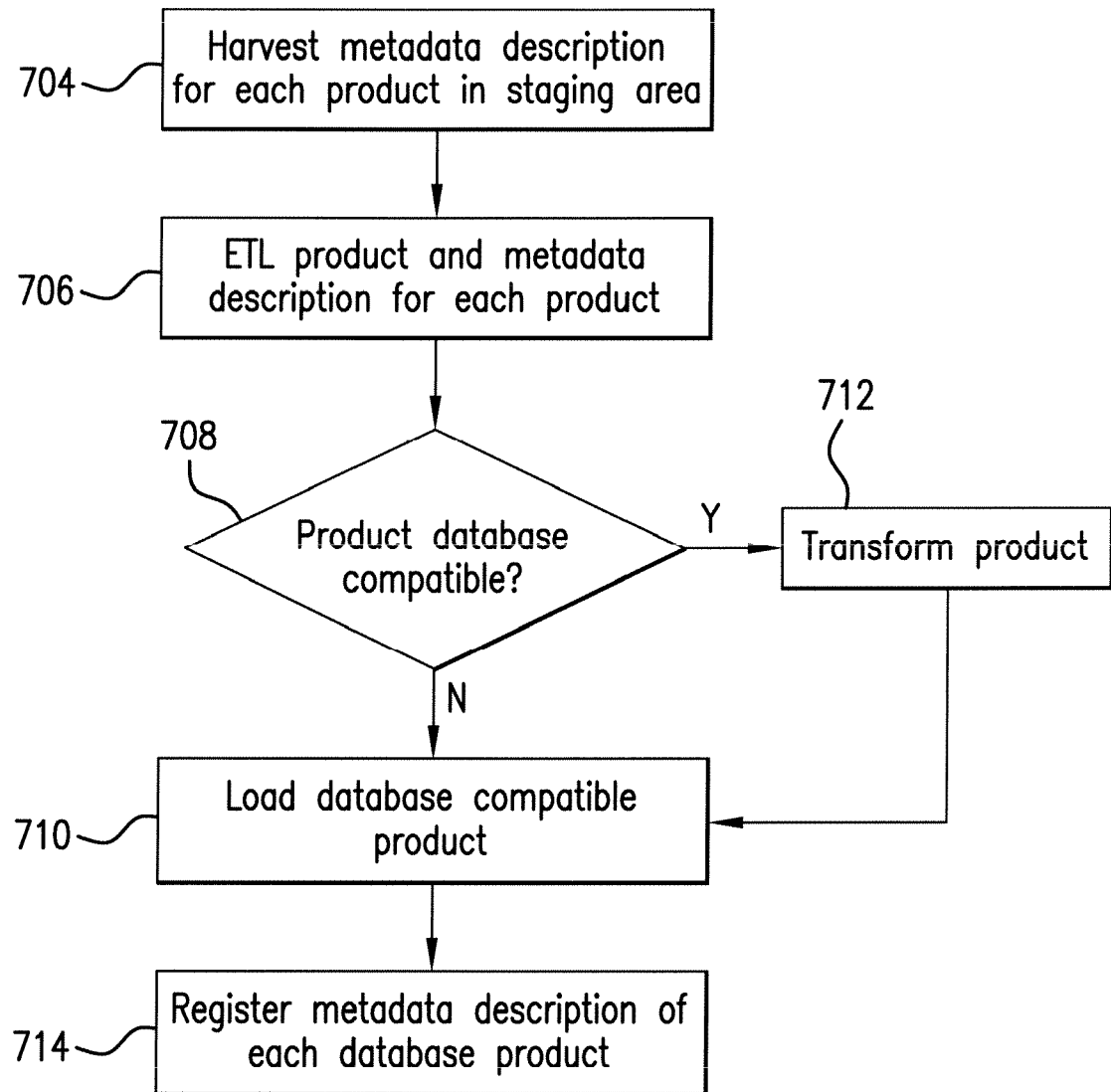
FIG. 7 is a flowchart showing a data loading process of an EGI-SOA according to one embodiment of the present invention.

Once the products have reached the staging area as shown at step 612 of the process of FIG. 6, in one embodiment of the present invention the products enter the data management system using a data loading process shown in FIG. 7. In data loading process 702, at step 704 the metadata for each product is harvested. At step 706, an extract, transform, and load process is performed on each product and on the metadata description for each product. If the product is determined to be database compatible at step 708, the product is loaded at step 710. If the product is determined to not be database compatible at step 708, the product is transformed into a database compatible product at step 712 and then loaded at step 710 to as a database product. At step 714 the database management system registers the metadata description of each database product.

The harvester is responsible for extract full product specification metadata from a complete product and creating a registry discovery record from this metadata to register the product with the SDI Catalog, The sniffer is responsible for matching source data packages against product template to determine when a complete product is available to be loaded into the SDI. The Sniffer is capable of maintaining the state of a product template evaluation over long transactions that can be constrained via an SLA.

An EGI-SOA tailored product may be disseminated to consumers utilizing a variety of different methods, including web services, FTP, email, etc. Every result of a workflow is persisted within the SDI.

As an extremely diverse and complex enterprise system, the EGI-SOA of the present invention interacts with a wide variety of inter process communication (IPC) mechanisms, ranging from simple file I/O to streaming feeds. All of these diverse requirements are managed by the communications manager.

In one embodiment. EGI-SOA of the present invention may be designed to automatically ingest, manage, exploit, and disseminate large volumes of complex sensor data into well codified information products. These products are utilized by end users in analysis, production, and decision support activities across a wide variety of domains. This framework is loosely-coupled via a number of methods (event-driven computing, context-driven service fabric, discovery-driven workflow) and encapsulates a comprehensive security model that ensures the successfully operation of an EGI-SOA system, even within the most highly secure security enclaves within the US Intelligence Community (IC), Some of the novel geospatial intelligence capabilities of EGI-SOA include the following: Spatial Context, Temporal Context, Thematic Context, Pedigreed Context, W5H Metadata, Spatio-Temporal events, Spatio-Temporal Complex event Processing, Context-Aware Spatio-Temporal cloud computing, Context-Aware Discovery, Extract, Transform and Load, Context-Aware Spatial Data Infrastructure and Autonomous Geospatial Intelligence Workflows.

In the context of the present invention, spatial context represents a diverse methodology for describing "where" something exists in space. Space is described by a spatial reference system (SRS), which provides the means to locate something in space. Spatial reference systems can be described in two categories: mathematically, using ordinate tuples referenced to a datum or toponymically, using spatial descriptors or names (i.e., place names). ISO 19111:2007 provides the definitive reference for describing mathematical spatial reference systems. ISO 19112:2003 is used as a basis to describe toponymic spatial reference systems, but EGI-SOA extensions are required to support the present invention. Unlike ISO 19112, the EGI-SOA SRS includes the provision for multiple orthographies.

Figure 8:
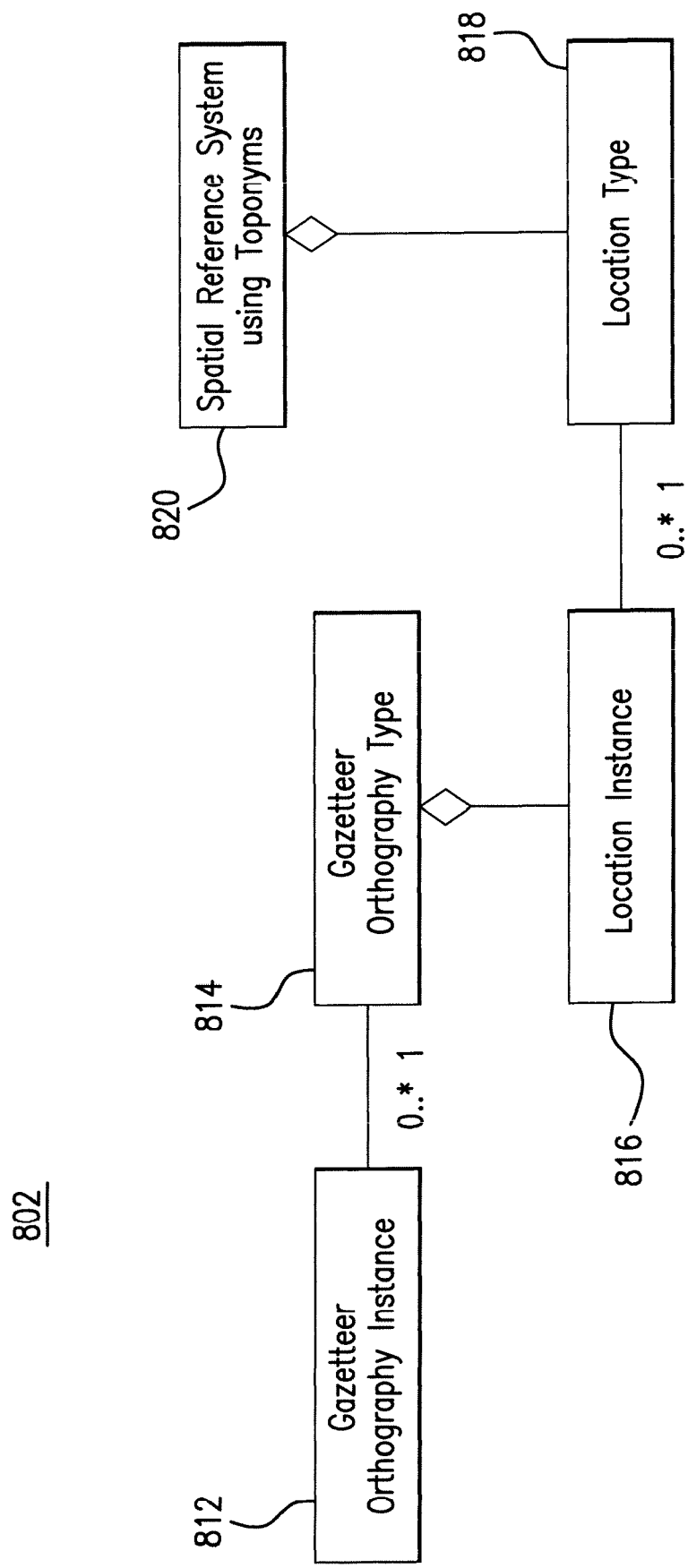
FIG. 8 is a diagram of a spatial reference system using toponyms.

The EGI-SOA SRS defines toponyms by location referenced to a gazetteer written in a specific orthography, such as shown in FIG. 8. FIG. 8 shows the relationships between spatial reference systems, locations described as toponyms with both a named member and a geocoded member, and the ability to deliver these results in multiple orthographies. A gazetteer is a dictionary of named places with corresponding geocode information that can be described using points and/or extended feature sets. In 812, a gazetteer is defined for a specified orthography, where multiple orthography types 814 are defined within an EGI-SOA of the present invention. For gazetteer describes a location instance 816 for multiple location types 818, such as points, or features sets. Every Spatial Reference System is defined using toponyms 820, which represents the aggregate of the functionality described in 812, 814, 816, and 818. Thus, the EGI-SOA SRS provides the mechanism to describe the spatial context of any entity as a mathematical tuple, such as a latitude and longitude coordinate, or in relation to a named location, such as "within Paris, VA", which may be expressed in different orthographies.

This spatial context functionality provides the basis for the novel Toponymic services provided by an EGI-SOA.

A spatial definition is comprised of either a SRS reference or a toponym. A set of spatial definitions defines a spatial granule, which is the spatial abstraction used to reference things spatially within an EGI-SOA of the present invention. A spatial pattern is a spatial granule, where the absolute spatial reference values are replaced with variables. In this sense, a spatial pattern can be used within a pattern matcher to match corresponding spatial granules.

The definition and utilization of spatial granules and spatial patterns within an EGI-SOA of the present invention represents a novel method within the EGI-SOA.

In the context of the present invention, temporal context represents a diverse methodology for describing "when" something exists in time. Temporal references are either absolute or relative. .Absolution references define an explicit set of times measured against a defined epoch and a specified calendar. The ISO 19108:2002 standard defines the temporal reference system (TRS) used describe the temporal context. The :ISO 88601:2004 standard defines the standard notion for representing time. The ISO/IEC 11405:1996 standard defines how time periods are described.

In addition to the numeric descriptions of time listed above, a temporal context may also be described as a chrononym or named time period or granule. Similar to a gazetteer, a multiple orthography chrononym dictionaries are maintained to provide cross reference definitions between chrononyms and the corresponding time granule.

Figure 9:
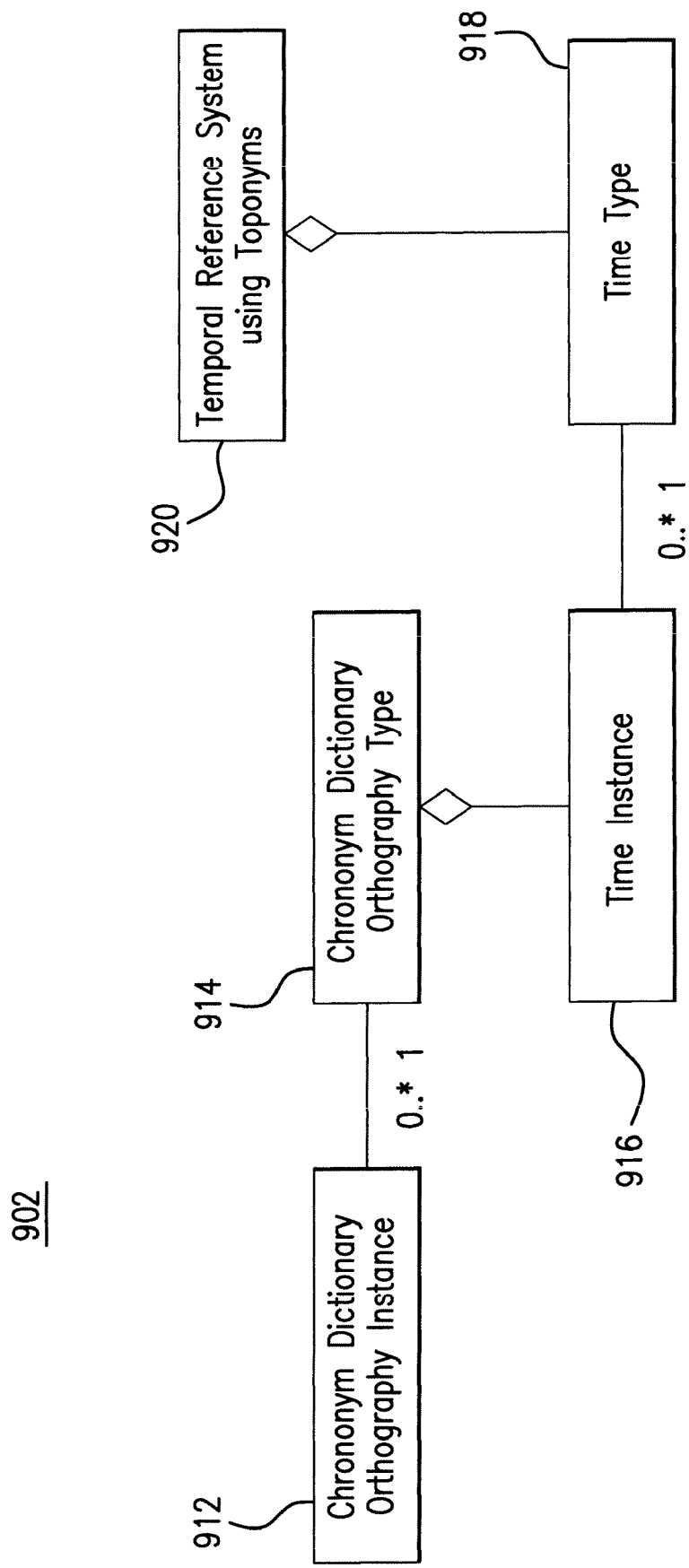
FIG. 9 is a diagram of a temporal reference system using chrononyms.

The EGI-SOA TRS defines chrononyms by granule referenced to a chrononym dictionary written in a specific orthography, such as shown in FIG. 9. FIG. 9 shows the relationships between temporal reference systems, time periods described as chrononyms with both a named member and a time granule member, and the ability to deliver these results in multiple orthographies. A chrononym dictionary is a dictionary of named time periods with corresponding time granules. In 912, a chrononym dictionary is defined for a specified orthography, where multiple orthography types 914 are defined within the EGI-SOA. The chrononym dictionary describes a time instance 916 for multiple time types 918, such as time instance, time period, and time granule. Every Temporal Reference System is defined using chrononyms 920, which represents the aggregate of the functionality described in 912, 914, 916, and 918. Thus, the EGI-SOI TRS provides the mechanism to describe the temporal context of any entity as an ISO 8601 temporal reference, such as 2008-9-21T22:35, or in relation to a named time granule, such as "Business Week"

This temporal context functionality provides the basis for the novel chrononymic services provided by an EGI-SOA.

A temporal definition is comprised of either a TRS reference or a chrononym. A set of temporal definitions defines a temporal granule or time granule, which is the temporal abstraction used to reference things temporally within the EGI-SOA. A temporal pattern is a temporal granule, where the absolute or relative temporal reference values are replaced with variables. In this sense, a temporal pattern can be used within a pattern matcher to match corresponding temporal granules.

In the context of an EGI-SOA of present invention, thematic context represents a diverse methodology for describing "what" something is, "how" it is used, "why" it is relevant to a specified community and "who" that community is. An example of thematic context is a contextual state description (CSD) for hardware components in a computing cloud. The CSD describes the operational and environment state of the hardware, so an automatic determination can be made whether a service can be optimally executed on that device or for forensic process analysis, where the prior operational and environmental state of a hardware device should be recreated in order to recreate the exact results from a service invocation again.

The EGI-SOA defines thematic context as an ontological domain with a corresponding set of fields. The Context Manager is responsible for maintaining a normalized and versioned set of ontologies as distinct domains. The members of each ontology are expressed as taxonyms, which reference an explicit location in the ontological hierarchy of each ontology domain. Each taxonym includes an RDF triplet defining a subject-predicate-object expression and a context that includes the named-graph corresponding to the ontology.

For instance, a military unit ontology includes defined hierarchy of soldiers ranging from the largest organization types (Theater) through an individual, see Table 2 below:

TABLE 2

| Military Units |
| --- |
| Theater |
| Army Group |
| Army |
| Corps |
| Division |
| Brigade |
| Regiment |
| Battalion |
| Company |
| Platoon |
| Section |
| Squad |
| Fire Team |
| Soldier |

If a thematic context includes the taxonym "Brigade" from this military unit ontology, a specific point in the defined hierarchy is defined, as well as implying the entire context associated with a military brigade. This thematic context functionality provides the basis for the novel thematic services provided by embodiments of the EGI-SOA of the present invention.

A thematic definition is comprised of a taxonym. A set of thematic definitions defines a thematic granule, which is the thematic abstraction used to reference things thematically within an EGI-SOA of the present invention. A thematic pattern is a thematic granule, where the thematic reference values are replaced with variables. In this sense, a thematic pattern can be used within a pattern matcher to match corresponding thematic granules. The definition and utilization of thematic granules and thematic patterns within an EGI-SOA represents a novel method within the EGI-SOA.

In the context of embodiment of an EGI-SOA of the present invention, a pedigreed context represents a diverse methodology for describing "where" something came from and "how" it was derived. In this sense, pedigreed context represents the pedigree of something or in another sense, the recipe used to create something. Thus, pedigreed context represents a comprehensive list of references to all of the sources, methods, and states used to create something.

The EGI-SOA defines pedigreed context as a historical snapshot of the normalized spatial, temporal, and thematic contexts of the sources and methods utilized to derive something new within the EGI-SOA. The described snapshots of various contexts defined within a pedigreed context define a holonym. A single snapshot represents a member of the overall pedigree and is defined as a meronym. Thus, a meronym within the pedigreed context is analogous to a single ingredient within a recipe.

This pedigreed context functionality provides the basis for the novel Pedigreed services provided by an EGI-SOA. These services are used to retrieve the recipe for creating something within an EGI-SOA of the present invention, so that a variation of that something can more easily be created within starting from scratch.

A pedigreed definition is comprised of a meronym representing a logical set of related context data. A set of pedigreed definitions defines a pedigreed granule, which is the pedigreed abstraction used to reference pedigree for things within an EGLSOA of the present invention. A pedigreed pattern is a pedigreed granule, where the pedigreed reference values are replaced with variables. In this sense, a pedigreed pattern can be used within a pattern matcher to match corresponding pedigreed granules. Additionally, the pedigreed pattern can be used to recreate a thing by replacing some of the original ingredients with alternatives to create a variant. The definition and utilization of pedigreed granules and pedigreed patterns within the EGI-SOA is a novel feature of an EGI-SOA according to one embodiment of the present invention.

In the context of embodiments of the EGI-SOA of the present invention, W5H ("whiskey-five-hotel") metadata represents the combined contexts of spatial context, temporal context, thematic context, and pedigreed context. W5H is an acronym that describes the following contexts: "what", "where", "why", "when", "Who", and "how". Spatial context defines "where" something is. Temporal context describe "when" something is. Thematic context describes "what" something is, "how" it is used, "why" it is relevant to a specified community and "who" that community is. Pedigreed context describes "wh.ere" something came from and "how" it was derived.

While other types of open standards-based metadata are included within an EGI-SOA of the present invention, W5H metadata provides the basis for a robust contextual description for all aspects of EGI-SOA. This robust contextual definition enables context-aware computing as well as automation of complex workflows. Thus, the definition, population, and maintenance of W5H metadata represents a novel capability within the EGI-SOA.

Spatio-Temporal Events

In the context of embodiments of the EGI-SOA of the present invention, an event represents a class of enterprise message that can be implemented within an existing enterprise messaging service, such as Java Message service (IMS). Each enterprise message is comprised of three components: (1) a message body, (2) a message header, and (3) custom properties. The message body represents a container for message data, which can include events, among other enterprise message types. The message header includes routing information and metadata to ensure the timely delivery of the message within the enterprise messaging system (ESB). The custom properties associated with a message are frequently used to provide event producer/consumer specific filtering and/or processing hints. Thus, events are enterprise messages that are managed and delivered within the ESB of a SOA system.

Within the EGI-SOA of the present invention, all events may possess spatio-temporal contextual or W5H metadata, which enables all events to be described in space, time, and thematic content, as well within a contextual state defined by the pedigreed context. The pervasive inclusion of this type of metadata within an EGI-SOA is one aspect that makes an EGI-SOA of the present invention. The metadata within an event includes a context class description of the event, a bi-temporal characterization of the event, a spatial envelope characterization of the event, and a pedigree for the event.

The event context class describes the class hierarchy of an event context. For instance, the context class can denote that an event represents a new source of raw sensor data, such as a satellite image, or newly transformed sensor data, such as an orthorectified image. This hierarchy can be extended to describe the specific algorithm or specific source of sensor data. An example of this is a distinction between satellite images created from "sensor A" vice "sensor B", In this case, both sensors provide satellite imagery, so the class enables the contextual filtering of this event and therefore the corresponding source sensor data. A consumer that exclusively wants to consume data from "sensor A" can filter on this context; whereas, another consumer that may be willing to consume any source of satellite imagery would filter at the more abstract level of context. Thus, the context class provide a robust methodology to filter events by class context, rather than by just an event name or ID.

The bi-temporal characterization of an event describes the valid time and transaction time or creation time of the event. The valid time includes a temporal granule that describes the relevant span of time to associate with the event, For instance, if the event is associated exclusively with the business work week, then the chrononym "business week" will be used as the temporal granule. Chrononymic services are provided to transform chrononyms into corresponding dates or time granules and vice versa. The transaction time or creation time includes the timestamp for when the event was created represented as another temporal granule. The spatial envelope describes a minimum bounding polygon referenced to a specified coordinate reference system (CRS) to generalize the relevant location of the event as a spatial granule. The pedigree tracks the hierarchy of source events used to derive this event as a pedigreed granule.

Events

Each event is the representation of a business activity within a system component (a business system, device, or other elements that forms part of a business process) that is important to another system component within the enterprise. An event identifies an activity in the source component that will initiate the interaction with itself or other components. An event is comprised of some metadata and a corresponding data payload. The metadata includes information about the context of the event (thematic, valid time, spatial envelope, pedigree) and other system properties, such as the transaction time or creation time of the event. The payload is comprised of a list of logically related fields, where each field is defined by a name, type and value. The payload is designed to be as lightweight as possible, to enable the rapid evaluation of events within a highly transactional environment with huge volumes of events to process in a timely manner.

There are several types of events, including simple events, composite events, derived events, and complex events. A simple event is a singular event. A composite event is an event where one or more source events have been combined into a singular event with an integrated payload. Composite events record all of the source events that comprised the composite event within the event pedigree. A derived event is an event that has inherited its payload from a source event. Derived events record the source event within the event pedigree. A complex event is an event that represents an aggregation of events, where all of the discrete event payloads are available.

Events can be generated as the result of an executable action being sent to a component through a connector. The connector can return a result event, which is treated as a new event. Event instances are passed from a component to a JMS topic via event connectors, which are simple APIs that direct the event instance to the topic, where it is retrieved for evaluation. Connectors allow events to be passed to the JMS queue through common protocols like HTTP, SMTP, and FTP, as well as through common files structures, such as RDBMs or other file types.

All events created within an EGI-SOA of the present invention are persisted within the event manager, a repository of events. This ensures that long event-based transactions can be supported, as well as the forensic re-creation of previously invoked event-driven processes. The repository is a shared, secured data store that contains both events and event component definitions. An event component definition includes the event template, the event patterns, the event handlers, the event evaluation sets, event filters, event actions, and so forth. Metadata describing the various relationships between events and event component definitions is included within the event catalog, a registry, to provide event related discovery services. The registry provides various services, including: publishing services, discovery services, and deprecating services for interacting with event templates and producer/consumer services. The registry includes ISO 19115/ISO 19119 metadata mapped into the Core ISO Metadata (CIM) information model stored within ebRiM.

Event handlers provide the functionality to associate an event or a collection of events defined within an event pattern with a corresponding executable action, including the creation of new events: An event handler is comprised of a number of elements, including: an event Pattern that triggers the event handler when the pattern resolves to "TRUE", evaluation sets that provide the business logic that determines if the action or actions associated with the event are triggered for execution, filters that refine the evaluation criteria beyond just the event payload, and delays that delay or postpone the evaluation of business logic or the corresponding execution of an action Event handlers are described in XML utilizing the EGI-SOA name space and the eventHandler.xsd schema. Each event handler is registered within the event catalog registry and managed within the event manager repository. This enables the discovery of similar and/or conflicting event handlers before those handlers are registered with the ESB.

An event template is essentially an event that includes variables instead of values for the event members. The variables are expressed using regular expression syntax. An event pattern is a collection of one or more event templates that are combined with relational operators to identify a complex set of events. The ESB matches actual events against the event pattern until a match is discovered. Then, the corresponding event handler is invoked with the matching events. However, the ESB pattern matching is limited to the metadata and payload of the event. For a more explicit evaluation of events, evaluation sets are used.

Evaluation sets are the sets of event evaluation business logic that describe the interaction between an event or events identified by an event pattern and the action to take place when the evaluation results to "TRUE". Each event handler may contain one or more evaluation sets. Each evaluation set contains one event, one or more actions, and optional filters that further qualify under what conditions the evaluation is true. Each evaluation set may include a number of properties, such as evaluation delays, which are used to incur a delay between the time the event is received by the event handle and the time when the evaluation set is evaluated.

A filter consists of any number of operand-operator-operand sets and complex filter logic (and/or conditions, branching, etc.) A filter can also be used to determine if the event referenced within the evaluation set has already occurred or if another event or action has already occurred. This type of filter is used for complex event processing, where the event is part of a defined series of steps and dependencies exist between steps. Filters within event evaluation sets comprised an integral aspect to context-aware complex event processing within an EGI-SOA of the present invention.

An action identifies an activity that will occur in the target component as the result of an event. Similar to an event, an action is comprised of a defined service, which includes a specified service contract, and a corresponding payload. The service is a discoverable reference to an executable service registered within the service catalog registry and managed within the service manager repository. The payload contains all of the data required to successfully execute the associated service and to specify what aspects of functionality can alter under which observed contexts.

The data required to populate the payload of an action may not be included within the payload of the triggering event. Event payloads are purposely keep small to reduce the overhead and latency associated with the timely management and evaluation of large volumes of events by the ESB. Data needed beyond that provided within an event may be retrieved from other data sources and evaluated at runtime.

Actions may also have certain properties applied to them, including execution delays. An execution delay is used to delay the execution of the action within the process server. This is a form of quality of service (QoS) service level agreement (SLA). Additional SLAs metrics may be used to define operational trade-offs within the process server, such as trading quality for performance or reduced latency.

Essentially, the action maps to a service contract composed at runtime within the Contextual Process Server (CPS). The service contract consists of a WSDL definition, an XML schema definition, and possible a WS-Policy definition. The service contract exposes public functions, called operations, and is therefore comparable to a traditional application programming interface (API). The CPS will employ a contextual service fabric to interposition alternative services with identical contracts but differing context to meet the specified SLA parameters defined within the action.

In one embodiment of the present invention, the EGI-SOA may be designed to filter complex events from the event cloud to execute complex processes within the computing cloud. The enterprise service bus (ESB) may be specifically designed to be driven by complex events. Essentially, within the context of a SOA ESB, an event is a system message or alert.

Figure 10:
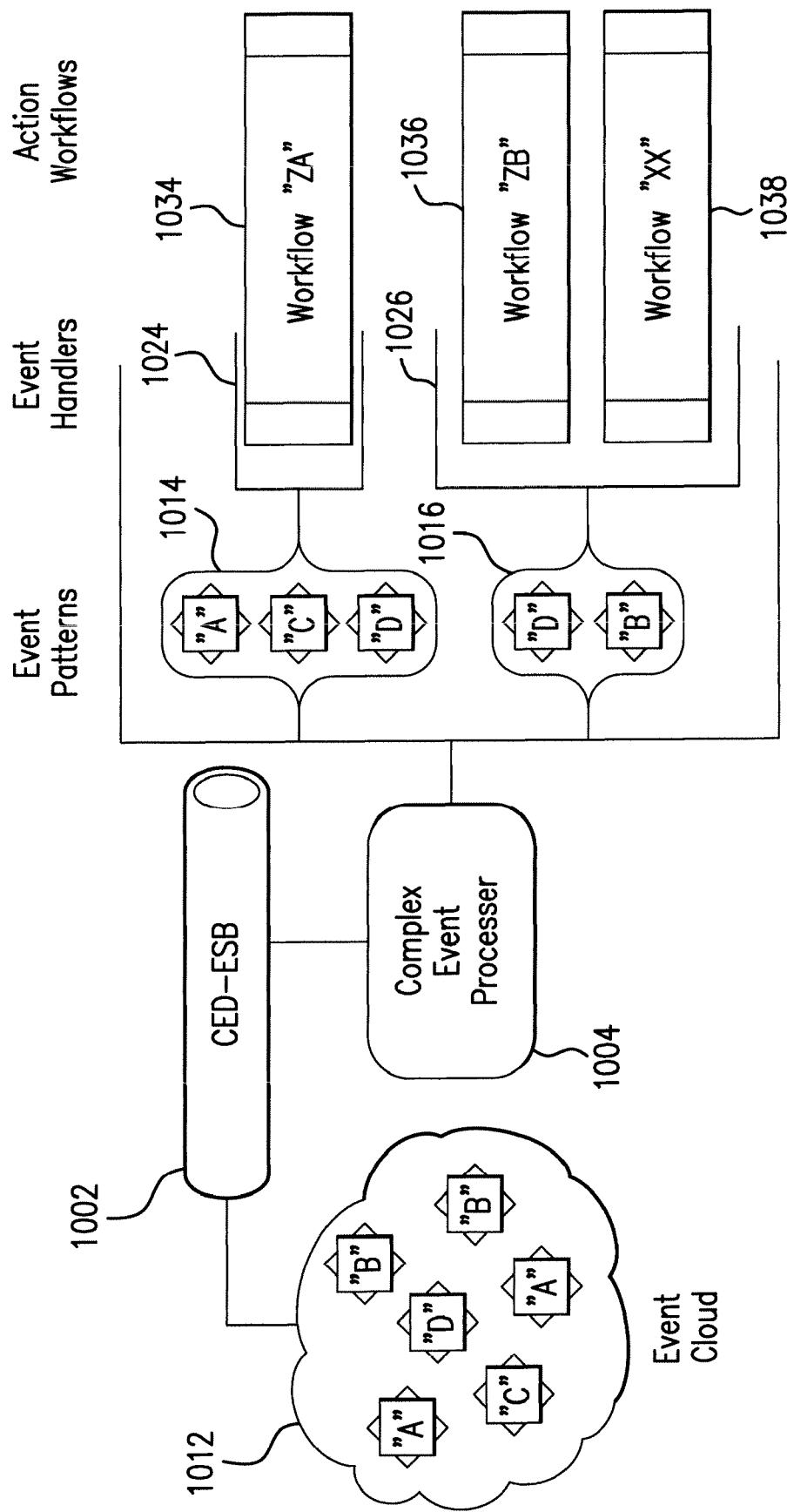
FIG. 10 is a diagram showing how events are processed by a Complex Event-Driven Enterprise Service Bus (CED-ESB) and Complex Event Process (CEP) according to one embodiment of the present invention.

FIG. 10 illustrates how events are process Complex Event-Driven ESB (CED-ESB) 1002 and a Complex Event processor 1004 according to one embodiment of the present system. As shown in FIG. 10 event cloud 1012 represents EGI-SOA events that have been created within the EGLSOA of which the CED-ESB 1002 is a part. CED-ESB 1002 is designed to filter event cloud 1004 for complex patterns of events using Complex Event Processer (CEP) 1004. When a complex event pattern is detected, the service or services associated with a corresponding event handler is executed a workflow with a specified payload and a defined system context. As shown in FIG. 10, CEP 1004 has detected two event patterns 1014 and 1016. Event handler 1024 processes event pattern 1014 and event handler 1026 processes event pattern 1016. Event handler 1024 executes workflow 1034, while event handlers 1026 executes workflows 1036 and 1038.

In one embodiment of the present invention, the CEP designed to support long transaction patterns. This means that an event pattern may be defined within an event window in time. For instance, a pattern could be defined to detect three instances within a single week when an activity is delayed beyond activity's normal start time (i.e., an employee being late for work). When this happens, an automated report may be sent to HR to provide a formal warning to the employee. The CED-ESB may be specifically designed to handle spatio-temporal events with WSH metadata.

Contextual Service Description (CSD) documents services are executed on a processing system to produce an objective result. The state of the environment in which a service executes is described in metadata as a contextual state description (CSD) document. CSD documents are comprised of an)(NIL vocabulary defined within a CSD XML schema designed to provide the context in which a given process is executed. This context includes the following types of metadata: service name and description, including executable components, such as versioned dynamically linked libraries; system name and description, including: hardware list, software list, OS name and version with patch list, etc.; data inputs and results; any data dependencies, both local and remote; and execution metrics, including processing time, RAM requirements, etc.

The objective of a CSD is to sufficiently capture the contextual state of the environment in which the associated service has executed so that this same service can be re-executed at some point in the future with a deterministic result. This type of forensic analysis is valuable to determining why certain results and/or conclusions where reach, given a specific set of data. Additionally, the insights provided by CSDs support the iterative scheduling of a given service within a target environment to meet a quality of service (QoS) requirement.

CSD documents are created from a CSD Server, which is generally loaded onto the processing system that is being assessed. In this case, a CSD Server may be included within the virtualization image for a target processing system to ensure that the server is co-resident and running whenever a service is executed from that environment. Generally, the CSD Server can be configured to provide specific functionality, as shown in FIG. 11.

Figure 11:
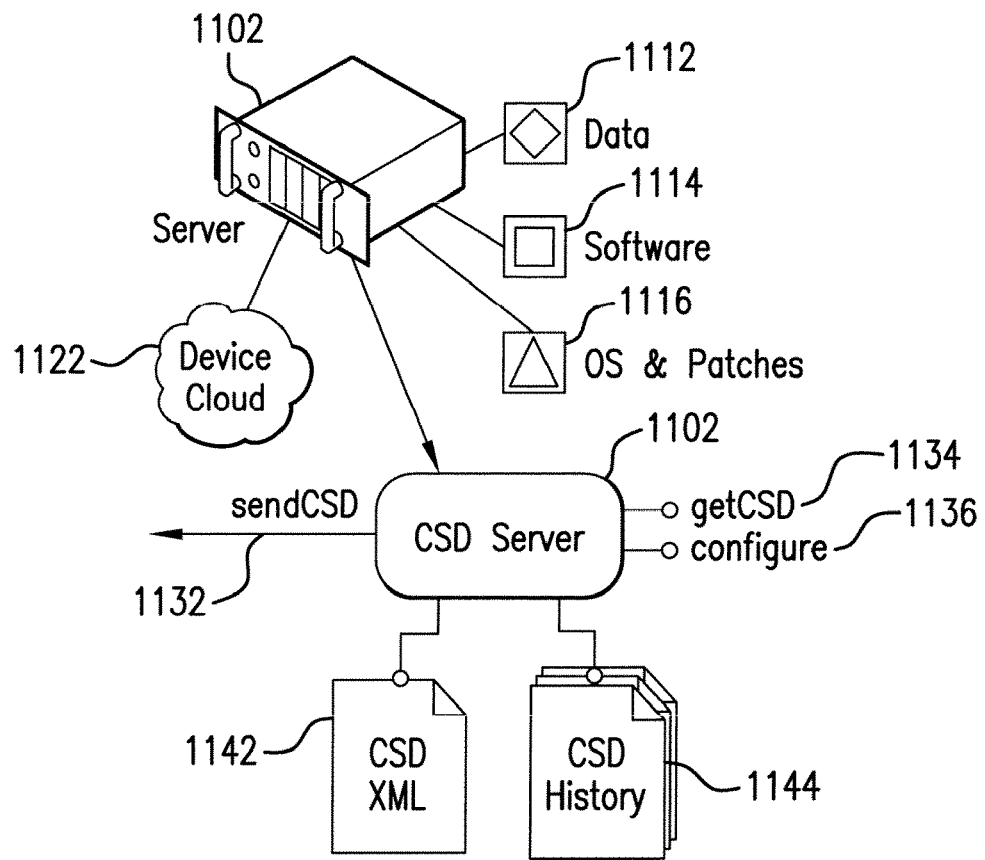
FIG. 11 is a schematic diagram showing a Contextual Service Description (CSD) server according to one embodiment of the present invention.

FIG. 11 illustrates the constituent components of a processing system, CSD server 1102, within the Computing Cloud that are contextually described by a CSD document. Stored on CSD server 1102 are data 1112, software 1114 and USD patches 1116. CSD server is also connected to other devices, represented by device cloud 1122. The other devices may be part of the network of CSD server 1102 or the other devices may be connected to the CSD server by the Internet, by a wireless connection, etc. Thus, the CSD provides a comprehensive contextual state description of the capabilities associated with the corresponding Cloud Computing resource.

CSD server 1102, running as part of the virtualized image managed by the Virtualization Manager for this server, maintains the CSD for this server, along with an normalized history of CSDs.

The CSD server can push a CSD document, to a specified location at a predefined interval, and/or after the completion of a specified process. Alternatively, the server can respond to a request for a specific CSD document, which may require a search of the local CSD history files associated with that processing system.

Figure 12:
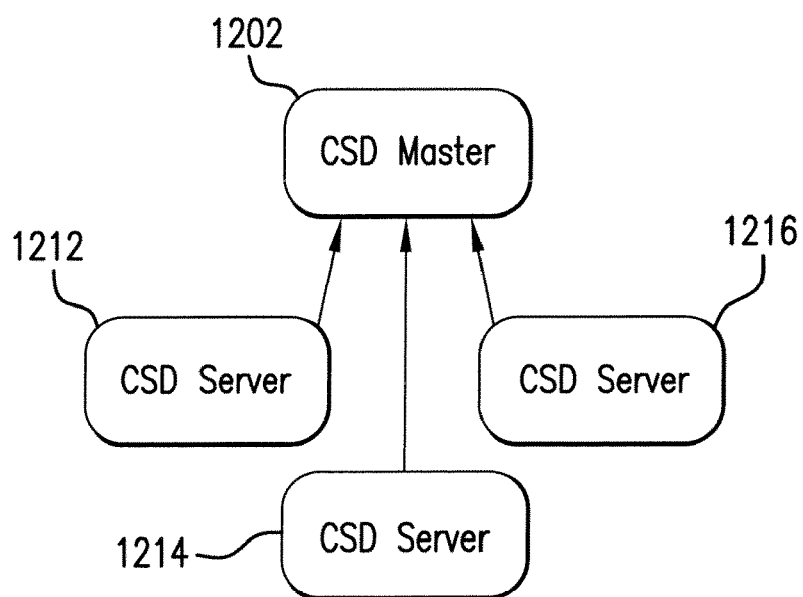
FIG. 12 is a schematic diagram showing the interaction between individual CSD servers and a CSD master server according to one embodiment of the present invention.

Within a cloud computing environment, individual CSD Servers loaded on specific processing system can summarize the resultant CSD documents within a CSD master server 1202, as shown in FIG. 12. FIG. 12 illustrates that individual CSD Servers 1212, 1214 and 1216 connected to CSD master server 1202 are designed to scale within a hierarchy similar to that of load balancers. That is, individual CSD servers are running as a background process on every server within the Computing Cloud aggregating their collective CSDs to a CSD Master.

Figure 13:
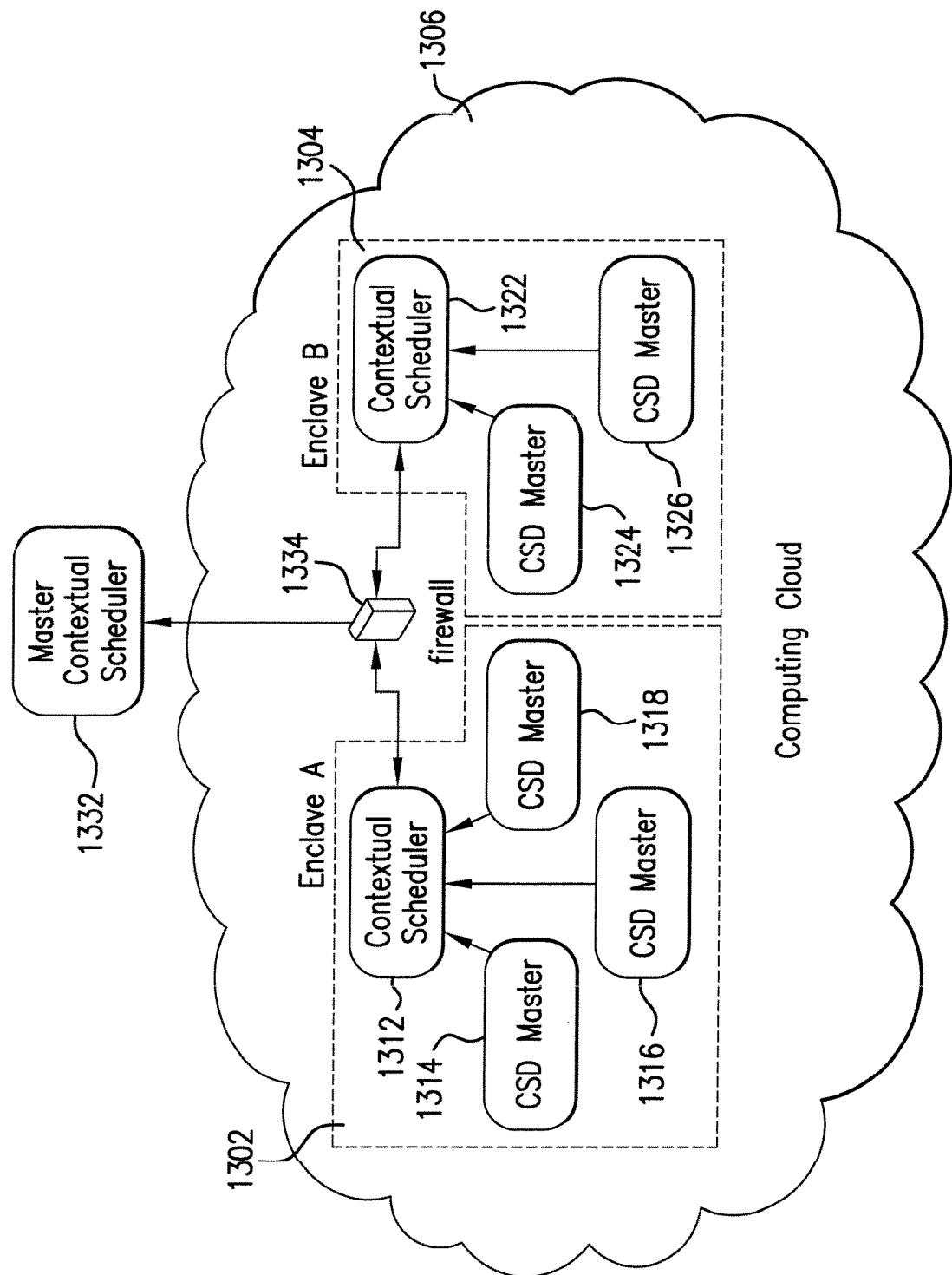
FIG. 13 is a schematic diagram showing a CSD Master Configuration according to one embodiment of the present invention.

This level of aggregation is designed to feed contextual state information on various cloud resources to a contextual scheduler. The contextual scheduler uses data from various CSDs to define the context associated with scheduling current resources within the cloud. Generally, a contextual scheduler is dedicated to a specified enclave within the cloud computing environment, which is likely to have a similar context. However, contextual schedulers can share information with other schedulers, including the Master Contextual Schedule, which is used to define contextual policies in conjunction with any defined governance, as shown in FIG. 13. FIG. 13 shows the further aggregations of CSDs from CSD Masters to Contextual Schedulers which are dedicated to a defined enclave within the Computing Cloud.

FIG. 13 shows two enclaves 1302 and 1304 within a computing cloud 1306. Enclave 1302 includes a contextual server 1312 that schedules jobs for three CSD master servers 1314, 1316 and 1318. Enclave 1304 includes a contextual scheduler 1322 which schedule jobs for CSD master servers 1324 and 1326. The ultimate scheduler for all jobs within computing cloud is a master contextual scheduler 1332 which connected to enclaves 1302 and 1304 and respective context schedulers 1312 and 1322 through a firewall 1334.

Figure 14:
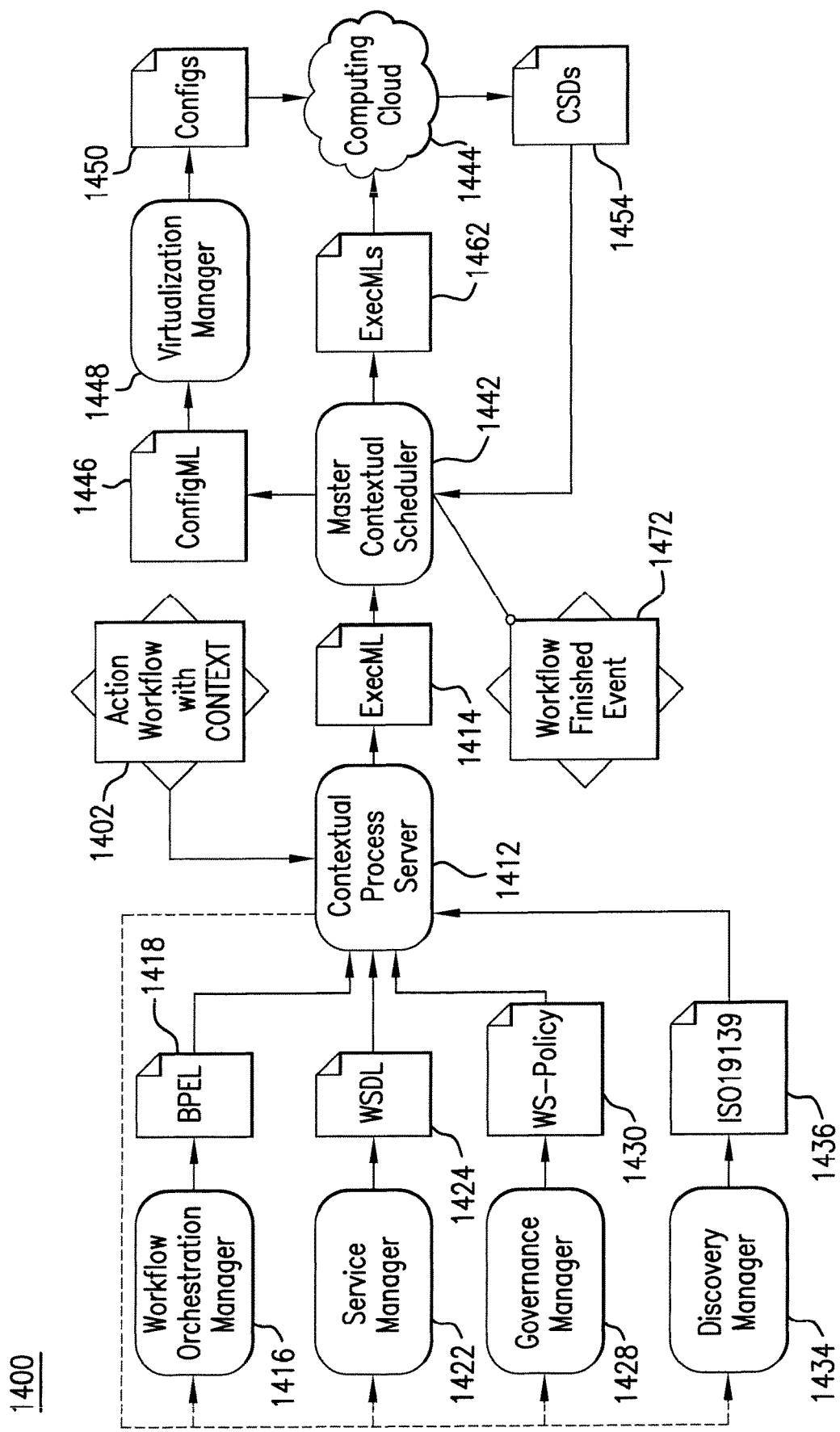
FIG. 14 is a schematic diagram showing contextual scheduling with CSDs according to one embodiment of the present invention.

One method that may be incorporated into the design of an EGI-SOA of the present invention is a context-aware process server that embraces complex spatio-temporal business logic to schedule processes utilizing the most advantageous resources available in the computing cloud, as shown in FIG. 14. This workflow execution figure illustrates how an action workflow, triggered by an event from within an event handler, initiates this workflow, and how the workflow finishes by generating a result event indicating that the workflow is finished.

A workflow 1400 according to one embodiment of the present invention is illustrated in FIG. 14. Workflow 1400 is initiated by an action workflow event 1402 that is received by the Contextual Process Server (CPS) 1412. Action workflow event 1402 includes context and payload that was created by an event handler (not shown in FIG. 14. Action workflow event 1402 describes a service to be composed, scheduled, and executed within the computing cloud.

CPS 1412 composes an ExecML, representation, ExecML job 1414, of action workflow event 1402 or generates an error condition (not shown) stating why an ExecML corresponding to the action workflow event could not be created. ExecML is a XML semantic that aggregates a variety of existing XML semantic standards, such as BPEL, WSDL, WS-Policy, and ISO 19139 into a set of executable instructions that can be schedule to execute on the computing cloud resources.

The first step within CPS 1412 is to request a complete service description from orchestration manager 1416 for the service description included within the action workflow payload of action workflow event 1402. Workflow orchestration manager 1416 is responsible for orchestrating codified workflows, describing the codified workflows in BPEL, validating the BPEL, registering the workflows with the workflow registry service (not shown in FIG. 14), and persisting the versioned workflow within the workflow repository (not shown in FIG. 14). Upon receiving a request for a workflow, a discovery request is made to the workflow registry to determine if the workflow exists. If the workflow does exist, then a BPEL 1418 for the workflow is returned to CPS 1412.

The second step within CPS 1412 is to request the list of services that have matching service contracts to service description included within action workflow event 1402 from a service manager 1422. Service manager 1422 is responsible for maintaining all of the defined services within the EGI-SOA of the present invention. Each service definition is described in WSDL within the service repository. Upon receiving a request for a service contract, a discovery request is made to the service registry to identify all of the services that implement the requested service contract. The resulting WSDL, WSDL 1424, is returned to CPS 1412 by service manager 1422.

The third step within CPS 1412 is to request the governance policies that correspond to the context of action workflow event 1402 from governance manager 1428. Governance manager 142$ is responsible for maintaining all of the governance policies within the EGI-SOA. An example of a governance policy is to identify what services are available for use by the owner of an action workflow and/or what data sources are appropriate to use in what order of precedence. The corresponding policies are written in a WS-Policy, WS-Policy 1430, and returned to CPS 1412.

The fourth step within CPS 1412 is to request the available resources need to execute the service from a discovery manager 1434, Discovery manager 1434 maintains a catalog registry of support data i.e. data granules and/or services that can deliver data. These resources are identified and written in ISO 19139 XML input 1436 and returned to CPS 1412. Data granules are any data that is discoverable with the SDI such as, a terrain surface, a satellite image, a business report, etc.

Collectively, BPEL 1418, WSDL 1424, WS-Policy 1430 and ISO 19139 XML input 1436 may be referred as descriptive intermediate files.

Once CPS 1412 has gathered all of the required inputs, including BPEL 1418 from the orchestration manager 1416, WSDL 1424 from service manager 1422, WS-Policy 1430 from governance manager 1428, and ISO 19139 XML input 1436 from the discovery manager 1434, CPS 1412 generates comprehensive ExecML job 1414.

Master Contextual Scheduler (MCS) 1442 is responsible for understanding the list of available resources within computing cloud 1444, the readiness state of each resource, and the configuration of each resource. From this understanding, MCS 1442 can determine the optimal configuration of the computing resources needed to execute ExecML job 1414 provided by CPS 1412. However, if the optimal resource configuration does not exist within the computing cloud to execute ExecML job 1414, MCS 1442 can determine whether to: dynamically re-provision some of the computing cloud resources, select a less optimal set of resources to complete the execution of ExecML job 1414, or, based on an existing service level agreement that ExecML job 1414 cannot fulfill all of the conditions of the service level agreement.

If MCS 1412 decides to re-provision the resources of computing cloud 1444, then a ConfigML document 1446 is sent to a virtualization manager 1448. When the virtualization server 1448 receives ConfigML document 1446 from MCS 1442, virtualization manager 1448 retrieves a list of system image configurations, list 1450, from the virtualization repository and sends list 1450 to the resources of computing cloud 1444. Within computing cloud 1444, individual resources receive list 1450, and re-provision themselves with new system images from list 1450. Then, each newly re-provisioned resource generates a new Contextual State Description (CSD) for itself, CSDs 1454, and CSDs 1454 are sent to the MCS 1442.

When MCS 1442 receives the corresponding CSDs of CSDs 1454 from the specified cloud computing resources, MCS 1442 finalizes the ExecML descriptions 1462. In some cases, this may mean parallelizing the job by creating several ExecML jobs from the original. As the specified computing cloud resources receive their jobs the jobs are executed. Upon completion of each job, the computing cloud resource creates a new CSD 1454, which is sent to MCS 1442. When the MCS 1442 receives a CSD 1454 from a computing resource within computing cloud 1444, the inventory and configuration list of resources within computing cloud 1444 is updated.

As MCS 1442 receives indication that the job has completed, then a workflow finished event 1472 is triggered with the appropriate state. Finished states can conclude "complete success", "partial success", or various error condition states. Complete success means that the exact context requested by the initiating event was produced. Partial success means that an allowable alternative context was produced, based on the business logic alternative specified within the originating request.

One novel method that is incorporated into an EGI-SOA of the present invention is a context-aware discovery and data management system that culminates with a spatial data infrastructure (SDI). The EGI-SOA SDI manages all of the data available to EGI-SOA processes with corresponding contextual metadata. This means that all data has a defined context within an EGI-SOA of the present invention, which enables context-aware computing, automated workflows, and most importantly, repeatable and auditable process results.

As with any data management system, in the EGI-SOA of the present invention, sources of data should be identified to load into the SDI. EGI-SOA breaks this process down into a number of discrete steps: (1) discovering the source data and moving the source data to the staging area on the edge of EGI-SOA; (2) characterizing the source data and associating context with the source data; (3) archiving new source data under configuration management control; (4) matching the source data against known product types; (4) harvesting metadata from the recognized source products; (5) registering the source products with the SDI Catalog to support discovery; (6) transform the source product into an SDI product; (7) loading the SDI product into the SDI repository; and (8) create a new product event to signal to the rest of an EGI-SOA that the product is available. These steps are shown in FIG. 15 and described in further detail below.

Figure 15:
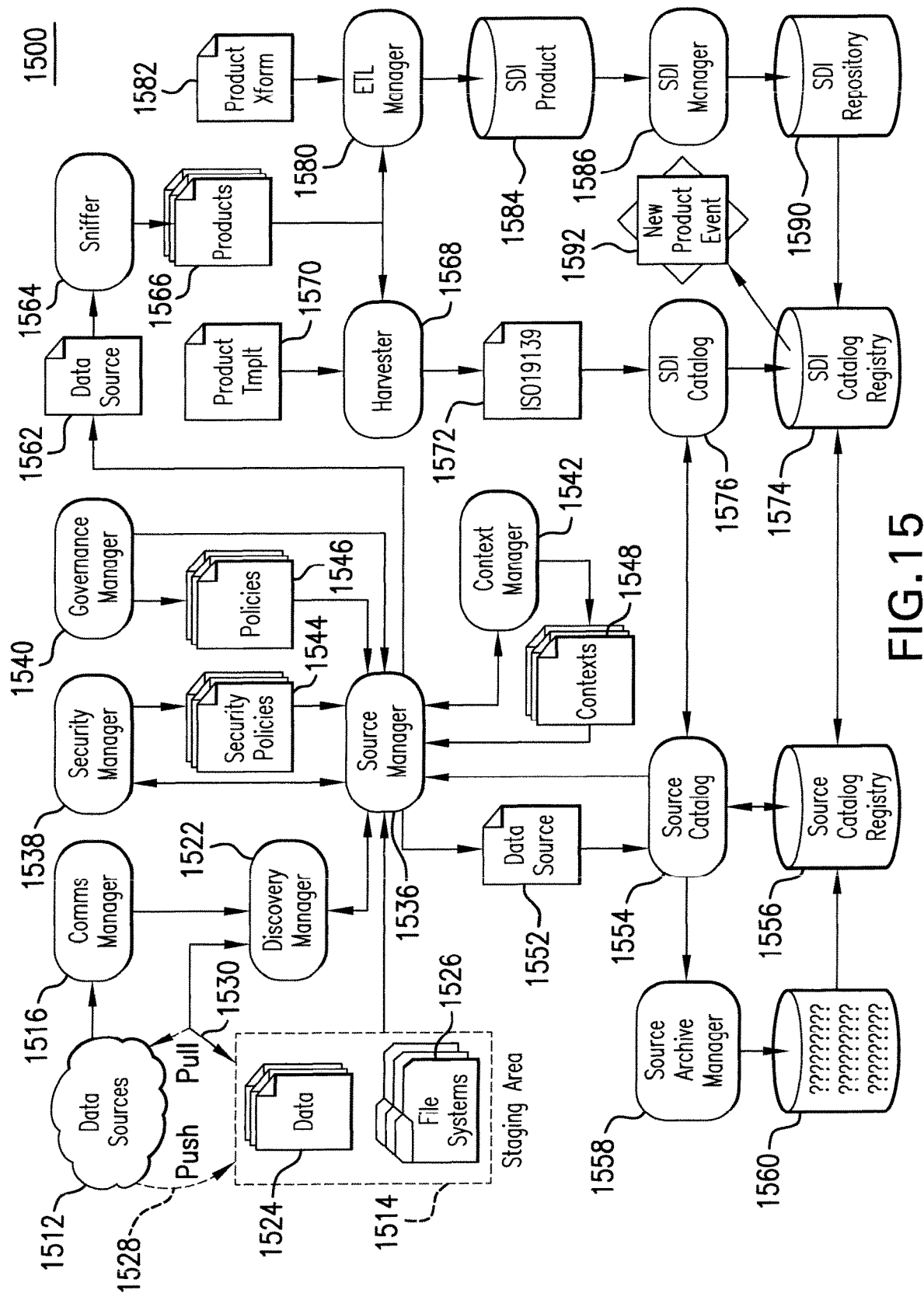
FIG. 15 is a schematic diagram showing the data loading process for an EGI-SOA according to one embodiment of the present invention.

As shown in FIG. 15, in data loading process 1500 a remote source of data is discovered from the data sources cloud 1512, which describes the content, associated metadata, and context for utilizing that data within the EGI-SOA.

Data sources cloud 1512 represents any external source of data that the EGI-SOA can access. This includes FTP servers, web servers, NSF mounted file systems, remote databases, local media (hard disks, CD-ROM, DVDs, flash drives), among others.

The ingestion method for the remote data should be determined. Data provided by a recognized authoritative data steward may be accessed remotely via a service. All other data is introduced into EGI-SOA staging area 1514 for further characterization and validation. Comms manager 1516 is responsible for coordinating the communication protocols necessary to deliver data from the Data Sources cloud to EGI-SOA.

Discovery manager 1522 is responsible for establishing how data sources, such as data 1524 and file systems 1526, are introduced into Staging Area 1514. Remote data may either be pulled or pushed. Pulled data is obtained by an initiating request from EGI-SOA, such as a service request to a remote service provider or by loading a media device local to EGI-SOA. Pushed data, represented by arrow 1528, is provided by a vendor or an authoritative data steward and is sent to EGI-SOA without first being initiated by an EGI-SOA request for data. In contrast, pulled data, represented by arrow 1530, is initiated by EGI-SOA request for data by an end user, a computer, or other type of consumer. Files delivered by FTP may have been pushed to the staging area.

Candidate data sources that are to be ingested into the SDI are first brought to the edge of EGI-SOA in staging area 1514. Staging area 1514 represents a volatile area for characterizing whether the external data should be brought into EGI-SOA to become characterized internal data EGI-SOA processes only recognize data as a source once it has been ETL'd into the SDI or has been registered as a valid service through the discovery manage 1522*r*.

External data sources, both data 1524 in the Staging Area and services recognized by discovery manager 1522 brought to the edge of EGI-SOA are evaluated and characterized by the source manager 1536. Source manager 1536 interacts with security manager 1538, governance manager 1540, and context manager 1542 to determine the overall context to apply to the data/service. Security Manager 1538 determines what security policies 1544 apply to this data/service. Policies 1544 also determine what role the data source can be used for within the SDI to support downstream processing. For instance, a source of satellite imagery provided by the sensor vendor, a trusted source, may be characterized differently than the apparent same satellite image provided by a non-trusted source. Depending upon the associated governance policy, the non-trusted source may only be used when a trusted version of the same is not available. However, the metadata context of any product derived from the non-trusted source would clearly identify this caveat. Because the specific non-trusted source data is included in the pedigreed context of a product ("the recipe"), that source can be replaced with a future trusted version and the corresponding product recreated automatically.

Governance Manager 1540 determines what governance policies 1546 apply to this data. Governance policies 1546 determine how source data should be used within the EGI-SOA. Governance policies 1546 may be defined on a COI basis, resulting in a condition where one COI rejects the use of a data source that another COI depends upon.

Context Manager 1542 determines what contexts 1548 apply to the source data/service. Contexts 1548 include WSH metadata, such as spatio-temporal, thematic, and pedigreed contexts as well as others.

The above-described processes result in the creation of a data source package 1552, which contains the source data/service, any associated metadata, and the defined EGI-SOA context. Data source package 1552 is sent to the source catalog 1554 to determine whether this data has already been ingested into the SDI. If it has, a message is sent to source manager 1536 to discard the source data. Otherwise, source catalog 1554 registers data source package 1552 with source catalog registry 1556 and has the source archive manager 1558 archive source data package 1552 within source manager repository 1560. At this point, the data source is under version and configuration management control within the Source Archive of EGI-SOA. This means that the original source data can be discovered and accessed within the EGI-SOA repeatedly to provide the original state of this data to any EGI-SOA service. Source manager repository 1560 confirms the successful archival process and synchronizes with the source catalog registry 1556, which in turn updates the source manager 1536 through source catalog 1554 that the source data has been successfully archived.

Source manager 1536 sends the updated data source package 1562 to a sniffer 1564 for validation. Sniffer 1564 is responsible for matching discrete data sources into codified products 1566. A product is a collection of one or more data sources that are related by either a designated or a recognized product specification or a discernable file attribute, such as MIME type or file name suffix. The Sniffer will hold constituent data source members of a product until a valid product has been identified and validated. The duration of these long transactions is constrained by governance policies. The resultant validated products are ready to be transformed into SDI products that are managed within the SDI.

Products 1566 are sent to the harvester 1568 to extract full specification product metadata embedded within the product according to the product specification and a corresponding EGI-SOA product specification template 1570. This metadata is combined with the contextual metadata created by source manager 1536 to create an ISO 19139 compliant discovery record 1572 that captures full specification metadata. Discovery record 1572 is used by the various registries within the EGI-SOA to discover and characterize a particular product 1566 within the SDI.

Discovery record 1572 is registered with the SDI catalog registry 1574 by the SDI catalog 1576, Discovery record 1572 includes ISO 19139, ISO CIM, and ISO 19115/ISO 19119 metadata, among others.

Products 1566 are also sent to the ETL Manager 1580. ETL manager 1580 is responsible for extracting the relevant product data, transforming the product data into a native SDI form 1582, and loading the transformed data into an SDI product 1584. Because the native version of the source data used to derive SDI product 1584 is maintained under configuration control within the source manager repository 1560, any discrepancies between the SDI normal form and the native form of data can be dealt with in a loss-less manner within the EGI-SOA. This is an important capability to support fully autonomous workflow processes exploiting highly temporal data sources.

SDI Manager 1586 loads SDI product 1584 into SDI repository 1590 and confirms the successfully loading of the product with SDI catalog registry 1574. Upon success, SDI repository 1590 triggers a new product event 1592 that corresponds to newly loaded SDI product 1584, with the corresponding context and payload for that event class. Thus, the SDI Discovery and ETL process culminates in the creation of an event 1592 that signals the formalized characterization of a new product within the SDI. This solutions architecture enables both complex event-driven processing and autonomous geospatial intelligence workflows.

An Authoritative Data/Service Steward (AD/SS) is a body recognized by a governance policy that provides a definitive source of data for a specified community of interest (COI). Because an EGI-SOA can simultaneously support multiple COI's each with differing requirements, not all COI's will recognize the same AD/SS as an authoritative source. For example, the National Geospatial-Intelligence Agency (NGA) is the definitive source for US aeronautical and marine charts. However, the National Oceanic and Atmospheric Administration (NOAA) has authority to disseminate navigation charts to the general public, since NGA is a DoD/IC agency that does not interact with the general public frequently. Thus, a DoD COI would consider NGA as the AD/SS and a local government agency would consider NOAA as the AD/SS for the same chart.

Figure 16:
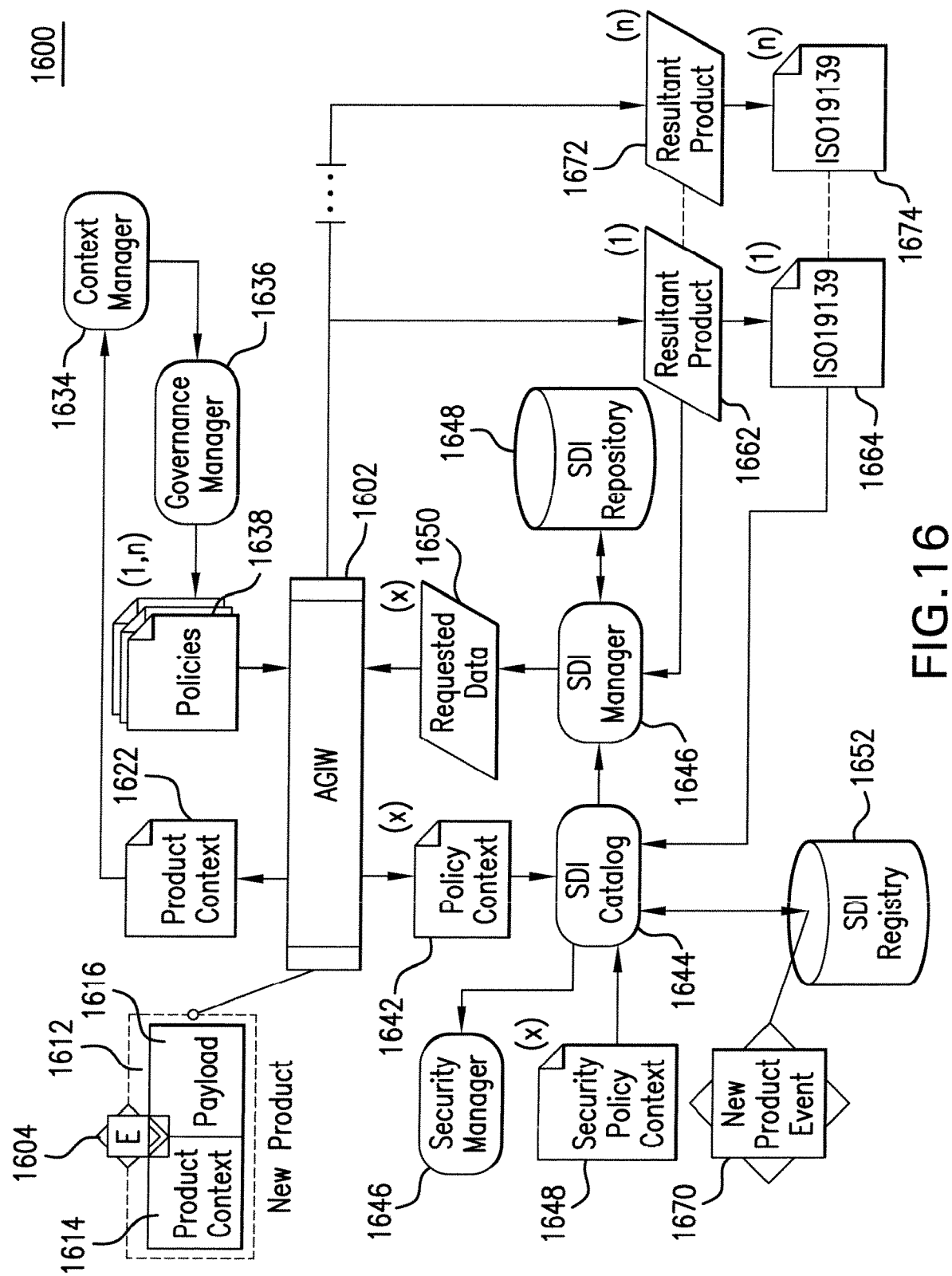
FIG. 16 is a schematic diagram showing the framework of autonomous geospatial intelligence workflows (AGIW for an EGI-SOA according to one embodiment of the present invention.

One novel capability within an EGI-SOA of the present invention the ability to define and operationally deployed autonomous geospatial intelligence workflows (AGIW) to take highly dynamic spatio-temporal sensor data and transform it into customer-centric tailored products. This reusable framework enables extremely complex geospatial intelligence production system to be implemented as EGI-SOA systems to keep pace with the plethora of available sensors, while maintaining a timely service level agreement with mission critical consumers. An example of the framework of an AGIW, such as AutoOrtho™, is shown in FIG. 16.

In AGIW framework 1600 AGDAT 1602 is triggered by a complex event 1604 that corresponds to a new sensor data product 1612, such as a new geospatial image. Event 1604 includes the product context 1614 and a corresponding payload 1616. Payload 1616 includes a reference to the geospatial image product in the SDI, among other data. This descriptive information is passed to AGIW 1602 for execution. A product context 1622 is extracted from the event is passed to context manager 1634 to update the associated context for AGIW 1602 at runtime. The updated context is passed to governance manager 1636 to identify any relevant policies 1638 that relate to either AGIW 1602 or product 1612. Because there may more than one relevant policy (1-n) defining how this resultant product is tailored, AGIW framework 1600 is designed to iterate through (n) number of policies.

Policies 1638 are returned to AGIW 1602, which uses this data to craft an iteration of the policy (context)-driven tailored product. In this case, the iteration is referenced as policy context "x" 1642. Policy context "x" 1642 is then sent to the SDI catalog 1644 to retrieve all of the required data sources for use in the execution of AGM/1602 on the computing cloud (not shown in FIG. 16). SDI catalog 1644 passes the policy context onto security manager 1646 to incorporate any security policies 1648 that would govern this invocation of AGIW 1602. Security policy context 1648 is then passed onto SDI registry 1652 by SDI catalog 1644 to retrieve the corresponding discovery record for the requested data. If the actual data is needed is needed as part of the workflow creation step, SDI manager 1646 retrieves the requested data from SDI repository 1648. Thus, requested data 1650 necessary to invoke AGIW 1602 is returned to AGIW 1602.

At this point in the AGIW job description, the AGM service has all of the inputs (data and context) required to initiate a single iteration of process ("x"). Because there may be "n" iterations of this process, each is completed before determining what to do the resultant products from workflow execution. Since all AGIWs create a resultant product with corresponding metadata, resultant product 1662 from the first iteration is sent to SDI Manager 1646 to be ETU d into the SDI repository 1648. Resultant discovery record 1664 of ISO 19139 metadata is sent to SDI catalog 1644, which registers the new derived product with SDI registry 16452.

Upon successfully registering the new resultant product with SDI catalog registry 1652, a new product event 1670 for the type of derived product is created with a corresponding payload and context, similar to product 1612. This enables the straightforward chaining of inherently complex geospatial intelligence workflows in a seamless manner. Thus, remaining resultant products 1672 and corresponding discovery metadata records 1674 follow the same steps for each iteration through ("n").

Upon completion of the above-described steps, a codified AGIW has been defined and is ready to be executed within the computing cloud utilizing actual product data.

Figure 17:
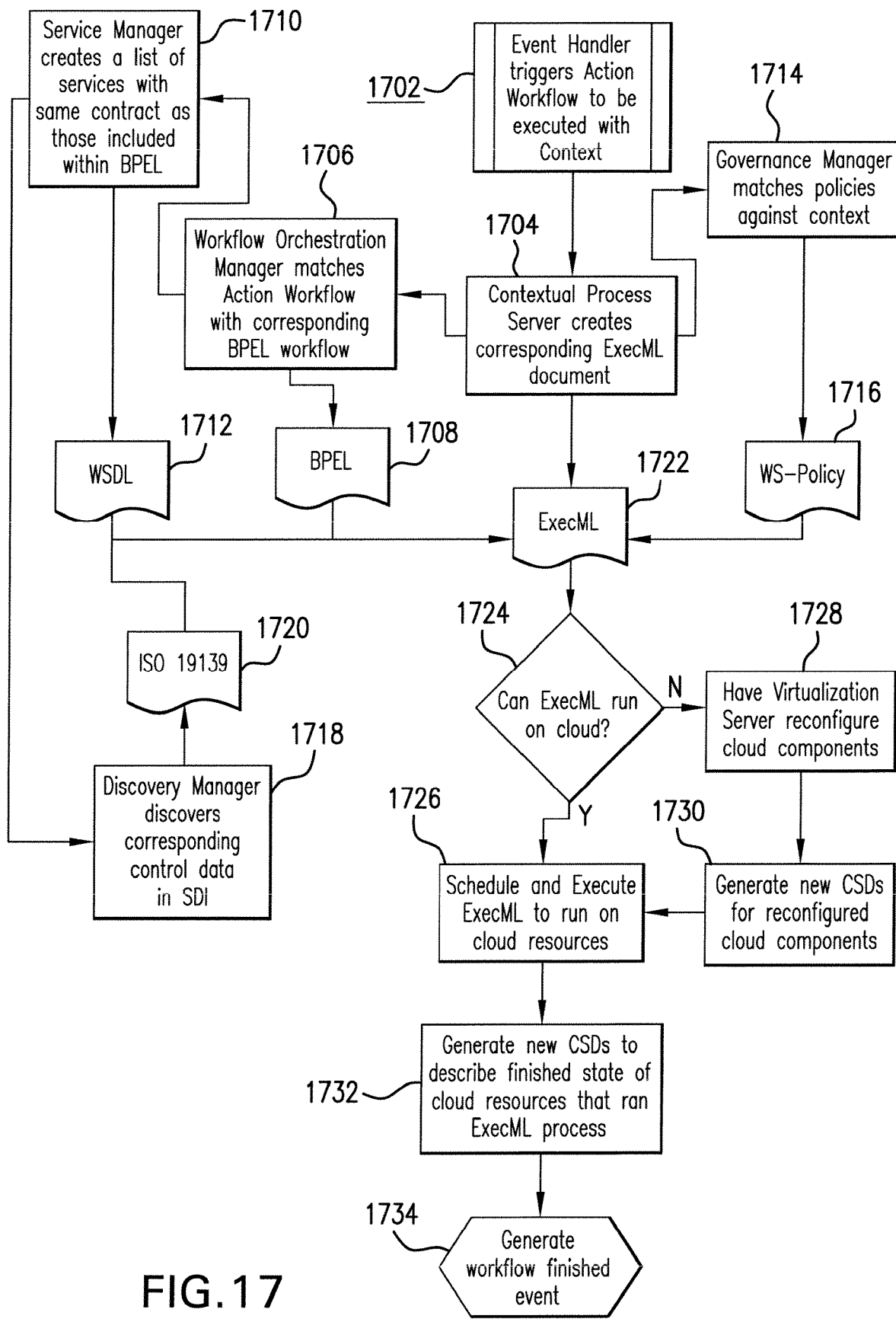
FIG. 17 is a flowchart showing the contextual definition of an action workflow as an executable job in ExecML and the contextual scheduling of the ExecML job on cloud computing resources that may require the dynamic re-configuration and virtual re-provisioning of those cloud computing resources based on context.

As an event-driven architecture, an EGI-SOA of the present communicates between system components via systems messages called events. FIG. 17 illustrates how a workflow that is triggered by an event and an ExecML job is scheduled to execute the workflow for execution on a computing cloud resources. At step 1702, an event handler registered with the ESB is triggered by a specified event with an action workflow and an event payload that includes context. At step 1704, the event payload is passed to the contextual process server which will transform this request into an executable job described in ExecML. At step 1706, a workflow orchestration manager is queried to retrieve a BPEL at step 1708 that corresponds to the specified action workflow. At step 1710 a service manager identifies all of the defined services that meet the service contract requirements specified within the BPEL and the supplied context. This set of services is written in WSDL at step 1712 and represents the alternative functionality that may be implemented at runtime based upon the executable context specified by the Contextual Process Server. At step 1714, a governance manager matches the relevant policies against the supplied context and returns a WS-Policy document at step 1716. At step 1718, a discovery manager identifies all of the support or ancillary data needs require to execute at step 1720 the action workflow within the SDI Catalog as an ISO 19139 discovery record. Then, the Contextual Process Server crafts the Action Workflow job into ExecML at step 1722 by assembling the contexts from steps 1708, 1712, 1716, and 1720 i.e. the BPEL, WSDL, WS-Policy document and ISO 19139 discovery record.

The ExecML is passed to the Master Contextual Scheduler (MCS) to schedule of ExecML job on an appropriate Computing Cloud resources. At step 1724, the MCS first determines whether an appropriate resource exists and is configured to execute the ExecML job at step 1726 by comparing the ExecML requirements against the master list of CSDs. If no match is found, then at step 1728 the MCS requests that a virtualization manager reconfigure a set of Computing Cloud resources to meet the ExecML resource requirements. The virtualization manager identifies the appropriate virtual system image that meets the requirements and dynamically re-provisions the specified set of systems resources. At step 1730, as each computing cloud resource is re-provisioned, the CSD Server on each resource generates an updated CSD for that resources can sends that CSD up the chain ultimately to the MCS. Once the MCS receives the new CSDs and updates it master CSD list, a match between the ExecML requirements and the CSD list can be made. With this match, at step 1726 the ExecML job is scheduled for execution on the identified resources.

Once the ExecML job has successfully completed, at step 1732 the CSD Server updates the contextual state of the resource by generating a new CSD, which is sent to the MCS. Upon confirmation of the completion of the ExecML job, at step 1734 the MCS generates a new event to communicate to the rest of EGI-SOA that the workflow has finished. These workflow event are then correlated with other events to define operating behaviors within the EGI-SOA to initiate other pending workflows.

In one embodiment, the present invention provide a novel method for defining an automated solution architecture for managing, exploiting, and disseminating complex sensor data as part of an enterprise architecture framework. This framework provides the infrastructure for developing context-aware solutions for automatically managing and exploiting large volumes of disparate sensor data into tailored information products that can be seamlessly disseminated to downstream consumers. An example of this type of solution is a system that accepts the daily take (image down link) from various imaging satellites on a continual and on-going basis, manages this volume of data (measured in 10's-100's PB per day), automatically transform the raw data into precise map overlay-based products (using a variety of image processing and/or feature processing algorithms, such as orthorectification), and manages and disseminates these finished products to downstream consumers without an human intervention in the workflow. These types of systems are traditionally manually intensive operations, given the inherent complexity associated with both the sources of data and the tailoring required by consumers in the creation of derived products.

ISO/TC 211 is a standard technical committee formed within ISO, tasked with covering the areas of digital geographic information (such as used by geographic information systems) and geomatics. It is responsible for preparation of a series of International Standards and Technical Specifications numbered in the range starting at 19101. Table 2 below provides a list summary of some of the ISO/TC 211 standards that may be employed with the present invention:

TABLE 2

ISO TC 211 Standards

| Number | Name |
|---|---|
| ISO 6709:1983 | Standard representation latitude, longitude and altitude for geographic point locations |
| ISO 19101:2002 | Geographic information - Reference model |
| ISO/TS 19101-2:2008 | Geographic information - Reference model - Part 2: Imagery |
| ISO/TS 19103:2005 | Geographic information - Conceptual schema language |
| ISO 19105:2000 | Geographic information - Conformance and testing |
| ISO 19106:2004 | Geographic information - Profiles |
| ISO 19107:2003 | Geographic information - Spatial schema |
| ISO 19108:2002 | Geographic information - Temporal schema |
| ISO 19108:2002/Cor 1:2006. | |
| ISO 19110:2005 | Geographico information - Methodology for feature cataloguing |
| ISO 19111:2007 | Spatial referencing by coordinates |
| ISO 19112:2003 | Geographic information - Spatial referencing by geographic identifiers |
| ISO 19113.2002 | Geographic information - Quality principles |
| ISO 19114:2003 | Geographic information - Quality evaluation procedures |

TABLE 2-continued

ISO TC 211 Standards

| Number | Name |
|---|---|
| ISO 19114:2003/Cor 1:2005 | |
| ISO 19115:2003 | Geographic information - Metadata |
| ISO 19115:2003/Cor 1:2006 | |
| ISO 19116:2004 | Geographic information - Positioning services |
| ISO 19117:2005 | Geographic information - Portrayal |
| ISO 19118:2005 | Geographic information - Encoding |
| ISO 19119:2005 | Geographic information - services |
| ISO 19119:2005/Amd 1:2008 | |
| ISO/TR 19120:2001 | Geographic information - Functional standards |
| ISO/TR 19121:2000 | Geographic information - Imagery and gridded data |
| ISO/TR 19122:2004 | Geographic information/ Geomatics - Qualification and certification of personnel |
| ISO 19123:2005 | Geographic information - Schema for coverage geometry and functions |
| ISO 19125-1:2004 | Geographic information - Simple feature access - Part 1: Common architecture |
| ISO/TS 19127:2005 | Geographic information - Geodetic codes and parameters |
| ISO 19128:2005 | Geographic information - Web map server interface |
| ISO 19131:2007 | Geographic information - Data product specifications |
| ISO 19132:2007 | Location-based services - Reference model |
| ISO 19133:2005 | Geographic information - Location-based services - Tracking and navigation |
| ISO 19134:2007 | Geographic information - Location-based services - Multimodal routing and navigation |
| ISO 19135:2005 | Geographic information - Procedures for item registration |
| ISO 19136:2007 | Geographic information - Geography Markup Language (GML) |
| ISO 19137:2007 | Geographic information - Core profile of the spatial schema |
| ISO/TS 19138:2006 | Geographic information - Data quality measures |
| ISO/TS 19139:2007 | Geographic information - Metadata - XML schema implementation |
| ISO 19141:2008 | Schema for moving features |
| 19142 | Geographic information - Web Feature service |
| 19143 | Geographic information - Filter encoding |
| 19144-1 | Geographic information - Classification Systems - Part 1: Classification system structure |
| 19144-2 | Geographic information - Classification Systems - Part 2: Land Cover Classification System LCCS |
| 19145 | Geographic information - Registry of representations of geographic point locations |
| 19146 | Geographic information - Cross-domain vocabularies |
| 19147 | Geographic information - Location based services - Transfer Nodes |
| 19148 | Geographic information - Location based services - Linear Referencing System |
| 19149 | Geographic information - Rights expression language for geographic information-GeoREL |
| 19150 | Geographic information - Ontology |
| 19151 | Dynamic Position Identification Scheme for Ubiquitous Space (u-Position) |
| 19152 | Geographic information - land Administration Domain Model (LADM) |
| 19153 | Geospatial Digital Rights Management Reference Model (GeoDRM RM) |
| 19154 | Standardization Requirements for Ubiquitous Public Access |

While the present invention has been disclosed with references to certain embodiments, numerous modification, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A method comprising the following steps:
   (a) autonomously tailoring one or more tailored geospatial intelligence products using an autonomous geospatial intelligence workflow (AGIW); and
   (b) providing the one or more tailored geospatial intelligence products to a consumer,
   wherein step (a) comprises the following steps:
   (c) filtering an event cloud to match one or more events in the event cloud to an event pattern;
   (d) extracting contexts for each event matched in step (c);
   (e) translating a workflow with the contexts into an executable process,
   wherein step (a) is conducted in response to an event being received by a Complex Event-Driven Enterprise Service Bus (CED-ESB) of an enterprise geospatial intelligence service oriented architecture (EGI-S OA).

2. The method of claim 1, wherein step (a) further comprises the following step:
   (f) determining a product context from an event payload for the one or more events for tailoring each of the one or more tailored geospatial intelligence products.

3. The method of claim 2, wherein step (a) further comprises the following steps:
   (g) determining governance policies to be used by the AGIW based on the contexts of the one or more tailored geospatial intelligence products for the one or more events;
   (h) determining security policies to be used by the AGIW based on the contexts of the one or more tailored geospatial intelligence products for the one or more events;
   (i) retrieving data sources for use in forming the- one or more tailored geospatial intelligence products using the AGIW based on the contexts of the one or more tailored geospatial intelligence products for the one or more events; and
   (j) the AGIW tailoring the one or more tailored geospatial intelligence products based on the security policies, the governance policies and contexts of the one or more tailored geospatial intelligence products determined in steps (g), (h) and (i).

4. The method of claim 3, wherein step (a) further comprises the following step:
   (k) registering each of the one or more tailored geospatial intelligence products in an SDI registry, loading each of the one or more tailored geospatial intelligence products into the SDI registry, and generating a new product event for each of the one or more tailored geospatial intelligence products.

5. A machine readable medium having stored thereon sequences of instructions, which when executed by one or more processors, cause one or more electronic devices to perform a set of operations comprising the following steps:
   (a) autonomously tailoring one or more tailored geospatial intelligence products using an autonomous geospatial intelligence workflow (AGIW); and
   (b) providing the one or more tailored geospatial intelligence products to a consumer,
   wherein step (a) comprises the following steps:
   (c) filtering an event cloud to match one or more events in the event cloud to an event pattern;
   (d) extracting contexts for each event matched in step (c);
   (e) translating a workflow with the contexts into an executable process,
   wherein step (a) is conducted in response to an event being received by a Complex Event-Driven Enterprise Service Bus (CED-ESB) of an enterprise geospatial intelligence service oriented architecture (EGI-SOA).

6. The machine readable medium of claim 5, wherein step (a) further comprises the following step:
   (f) determining a product context from an event payload for the one or more events for tailoring each of the one or more tailored geospatial intelligence products.

7. The machine readable medium of claim 6, wherein step (a) further comprises the following steps:
   (g) determining governance policies to be used by the AGIW based on the contexts of the one or more tailored geospatial intelligence products for the one or more events;
   (h) determining security policies to be used by the AGIW based on the contexts of the one or more tailored geospatial intelligence products for the one or more events;
   (i) retrieving data sources for use in forming the one or more tailored geospatial intelligence products using the AGIW based on the contexts of the one or more tailored geospatial intelligence products for the one or more events; and
   (j) the AGIW tailoring the one or more tailored geospatial intelligence products based on the security policies, the governance policies and contexts of the one or more tailored geospatial intelligence products determined in steps (g), (h) and (i).

8. The machine readable medium of claim 7, wherein step (a) further comprises the following step:
   (k) registering each of the one or more tailored geospatial intelligence products in an SDI registry, loading each of the one or more tailored geospatial intelligence products into the SDI registry, and generating a new product event for each of the one or more tailored geospatial intelligence products.

9. A computer system implementing a method comprising the following steps:
   (a) autonomously tailoring one or more tailored geospatial intelligence products using an autonomous geospatial intelligence workflow (AGIW); and
   (b) providing the one or more tailored geospatial intelligence products to a consumer,
   wherein step (a) comprises the following steps:
   (c) filtering an event cloud to match one or more events in the event cloud to an event pattern;
   (d) extracting contexts for each event matched in step (c);
   (e) translating a workflow with the contexts into an executable process,
   wherein step (a) is conducted in response to an event being received by a Complex Event-Driven Enterprise Service Bus (CED-ESB) of an enterprise geospatial intelligence service oriented architecture (EGI-S OA).

10. The computer system implementing a method of claim 9, wherein step (a) further comprises the following step:
    (f) determining a product context from an event payload for the one or more events for tailoring each of the one or more tailored geospatial intelligence products.

11. The computer system implementing a method of 10, wherein step (a) further comprises the following steps:
  (g) determining governance policies to be used by the AGIW based on the contexts of the one or more tailored geospatial intelligence products for the one or more events;
  (h) determining security policies to be used by the AGIW based on the contexts of the one or more tailored geospatial intelligence products for the one or more events;
  (i) retrieving data sources for use in forming the one or more tailored geospatial intelligence products using the AGIW based on the contexts of the one or more tailored geospatial intelligence products for the one or more events; and
  (j) the AGIW tailoring the one or more tailored geo spatial intelligence products based on the security policies, the governance policies and contexts of the one or more tailored geospatial intelligence products determined in steps (g), (h) and (i).

12. The computer system implementing a method of claim 11, wherein step (a) further comprises the following step:
  (k) registering each of the one or more tailored geospatial intelligence products in an SDI registry, loading each of the one or more tailored geospatial intelligence products into the SDI registry, and generating a new product event for each of the one or more tailored geospatial intelligence products.

* * * * *